(12) United States Patent
Yata et al.

(10) Patent No.: US 6,902,847 B1
(45) Date of Patent: Jun. 7, 2005

(54) NON-AQUEOUS SECONDARY CELL AND METHOD FOR CONTROLLING THE SAME

(75) Inventors: Shizukuni Yata, Osaka (JP); Haruo Kikuta, Osaka (JP); Hajime Kinoshita, Osaka (JP); Hiroyuki Tajiri, Osaka (JP); Shiro Kato, Osaka (JP)

(73) Assignee: Osaka Gas Company Limited, Osaka (JP)

( * ) Notice: Subject to any disclaimer, the term of this patent is extended or adjusted under 35 U.S.C. 154(b) by 0 days.

(21) Appl. No.: 09/700,988

(22) PCT Filed: May 20, 1999

(86) PCT No.: PCT/JP99/02658

§ 371 (c)(1),
(2), (4) Date: Feb. 5, 2001

(87) PCT Pub. No.: WO99/60652

PCT Pub. Date: Nov. 25, 1999

(30) Foreign Application Priority Data

| Mar. 11, 1998 | (JP) | 11/065072 |
| May 20, 1998 | (JP) | 10/138347 |
| Jun. 12, 1998 | (JP) | 10/165373 |
| Dec. 25, 1998 | (JP) | 10/369928 |
| Dec. 25, 1998 | (JP) | 10/369936 |
| Dec. 25, 1998 | (JP) | 10/369969 |
| Dec. 25, 1998 | (JP) | 10/369986 |
| Dec. 28, 1998 | (JP) | 10/373667 |

(51) Int. Cl.$^7$ ................................ H01M 4/58
(52) U.S. Cl. ................. 429/231.8; 429/231.4; 429/162
(58) Field of Search .................. 429/127, 133, 429/162, 188, 218.1, 231.4, 231.8, 231.95, 312, 322

(56) References Cited

U.S. PATENT DOCUMENTS

| 5,451,477 A | * | 9/1995 | Omaru et al. ................. 429/326 |
| 5,569,520 A | * | 10/1996 | Bates ........................... 429/162 |
| 5,856,043 A | * | 1/1999 | Ohsaki et al. ................ 429/332 |
| 5,951,959 A | * | 9/1999 | Nishimura ................. 423/447.1 |
| 6,040,078 A | * | 3/2000 | Fauteux et al. ................ 429/48 |
| 6,087,036 A | * | 7/2000 | Rouillard et al. .............. 429/66 |
| 6,156,459 A | * | 12/2000 | Negoro et al. ............... 429/322 |
| 6,664,006 B1 | * | 12/2003 | Munshi ....................... 429/305 |

FOREIGN PATENT DOCUMENTS

| EP | 808798 A2 | * | 11/1997 | .......... H01M/10/40 |
| EP | 675555 B1 | * | 7/1999 | ........... D01F/9/145 |
| JP | 57-208079 | | 12/1982 | |
| JP | 63-024555 | | 2/1988 | |
| JP | 63-202853 | | 8/1988 | |
| JP | 63-202859 | | 8/1988 | |
| JP | 04-087263 | | 3/1992 | |
| JP | 04-368778 | | 12/1992 | |
| JP | 05-159757 | | 6/1993 | |
| JP | 05-283105 | | 10/1993 | |
| JP | 06-020662 | | 1/1994 | |
| JP | 06-295744 | | 10/1994 | |
| JP | 07-57788 | | 3/1995 | |
| JP | 07-134987 | | 5/1995 | |
| JP | 07-226232 | | 8/1995 | |
| JP | 07-282797 | | 10/1995 | |
| JP | 08-138727 | | 5/1996 | |
| JP | 08-148189 | | 6/1996 | |
| JP | 08-182212 | | 7/1996 | |
| JP | 09-28042 | | 1/1997 | |
| JP | 09-017418 | | 1/1997 | |
| JP | 09-161763 | | 6/1997 | |
| JP | 09-213286 | | 8/1997 | |
| JP | 09-219213 | | 8/1997 | |
| JP | 10-261440 | | 9/1998 | |
| JP | 11-054155 | | 2/1999 | |

OTHER PUBLICATIONS

D. Linden, "Handbook of Batteries", McGraw–Hill, Inc., 2nd Edition, 1995, pp. 3.1–3.20 and 36.1–36.76.*

U. Koehler, et al, "High Performance Nickel–Metal Hydride and Lithium Ion Batteries" Proceedings of the Intersociety Energy Conversion Engineering Conference (1997), 32nd, pp. 93–98.*

* cited by examiner

*Primary Examiner*—Gregg Cantelmo
(74) *Attorney, Agent, or Firm*—Knobbe, Martens Olson & Bear LLP

(57) ABSTRACT

The invention provides a non-aqueous secondary battery having positive and negative electrodes and non-aqueous electrolyte containing lithium salt which has an energy capacity of 30 Wh or more, a volume energy density of 180 Wh/l or higher, which battery has a flat shape and is superior in heat radiation characteristic, used safely and particularly preferably used for a energy storage system. The invention also provides a control method of the secondary battery.

4 Claims, 19 Drawing Sheets

FIG. 11
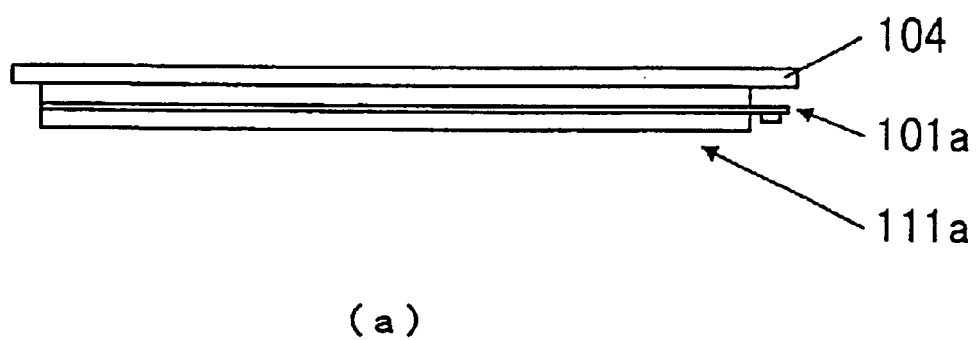
(a)
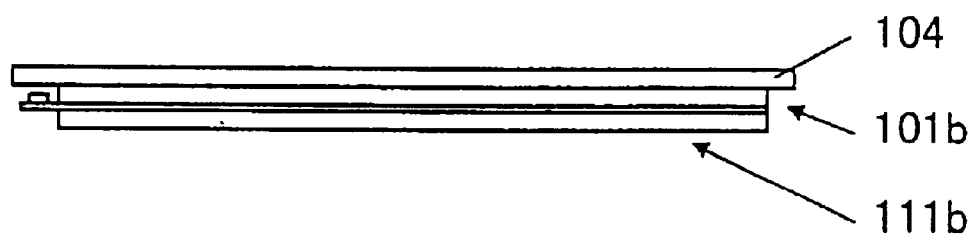
(b)
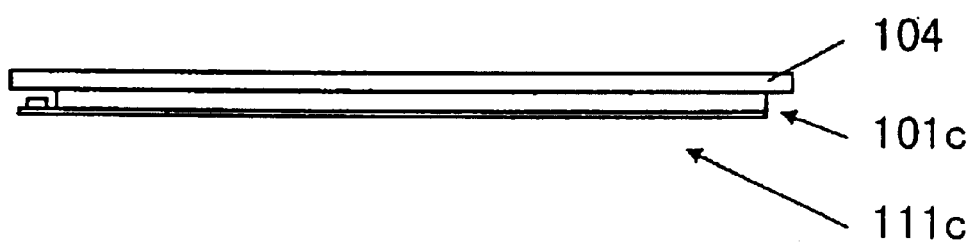
(c)

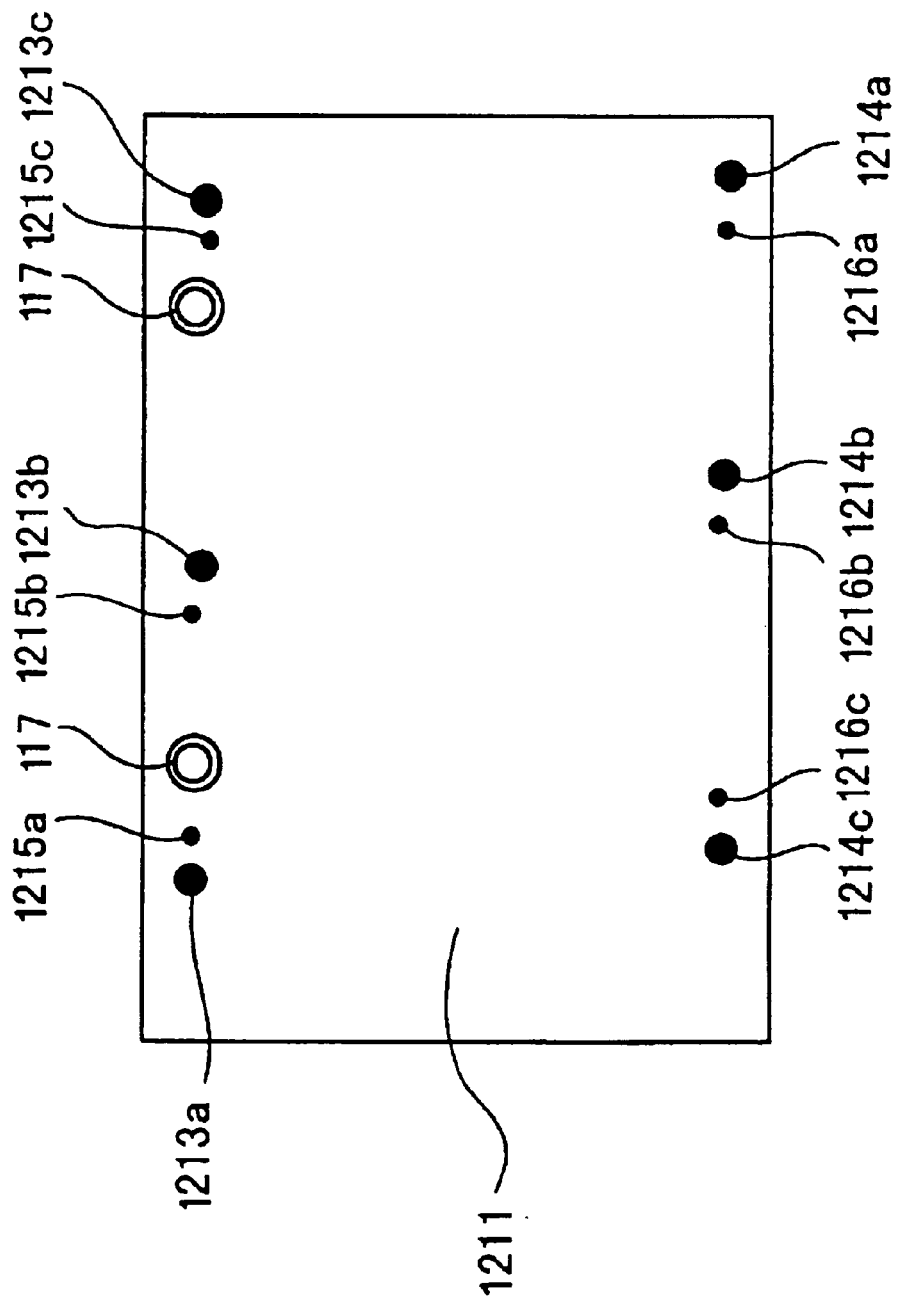

NON-AQUEOUS SECONDARY CELL AND METHOD FOR CONTROLLING THE SAME

This application is the U.S. National Phase under 35 U.S.C. §371 of International Application PCT/JP99/02658, filed May 20, 1999, which claims priority based on JP 10-138347, filed May 20, 1998, JP 10-165373, filed Jun. 12, 1998, JP 10-369928, filed Dec. 25, 1998, JP 10-369936, filed Dec. 25, 1998, JP 10-369969, filed Dec. 25, 1998, JP 10-369986, filed Dec. 25, 1998, JP 10-373667, filed Dec. 28, 1998, and JP 11-65072, filed Mar. 11, 1999.

FIELD OF THE INVENTION

The present invention relates to a non-aqueous secondary battery and its control method, particularly to a non-aqueous secondary battery preferably used for a energy storage system and its control method.

DESCRIPTION OF THE PRIOR ART

A household distributed power-storage system for storing nighttime power and photovoltaic power and a energy storage system for an electric vehicle have been recently noticed from the viewpoints of effective use of energy for resource saving and global atmospheric problems. For example, Japanese Unexamined Patent Publication No. 6-86463 discloses a total system constituted by combining a power supply from a power station, gas co-generation system, a fuel cell, and a storage battery as a system capable of supplying energy to energy consumers under an optimum condition. A secondary battery used for the above energy storage system must be a large scale battery having a large capacity unlike a small secondary battery for a portable devise having an energy capacity of 10 Wh or smaller. Therefore, the above energy storage system is normally used as a battery system constituted by stacking a plurality of secondary batteries in series and having a voltage of 50 to 400 V and in most cases, the system uses a lead-acid battery.

In the field of a small secondary battery for a portable devise, a nickel-hydrogen battery and a lithium secondary battery are developed as new batteries in order to correspond to the needs for a small size and a large capacity and therefore, a battery having a volume energy density of 180 Wh/l or more is marketed. Particularly, because a lithium ion battery has a possibility of a volume energy density exceeding 350 Wh/l and is superior to a lithium secondary battery using metal lithium as a negative electrode in reliabilities such as safety and cycle characteristic, the market of the battery has been remarkably expanded.

Therefore, also in the field of a large scale battery for a energy storage system, development is energetically progressed by Lithium Battery Energy Storage Technology Research Association (LIBES) or the like by targeting a lithium ion battery as a prospective product of a high energy density battery.

The energy capacity of the large lithium ion battery approximately ranges between 100 Wh and 400 Wh and the volume energy density of the battery ranges between 200 and 300 Wh/l, which reaches the level of a small secondary battery for a portable devise. Typical shapes of the battery include a cylindrical shape having a diameter of 50 to 70 mm and a length of 250 to 450 mm and a prismatic shape such as an angular box shape or a boxed shape with rounded edges having a thickness of 35 to 50 mm.

Moreover, as a thin lithium secondary battery, the following are disclosed: a film battery using a film obtained by laminating a metal and a plastic for a thin case and having a thickness of 1 mm or less (Japanese Unexamined Patent Publication Nos. 1993-159757 and 1995-57788) and a small prismatic battery having a thickness of 2 to 15 mm (Japanese Unexamined Patent Publication Nos. 1996-195204, 1996-138727, and 1997-213286). Purposes of these lithium secondary batteries correspond to decrease of a portable devise in size and thickness. For example, a thin battery which has a thickness of several millimeters and an area of approx. JIS size A4 and which can be stored on the bottom of a portable personal computer is also disclosed (Japanese Unexamined Patent Publication No. 1993-283105). However, the thin battery has an energy capacity of 10 Wh or smaller that is too small as a secondary battery for a energy storage system.

Japanese Unexamined Patent Publication Nos. 1982-208079 and 1988-24555 propose the use of graphite as a negative-electrode material for a lithium secondary battery which is superior in flexibility and on which mossy lithium is not deposited even in the case of repetition of a charge-discharge cycle. Because graphite has a special layer structure and a property of forming an inter-calation compound, it is practically used as an electrode material for a secondary battery using the property. Moreover, various types of carbon having a low crystallinity such as carbon having a disordered layer obtained by thermally decomposing hydrocarbon in a gaseous phase and a selective orientation property are disclosed in Japanese Unexamined Patent Publication No. 1988-24555 as materials in each of which an electrolyte is not easily decomposed.

These negative-electrode materials have advantages and disadvantages. When using carbon having a high crystallinity such as graphite as a negative-electrode material, it is theoretically known that a change of potentials due to discharge of lithium ions is decreased and a capacity to be used for a battery increases. However, when the crystallinity of the carbon is increased, the charging rate is lowered probably due to decomposition of an electrolyte, and the carbon is broken due to expansion/contraction of the plane interval of crystal caused by repetition of charge and discharge.

Moreover, when using carbon having a low crystallinity as a negative-electrode material, a change of potentials due to discharge of lithium ions increases and thereby, a capacity usable for a battery decreases, and thus, it is difficult to manufacture a battery having a large capacity.

Japanese Unexamined Patent Publication No. 1992-368778 shows that it is possible to prevent carbon from being broken by forming a double structure in which a carbon particle having a high crystallinity is covered with carbon having a low crystallinity. When using carbon prepared by the above method as an active material, it is theoretically possible to obtain an electrode superior in potential smoothness and having a large capacity by preventing decomposition of an electrolyte. When attempting formation of a practical electrode by using the double-structure active-material particles, an electrode having a thickness of 50 to 500 µm for a cylindrical battery by applying an active material onto copper foil. However, the capacity per electrode volume was not increased because the electrode density was not easily raised. More specifically, it is difficult to raise the electrode density. If setting the electrode density to 1.20 g/cm³ or more through pressure compression, a high volume capacity of 400 mAh/cm³ or more of the negative electrode cannot be resultantly obtained because the double-structure active material particles are broken.

In the case of a large lithium secondary battery (energy capacity of 30 Wh or larger) for an energy storage system, a high energy density can be obtained. However, because the design of the battery is generally similar to the small battery for a portable devise, a cylindrical or prismatic battery is constituted which has a diameter or a thickness three times larger than those of a small battery for a portable devise. In this case, heat is easily stored in the battery due to Joule heat caused by the internal resistance of the battery in charging or discharging or internal heat of the battery due to change of the entropy of the active material due to insertion or detachment of lithium ions. Therefore, the difference between the temperature of the inner portion of the battery and the temperature nearby the surface of the battery increases and thereby, internal resistances differ. As a result, charge capacity or voltage is easily fluctuated. Moreover, because two or more batteries of this type are connected to make a battery module in use, capability of heat storage differs depending on a battery position in the assembled system and fluctuation of heat storage between batteries occurs, and it is difficult to accurately control the whole of the battery module. Furthermore, because heat radiation is likely to be insufficient under high-rate charge/discharge, the battery temperature rises and thereby the battery is brought under an undesirable state. Therefore, a problem is left in the viewpoint of deterioration of service life due to decomposition of an electrolyte, and lack of reliability, particularly safety, because of the possibility of thermal runaway of a battery.

To solve the above problem, in the case of a energy storage system for an electric vehicle, the following methods are disclosed: air cooling using a cooling fan, a cooling method using a Peltier element (Japanese Unexamined Patent Publication No. 1996-148189) and a method for packing a latent-heat storing material into a battery (Japanese Unexamined Patent Publication No. 1997-219213). However, these methods use external cooling and therefore do not provide essential solution to the problems.

Moreover, to obtain a high-capacity battery, it is desirable to set a utilization factor of graphite-based particles used for a negative electrode to a value as high as possible. However, when improving the utilization factor, electrodeposition of lithium metal on a negative electrode increases and heat produced due to a reaction of an electrolyte at approximately 150 degree in Celsius increases. Particularly, in the case of a large scale battery, a negative electrode having a higher capacity is requested in order to improve the energy density and safety of the battery.

Furthermore, a separator having a thickness of 0.02 to 0.05 mm referred to as a micro-porous film made of polypropylene or polyethylene used for a commercially available lithium-ion secondary battery is a typical separator for the above lithium battery and it is locally attempted to use non-woven fabric of the above material for a separator.

In the case of a flat battery, the front and back surface areas of the battery increase as the thickness of the battery decreases, and holding force to be incurred on the surfaces of the electrodes in the battery decreases. Particularly, in the case of a large lithium secondary battery (energy capacity of 30 Wh or larger) used for a energy storage system, the above phenomenon is remarkable. For example, in the case of a 100 Wh-class lithium ion battery having a thickness of 6 mm, the front and back surface areas of the battery reach a very large value of 600 cM$^2$ (either side).

Therefore, when using the above separator for a flat battery having a small holding force for pressing the surface of the electrodes, a problem is left that cyclic deterioration is accelerated due to the repetition of charge and discharge.

Moreover, as internal structure of a general battery, positive and negative electrodes and a separator for separating the electrodes from each other are layered. In the case of a lithium ion battery, a positive electrode made of metal oxide such as $LiCoO_2$, a negative electrode made of carbon, such as graphite, which can be doped and undoped with lithium, and a separator referred to as micro-porous film made of polypropylene, polyethylene or the like and having a thickness of 0.02 to 0.05 mm are different from each other in dimension. For example, in the case of positive and negative electrodes, the negative electrode is designed so that it is slightly larger than the positive electrode to prevent electrodeposition of lithium metal on the negative electrode and to prevent fluctuation of the products even if faced positive and negative electrodes are slightly shifted from each other when a battery is assembled. Moreover, the separator is designed so that it is larger than the positive and negative electrodes in order to prevent a short circuit.

In the case of a cylindrical battery, positioning of the positive and negative electrodes and separators different from each other in size can be easily contrived in the operation of a winder. However, when stacking electrodes in a prismatic or box-shaped battery, the positioning is difficult. Therefore, in such cases, layered electrodes are made by pressing electrodes wound into an ellipse configuration, or by layering electrodes after inserting them into a baggy separator. However, a stacking method having a high packing efficiency of layers is desired.

Particularly, in the case of a flat battery, when using the method of pressing wound electrodes, a short circuit occurs due to separation of an electrode active-material layer from a current collector at an electrode portion having a intensively pressed curvature. When using a baggy separator, sufficient pressure cannot be obtained because of a large electrode area. Therefore, a gap is easily formed between a separator and an electrode layer due to creases or the like of the separator, and the internal resistance of the battery easily increases. Moreover, the binding margin of the separator increases in size and the packing efficiency of the electrodes decreases, influencing the capacity design of the battery. In view of the above-described points, a stacking method realizing a high packing efficiency of electrodes is not found which is suitable for a large scale battery or a flat large scale battery, simplifies positioning of layers, and hardly causes a short circuit.

To control a secondary battery for a energy storage system, in the case of an aqueous secondary battery such as a lead-acid battery or nickel-cadmium battery or the like, a plurality of single cells are connected in series to constitute a module and a plurality of modules are connected in series to constitute an assembly of batteries, in many cases. In these cases, charge and discharge operations are generally controlled per modules. BY measuring voltage, temperature, current, and resistance of a module, the charge and discharge states and the deterioration level of a battery are determined, and charge and discharge are controlled in accordance with the determined results, in many cases.

In the case of a lithium ion battery, even a commercially available small secondary battery is generally controlled on cell by cell basis in a serial module (a module formed by serial connection of two cells or more). This is because a lithium ion battery has a large weak point in overcharge and overdischarge. For example, the safety of a cell become unsecured only by an overcharge state of several tens of mV, and overcharge or overdischarge fatally deteriorates a cycle life.

As described in Japanese Unexamined Patent Publication. Nos. 1996-182212 and 1997-28042, a lithium ion battery for a energy storage system is also controlled on cell by cell basis. The single-cell control is the most advanced art among the battery control methods currently disclosed and is partly introduced into aqueous batteries for an energy storage system.

In the case of a large secondary battery (energy capacity of 30 Wh or larger) for a energy storage system, the capacity, volume, and electrode area for each single cell are ten times or more as large as those of a small battery for a portable devise and the fluctuation of operational characteristics in a single cell, which is not a large problem for a small secondary battery, reaches a level which cannot be ignored. Particularly, in the case of a large lithium secondary battery, the fluctuation of operational characteristics in a single cell is large and greatly influences the safety and reliability similarly to the fluctuation of operational characteristics between single cells of a small lithium ion battery.

Specifically, there are many fluctuations to be considered in a single cell such as electrode deterioration, contact pressure applied to an electrode, and current intensity in a current collector in the single cell. In the case of the above cylindrical and prismatic batteries (batteries having thickness and diameter three times or more as large as those of small battery for a portable devise), heat is easily stored in the batteries because of Joule heat due to the internal resistance of the batteries during charge or discharge, or because of internally produced heat of the batteries due to entropy change of active materials caused by insertion and detachment of lithium ion. Therefore, the difference between the temperature inner portion of the battery and the temperature nearby the surface of the battery is large, and thus the internal resistance showing temperature dependency differs, and the charge capacity and voltage are likely to fluctuate in a single cell.

However, because the large lithium secondary battery art of this type is generally similar to a small lithium ion secondary battery, attempts on battery design and charge and discharge control considering the fluctuation in a single cell are not made yet. Such attempts are not applied to aqueous secondary batteries such as a lead-acid battery, nickel-cadmium secondary battery, nickel-hydrogen secondary battery, which are generally controlled per module.

SUMMARY OF THE INVENTION

It is a main object of the present invention to provide a non-aqueous secondary battery having a large capacity of 30 Wh or larger and a volume energy density of 180 Wh/l or higher and superior in radiation characteristic and safety.

It is another object of the present invention to provide a flat non-aqueous secondary battery which can maintain the superior characteristics during cyclic operation.

It is still another object of the present invention to provide a flat non-aqueous secondary battery which facilitates the stacked structure and prevents the formation of a short circuit when the battery is assembled.

It is still another object of the present invention to provide a secondary battery for a energy storage system superior in reliability such as safety and cyclic durability, and a method for controlling the same.

Other features of the present invention will become more apparent from the following description.

To achieve the above objects, the present invention provides a flat non-aqueous secondary battery comprising positive and negative electrodes and a non-aqueous electrolyte containing lithium salt and having an energy capacity of 30 Wh or larger and a volume energy density of 180 Wh/l or higher. It is preferable that this secondary battery is flat and has a thickness of less than 12 mm.

In the present invention, positive- and negative-electrode active materials are not limited. However, it is preferable to apply A-, B-, and C-type negative electrodes having the following structures. Particularly, when using manganese oxide compound such as lithium manganese oxide or the like as a positive-electrode active material, the above negative electrodes have a high effect as described below.

(A-Type Negative Electrode)

Negative electrode formed by using graphite having an average particle diameter of 1 to 50 μm as active-material particles, a resin as a binder, and a metal as a current collector and having a porosity of 20 to 35%, an electrode density of 1.40 to 1.70 g/cm$^3$, and an capacity of electrode of 400 mAh/cm$^3$ or higher.

(B-Type Negative Electrode)

Negative electrode comprising as active material double-structure graphite particles formed with graphite-based particles and amorphous carbon layers covering the surface of the graphite-based particles, the graphite-based particles having (d002) spacing of (002) planes of not more than 0.34 nm as measured by X-ray wide-angle diffraction method, the amorphous carbon layers having (d002) spacing of (002) planes of 0.34 nm or larger.

(C-Type Negative Electrode)

Negative electrode comprising as active material a carbon material manufactured by mixing at least one of artificial graphite and natural graphite with a carbon material having volatile components on the surface and/or in the inside and heat treatment of the mixture.

In the present invention, when a secondary battery is provided with a separator, it is preferable to use A- or B-type separator or a separator capable of positioning an electrode unit having the following structure respectively.

(A-Type Separator)

A separator in which when a pressure of 2.5 kg/cm$^2$ is applied to the direction of thickness of the separator, the thickness A of the separator is not less than 0.02 mm and not more than 0.15 mm and the porosity of the separator is 40% or higher, and when the absolute value of a change rate of the thickness (mm) of the separator relative to the pressure (kg/cm$^2$) applied to the direction of thickness of the separator is defined as B (mm/(kg/cm$^2$)), the pressure F which renders B/A=1 is not less than 0.05 kg/cm$^2$ and not more than 1 kg/cm$^2$.

(B-Type Separator)

A separator having a first separator and a second separator different from the first separator, wherein when a pressure of 2.5 kg/cm$^2$ is applied to the direction of thickness of the separator, the thickness A of the first separator is not less than 0.02 mm and not more than 0.15 mm and the porosity of the first separator is 40% or higher, and when the absolute value of a change rate of the thickness (mm) of the first separator relative to the pressure (kg/cm$^2$) applied to the direction of thickness of the first separator is defined as B (mm/(kg/cm$^2$)), the pressure F which renders B/A=1 is not less than 0.05 kg/cm$^2$ and not more than 1 kg/cm$^2$, and the second separator is a micro-porous film having a thickness of 0.05 mm or less, a pore diameter of 5 mm or less, and a porosity of 25% or more.

(Separator capable of Positioning Electrode Unit)

A separator bonded with a positive and/or negative electrode.

The above objects of the present invention are also achieved by a secondary-battery operation control method comprising the steps of measuring operational parameters of at different portions of the battery and controlling operations of the battery based on the results of the measurement.

Furthermore, the above objects of the present invention are achieved by a secondary battery for a energy storage system, comprising positive and negative terminals for charge and discharge provided on the battery case and operation-parameter measuring electrodes extending from different portions of the battery to the outside of the battery case for measurement of the operation parameters in the battery.

BRIEF DESCRIPTION OF THE DRAWINGS

FIG. 11 shows side views of electrode units including a C-type separator;

FIG. 20 is a top view of a secondary battery storing electrodes shown in FIG. 18.

DETAILED DESCRIPTION OF THE PREFERRED EMBODIMENTS

Figure 1:
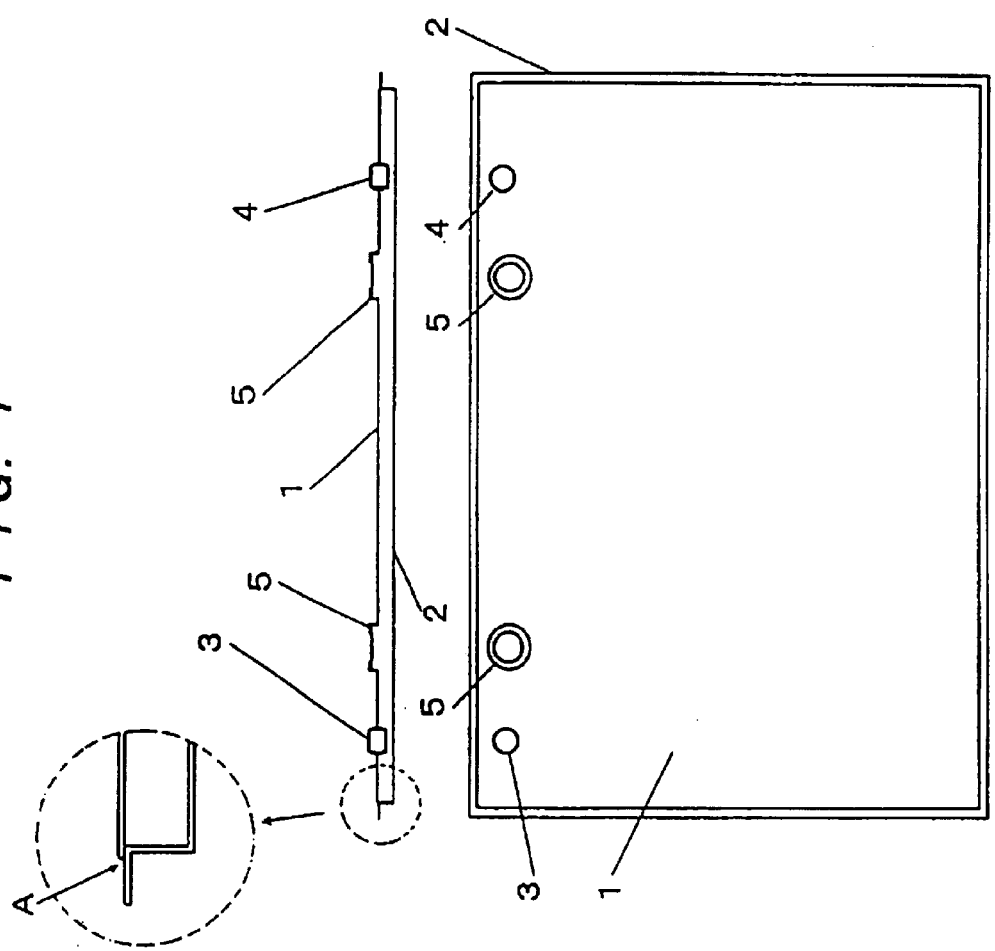
FIG. 1 shows a top view and a side view of a non-aqueous secondary battery of an embodiment of the present invention, which is used for a energy storage system.

A non-aqueous secondary battery of an embodiment of the present invention is described below by referring to the accompanying drawings. FIG. 1 shows a top view and a side view of a flat rectangular (notebook-type) non-aqueous secondary battery for a energy storage system, and FIG. 2 is a side view of stacked electrodes to be stored in the battery shown in FIG. 1.

Figure 2:
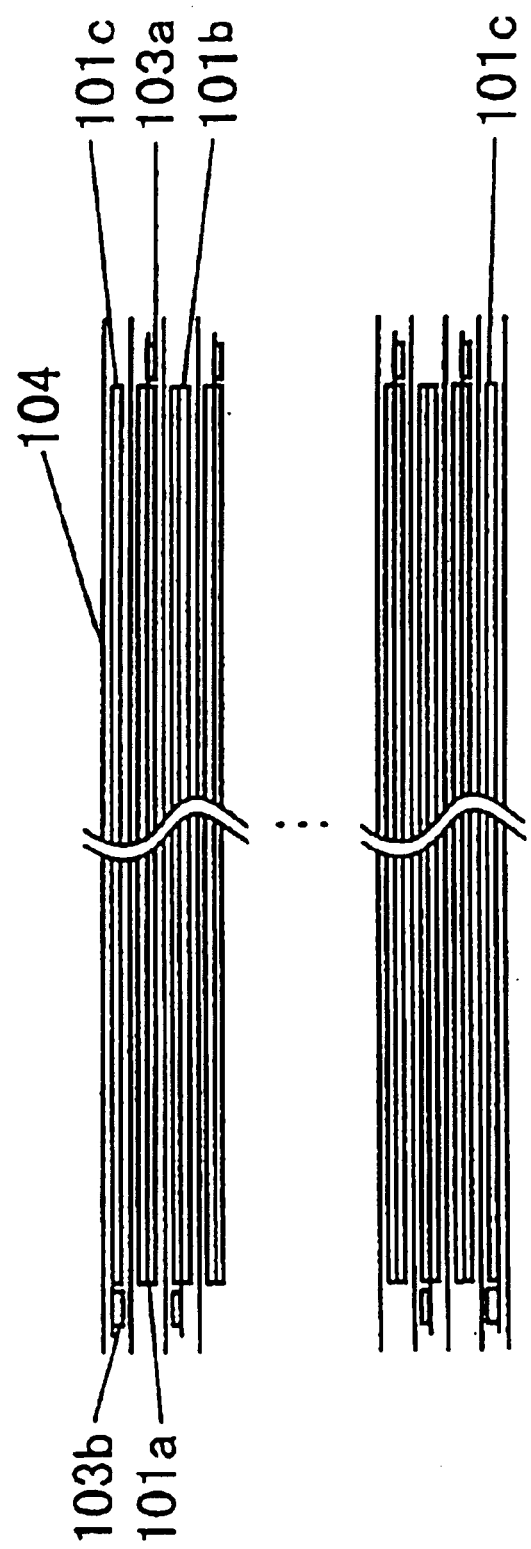
FIG. 2 shows a side view of stacked electrodes to be stored in the battery shown in FIG. 1.

As shown in FIGS. 1 and 2, the non-aqueous secondary battery of this embodiment is provided with a battery case (battery vessel) comprising a upper case 1 and a bottom case 2 and an electrode-stacked body comprising a plurality of positive electrodes 101a and negative electrodes 101b and 101c and a separator 104 stored in the battery case. In the case of the flat non-aqueous secondary battery of this embodiment, the positive electrode 101a and the negative electrode 101b (or the negative electrode 101c formed at the both sides of the stacked body), for example, are alternately arranged and stacked with the separator 104 positioned therebetween as shown in FIG. 2. However, the present invention is not limited to the above arrangement. It is possible to change the number of layers correspondingly to a required capacity etc.

The positive-electrode current collector of each positive electrode 110a is electrically connected to a positive-electrode tab 3 via a positive-electrode tab 103a and similarly, negative-electrode current collectors of the each negative electrodes 101b and 101c are electrically connected to a negative-electrode tab 4 via a negative-electrode tab 103-b. The positive-electrode tab 3 and negative-electrode tab 4 are mounted on the battery case, that is, the upper case 1 while insulated therefrom. The entire circumferences of the upper case 1 and the bottom case 2 are welded at the point A shown by the enlarged view in FIG. 1. The upper case 1 is provided with a safety vent 5 for releasing the internal pressure in the battery when the pressure rises. The non-aqueous secondary battery shown in FIGS. 1 and 2 has, for example, a length of 300 mm, a width of 210 mm, and a thickness of 6 mm. A lithium secondary battery using $LiMn_2O_4$ for the positive electrode 101a and graphite described below for the negative electrodes 101b and 101c has, for example, an energy capacity of 80 to 100 Wh and it can be used for a energy storage system.

The non-aqueous secondary battery constituted as described above can be used for a household energy storage system (for nighttime power storage, co-generation, photovoltaic power generation, or the like) and a energy storage system of an electric vehicle or the like and have a large capacity and a high energy density. In this case, the energy capacity is preferably kept at 30 Wh or larger, more preferably kept at 50 Wh or larger, and the energy density is preferably kept at 180 Wh/l or higher, or more preferably kept at 200 Wh/l or higher. When the battery has an energy capacity of smaller than 30 Wh or a volume energy density of lower than 180 Wh/l, it is not preferable to use the battery for a energy storage system because the capacity is too low to be used for a energy storage system and therefore it is necessary to increase the numbers of batteries connected in series and in parallel, and moreover it is difficult to compactly design the battery.

The thickness of the flat non-aqueous secondary battery of this embodiment is preferably less than 12 mm, more preferably less than 10 mm, and still more preferably less than 8 mm. For the lower limit of the thickness, 2 mm or more is practical when considering the packing efficiency of electrodes and the size of a battery (the area of the battery surface increases as the thickness thereof decreases in order to obtain the same capacity). When the thickness of the battery becomes 12 mm or more, it is difficult to sufficiently release the heat produced in the battery to the outside or the temperature difference between the inner portion and the vicinity of the surface of the battery increases and the internal resistance differs and resultantly, fluctuations of charge capacity and voltage in the battery increase. Though a specific thickness is properly determined in accordance with the battery capacity and energy density, it is preferable to design the battery at a maximum thickness at which an expected radiation of heat is obtained.

It is possible to form the front and back surfaces of the flat non-aqueous secondary battery of this embodiment into various shapes such as angular shape, circular shape, and elliptic shape, etc. The typical angular shape is rectangle. However, it is also possible to form the front and back surfaces into a polygon such as a triangle or hexagon. Moreover, it is possible to form the battery into a cylindrical shape having a small thickness. In the case of the cylindrical, shape, the thickness of the cylinder corresponds the thickness of a battery described above. From the viewpoint of easiness of manufacture, it is preferable that the front and back surfaces of the flat shape battery are rectangular and the battery is the notebook type as shown in FIG. 1.

Figure 3:
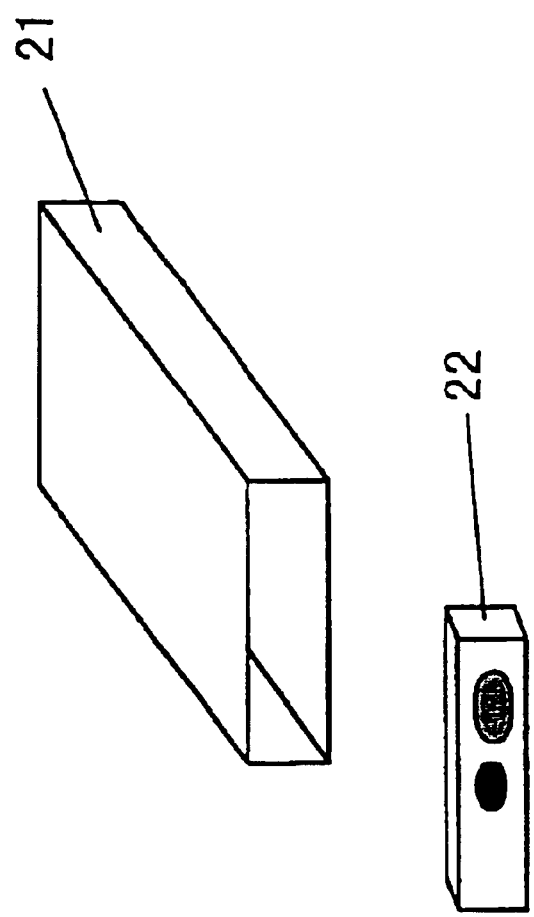
FIG. 3 illustrates a manufacturing method of a conventional small prismatic battery.

Next, a method for manufacturing a notebook-shaped battery case is described regarding a method for manufacturing a battery case comprising the upper case 1 and the bottom case 2. In general, a household small prismatic battery is approximately 50 mm square and has a thickness of approx. 6 mm. As shown in FIG. 3, the battery case is manufactured by laser-welding a bottom case 21 (also serving as a negative terminal) and a upper case 22. The bottom case 21 is formed by deep-drawing of a thick plate. The upper case 22 is provided with a safety vent and a positive terminal.

However, it is difficult to manufacture the notebook-type battery shown in FIG. 1 by the method same as the case of a small secondary battery. That is, the bottom case 2 of the battery case is obtained by bending a thin plate having the shape shown in FIG. 4 inward along the broken line L1 and further bending it outward along the alternate long and short dash line L2, thereafter welding the corner shown by A or drawing a thin plate (very shallow drawing), and welding the upper case 1 on which a terminal and a safety vent are set as shown in FIG. 1. Alternatively, the battery case can be manufactured by bending a thin plate and welding the portion A as shown in FIG. 5 to form a structure 13 and further welding lateral lids 11 and 12 to the a structure 13.

A material for a battery case such as the above thin plate is properly selected in accordance with the purpose or shape of a battery. Iron, stainless steel, or aluminum is generally and practically used though not limited specifically. The thickness of a battery case is, properly determined in accordance with the purpose, shape, or material of the battery case though not limited specifically. Preferably, the thickness of the portion of 80% or more of the surface area of a battery (thickness of the portion having the largest area constituting a battery case) is 0.2 mm or more. If the above thickness is less than 0.2 mm, it is not preferable because a strength required to manufacture a battery cannot be obtained. From this point of view, a thickness of 0.3 mm or more is more preferable. Moreover, it is preferable that the thickness of the above portion is 1 mm or less. A thickness of more than 1 mm is not preferable because the internal volume of the battery decreases and thereby, a sufficient capacity cannot be obtained or the weight increases. From this point of view, it is more preferable that the thickness is 0.7 mm or less.

As described above, by designing the thickness of a non-aqueous secondary battery to less than 12 mm, when the battery has a large capacity of e.g. 30 Wh or more and a high energy density of e.g. 180 Wh/l, rise of the battery temperature is small even under high-rate charge/discharge and the battery can have a superior heat radiation characteristic. Therefore, heat storage of the battery due to internal heat is reduced, and resultantly it is possible to prevent thermal runaway of a battery and provide a non-aqueous secondary battery superior in reliability and safety.

A positive-electrode active material of a non-aqueous secondary battery of the present invention is not limited as long as the material is a positive-electrode material for lithium batteries. It is possible to use one of lithium-containing cobalt-based oxides, lithium-containing nickel-based oxides, and lithium-containing manganese-based oxides, or a mixture of these substances, or moreover a compound material obtained by adding at least one different-type metal element to these compound oxides. These materials are preferably used to realize a high-voltage large-capacity battery. From the view point of safety, it is preferable to use manganese oxide having a high thermal-decomposition temperature. As the manganese oxide, the following are listed: lithium-containing manganese oxides such as $LiMn_2O_4$, a compound material obtained by adding at least one different-type metal element to these compound oxides, and $LiMn_2O_4$ containing lithium and oxygen more than the theoretical ratio.

A negative-electrode active material of a non-aqueous secondary battery of the present invention is not limited as long as the material is a negative-electrode material for lithium batteries. A material that can be doped or undoped with lithium is preferable because reliability such as safety or cycle life is improved. As materials which can be doped or undoped with lithium, the following can be used: graphite materials, carbon-based material, metal oxide such as tin-oxide-based material or silicon-oxide-based material which are used as negative-electrode materials of publicly-known lithium ion batteries, and an electrically conducting polymer represented by a polyacenic semiconductors. Particularly, from the viewpoint of safety, it is preferable to use a polyacenic substance producing small heat at approximately 150 degree Celsius or a material containing the polyacenic substance.

As the electrolyte of a non-aqueous secondary battery of the present invention, it is possible to use a non-aqueous electrolyte containing publicly-known lithium salt and the electrolyte is properly selected in accordance with the condition such as the sort of a positive-electrode material or negative-electrode material or charge voltage. More specifically, a material is used which is obtained by dissolving lithium salt such as $LiPF_6$, $LiBF_4$, or $LiClO_4$ in one of propylene carbonate, ethylene carbonate, diethyl carbonate, dimethyl carbonate, methyl ethyl carbonate, dimethoxyethane, g-butyrolactone, methyl acetate, and methyl formate, or an organic solvent such as a mixed solvent of two types of these substances or more. Further, it is possible to use a gel or solid electrolyte.

Though the concentration of an electrolyte is not limited, 0.5 mol/l to 2 mol/l are generally practical. It is preferable to use the electrolyte having a moisture of 100 ppm or less.

The word non-aqueous electrolyte referred to in the description and claims of this application denotes either of non-aqueous electrolyte or organic electrolyte, and either of gel or solid electrolyte.

Embodiments of a secondary battery (flat non-aqueous secondary battery having an energy capacity of 30 Wh or more and a volume energy density of 180 Wh/l or more and a thickness of less than 12 mm) of the present invention are shown and further specifically described below.

[Embodiment 1-1]

A secondary battery of an embodiment of the present invention was constituted as described below.

Figure 6:
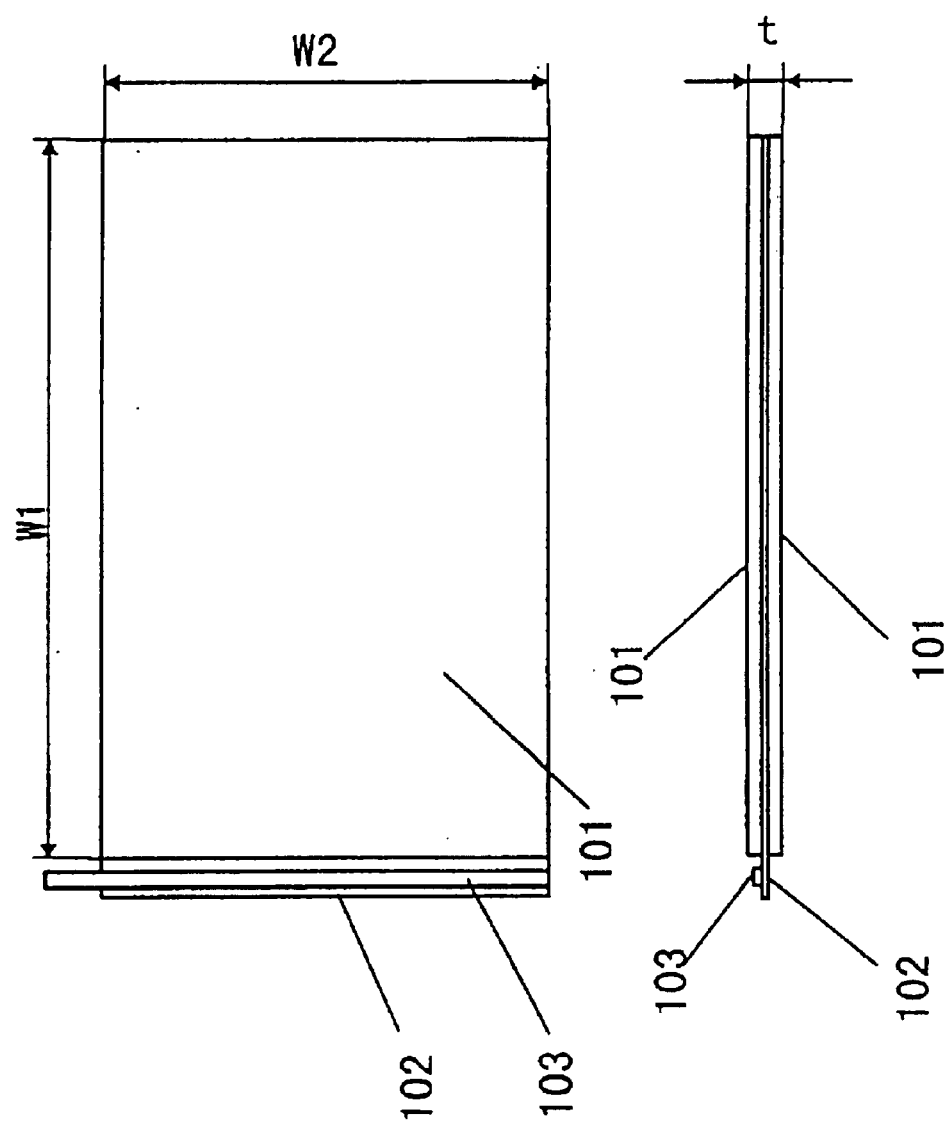
FIG. 6 shows an electrode used in an embodiment of a non-aqueous secondary battery of the present invention.

(1) A mixture slurry for a positive-electrode was obtained by mixing 100 parts by weight of spinel-type $LiMn_2O_4$ (made by SEIMI CHEMICAL; product No. M063), 10 parts by weight of acetylene black, and 5 parts by weight of polyvinylidene fluoride (PVdF) with 100 parts by weight of N-methylpyrrolidone (NMP). The slurry was applied to the both sides of an aluminum foil having a thickness of 20 $\mu$m and dried and then, pressed to obtain a positive electrode. FIG. 6 is an illustration of an electrode. In the case of this embodiment, the coating area (W1×W2) of an electrode (101) is 268×178 $mm^2$ and slurry is applied to the both sides of a 20 $\mu$m aluminum foil (102) at a thickness of 120 $\mu$m. As a result, the electrode thickness t is 260 $\mu$m; One of the edge portions of the current collector extending along the arrow W2 and having a width of 1 cm is not coated with the electrode, and a tab 103 (aluminum having a thickness of 0.1 mm and a width of 6 mm) is welded thereto.

(2) A mixture slurry for a negative-electrode was obtained by mixing 100 parts by weight of graphitized mesocarbon microbeads (MCMB: made by OSAKA GAS CHEMICAL Co., Ltd.; product No. 6 28) and 10 parts by weight of PVdF with 90 parts by weight of NMP. The slurry was applied to the both sides of a copper foil having a thickness of 14 $\mu$m and dried, and then pressed to obtain a negative electrode. Because the shape of the negative electrode is the same as the above positive electrode, the negative electrode is described by referring to FIG. 6. In the case of this embodiment, the coating area (W1×W2) of the electrode (101) is 270×180 $mm^2$ and the slurry is applied to both sides of the copper foil (102) at a thickness of 80 $\mu$m. As a result, the electrode thickness t is 174 $\mu$m. One of the edge portions of the current collector extending along the arrow W2 and having a width of 1 cm is not coated with the electrode, and a tab 103 (nickel having a thickness of 0.1 mm and a width of 6 mm) is welded thereto.

Moreover, the slurry was applied to only one side by the same method and a single-sided electrode having a thickness of 94 $\mu$m was formed by the same method except for the application of the slurry. The single-sided electrode is positioned at the outermost side in the stacked electrodes which is described in the following Item (3) (101c in FIG. 6).

(3) Ten positive electrodes and eleven negative electrodes (including 2 single-sided electrodes) obtained in the above Item (1) were alternately stacked with a separator 104 (made by TONEN TAPIRUSU Co., Ltd.; made of porous polyethylene) held between each of the layers to form an electrode-stacked body.

(4) The battery bottom case (designated as 2 in FIG. 1) was formed by bending a thin plate made of SUS304 having the shape shown in FIG. 1 and a thickness of 0.5 mm inward at the lines L1 and outward at the lines L2 and then arc-welding the corners A. The upper case (designated as 1 in FIG. 1) of the battery case, was also formed with a thin plate made of SUS304 having a thickness of 0.5 mm. Terminals 3 and 4 (diameter of 6 mm) made of SUS304 and a safety-vent hole (diameter of 8 mm) are formed on the upper case 1. The terminals 3 and 4 are insulated from the upper case 1 by a packing made of polypropylene.

(5) Each positive terminal 103-a of the electrode-stacked body made in the above Item (3) was welded to the tab 3 and each negative terminal 103b was welded to the tab 4 through a connection line and then, the electrode-stacked body was set to the battery bottom case 2 and fixed by an insulating tape to laser-weld the overall circumference along the edge A in FIG. 1. Thereafter, a solution was made by dissolving $LiPF_6$ at a concentration of 1 mol/l in a solvent obtained by mixing ethylene carbonate and diethyl carbonate at a weight ratio of 1:1. The solution was poured through a safety-vent hole as an electrolyte and the hole was closed with aluminum foil having a thickness of 0.1 mm.

(6) The formed battery had a size of 300×210 $mm^2$ and a thickness of 6 mm. The battery was charged by a constant-current/constant-voltage charging for 18 hours, in which the battery was charged up to 4.3 V by a current of 3 A and then charged by a constant voltage of 4.3 V. Then, the battery was discharged to 2.0 V by a constant current of 30 A. The discharged capacity was 26 Ah, energy capacity was 91 Wh, and volume energy density was 240 Wh/l.

(7) As a result of charging and discharging the battery in a thermostatic chamber at 20 degree Celsius by the method described in the above Item (6), a rise of the battery temperature was hardly observed after the end of discharge.

COMPARATIVE EXAMPLE 1-1

(1) A battery was constituted similarly to the case of the above embodiment except for changing electrode sizes, numbers of electrodes to be stacked, and battery sizes. In Table 1, the electrode size denotes the size of the negative electrode. The size of the positiveelectrode is 2 mm smaller than the negative electrode size in each side. The number of electrodes to be stacked denotes the number of positive electrodes. The number of negative electrodes is one more than the number of positive electrodes as described for the embodiment 1-1, in which two single-side-coated electrodes are included.

An energy capacity was measured by the same method as Item (6) of the embodiment. As a result of performing discharge by the same method as Item (7) of the embodiment and measuring the surface temperature of the battery, discharge was stopped for safety because the temperature was greatly raised during the discharge.

Electrode size (W1×W2): 110×170 (mm)
Number of electrodes to be stacked: 26
Battery size: 140×200×140 (mm)
Energy capacity: 85 (Wh)
Energy density: 217 (Wh/l)

Even in the case of the embodiment battery having a battery energy capacity of approximately 90 Wh, the battery surface temperature hardly rose when the battery thickness was less than 12 mm. However, the comparative example having a thickness of 14 mm showed a high surface-temperature rise. Therefore, it is clear that the organic-electrolyte battery of the present invention shows a small temperature rise even if the battery is quickly discharged and has a high safety.

[Preferable negative electrode used for secondary battery of the present invention]

In general, lithium-containing manganese oxide used for a non-aqueous secondary battery is a positive-electrode material suitable for a large scale battery. It is reported that a high-safety battery is obtained by using the lithium manganese oxide for a positive electrode compared with lithium cobalt oxide and lithium-containing nickel oxide (Like Xie et al., Mat. Res. Soc. Symp. Proc., Vol. 393, 1995, pp. 285–304). The positive-electrode material has a density and a capacity lower than those of lithium-containing cobalt-based oxide and lithium-containing nickel oxide. Therefore, to obtain a large-capacity battery, it is preferable to use A, B, or C-type negative electrodes described below and thereby improved safety is also expected.

(A-Type Negative Electrode)

In the case of preferable graphite to be used for the negative electrodes 101b and 101c as a negative-electrode active material, the (d002) spacing of (002) planes measured by the X-ray wide-angle diffraction method is normally 0.34 nm or less, preferably 0.3354 to 0.3380 nm, or more preferably 0.3354 to 0.3360 nm. When the plane spacing (d002) exceeds 0.34 nm, crystallinity lowers. Therefore, the change of potentials due to discharge of lithium ions increases and the effective capacity usable as a battery lowers.

The following are listed as materials for manufacturing the above graphites: cokes such as pitch coke and needle coke, polymers, and carbon fibers. By baking these materials at a temperature of 1,500 to 3,000 degree Celsius in accordance with the conventional method, it is possible to obtain desired graphite materials. Specifically, graphite includes mesophase-pitch-based graphite fiber, graphitized mesocarbon microbeads (hereafter referred to as graphitized MCMB), vapor-phase-epitaxial carbon fiber, and graphite whisker. Particularly, because the particles of graphitized MCMB are almost spherical, a high-density electrode to be mentioned later can be easily obtained.

The particle diameter of the above graphite is preferably 1 to 50 $\mu$m, more preferably 3 to 40 $\mu$m, or still more preferably 5 to 35 $\mu$m. If the particle diameter is less than 1 $\mu$m, it is impossible to raise the electrode density. However, if the particle diameter exceeds 50 $\mu$m, a large capacity cannot be obtained because the graphite is broken when an electrode having a small thickness of approximately 100 $\mu$m is pressed to raise the electrode density.

The negative electrodes 101b and 101c are obtained, for example, by using an organic solvent solution of a resin serving as a binder, applying the above graphite onto a metal member serving as a current collector, drying the metal member and pressing it if necessary. When using a resin as a binder, a negative electrode is obtained which is stable even at a high temperature and has a high adhesiveness with a metal member serving as a current collector.

The negative electrodes 101b and 101c thus obtained and having a porosity of 20 to 35% and an electrode density of 1.40 to 1.70 g/cm$^3$ (more preferably having an electrode density of 1.45 to 1.65 g/cm$^3$, particularly preferably having an electrode density of 1.50 to 1.65 g/cm$^3$) are easily impregnated with the electrolyte, in which lithium ions and electrons are smoothly moved. Therefore, it is possible to obtain a negative electrode having a high capacity of electrode of 400 mAh/cm$^3$ or more. By using a negative electrode having a high capacity of electrode of 400 mAh/cm$^3$ or more, it is possible to improve the battery capacity without raising the utilization ratio of a negative-electrode active material and thus the safety such as prevention of lithium from electrodeposition or the like can be easily secured.

The above resin serving as a binder binds graphite particles each other and fixes active-material particles on metallic foil. As the binder resin, the following materials can be used without limitation thereto: fluorinated resins such as polyvinylidene fluoride (PVdF) and poly-4-ethylene fluoride, fluorine rubber, SBR, acrylic resin, and polyolefins such as polyethylene and polypropylene. Among them, a resin soluble in widely used organic solvents (such as N-methylpyrrolidone, toluene, and styrene) and superior in electrolyte resistance and withstanding high-voltage are preferable, and particularly polyvinylidene fluoride (PVdF) is preferable.

A binder mixing quantity in a negative electrode is not limited. It is allowed to properly determine the binder mixing quantity in accordance with the type, particle diameter, shape, or thickness and strength of a purposed electrode. However, it is normally preferable to set the binder mixing quantity in a range of 1 to 30% of the weight of graphite.

In this embodiment, as a metal for the current collector copper foil, stainless-steel foil, or titanium foil can be used without limitation thereto. Moreover, it is possible to use materials allowing an electrode to be formed on metallic foil or between metallic materials, such as expand metal or mesh material. Among these materials, it is more preferable to use a copper foil having a thickness of 1 to 50 $\mu$m because it allows a negative electrode to be easily formed by a coating method to be mentioned later and is superior in strength and electric resistance.

A method of using polyvinylidene fluoride (PVdF) as a binder resin and a copper foil as a current collector is described below as a specific method for manufacturing the negative electrode for a non-aqueous secondary battery of this embodiment having a high capacity of electrode of 400 mAh/cm$^3$. It is needless to say that methods for manufacturing the negative electrode of this embodiment are not limited to the method.

First, a slurry is prepared by uniformly dissolving graphite in a binder-resin solution obtained by dissolving polyvinylidene fluoride (PVdF) in N-methylpyrrolidone. In this case, it is also possible to add a conductive material such as acetylene black or binder assistant such as polyvinyl pyrrolidone. Then, the obtained slurry is applied onto copper foil by a coater and dried, and an electrode layer is formed on the copper foil, and then pressed to obtain a negative electrode for the non-aqueous secondary battery, which has a thickness of 50 to 500 $\mu$m. The electrode layer is formed on both sides or either side of the copper foil according to necessity.

The negative electrode thus obtained is a high-density electrode whose capacity is hardly lowered and having a density of 1.40 to 1.70 g/cm$^3$, preferably having a density of 1.45 to 1.65 g/cm$^3$, or more preferably having a density of 1.50 to 1.65 g/cm$^3$, a porosity of 20 to 35%, and an capacity of electrode of 400 mAh/cm$^3$ or more. The density and porosity are values of an electrode layer formed on metallic foil, which can be calculated in accordance with the true densities of the graphite and binder resin in the electrode layers and the electrode density. The capacity of electrode is a capacity expressed on the basis of the volume of electrode layers.

(B-Type Negative Electrode)

A graphite-based particle used for the negative electrodes 101b and 101c as a negative-electrode active material has a double structure obtained by covering the surface of a graphite particle with amorphous carbon. By using the double-structure graphite-based particle, deterioration of charge rate probably due to decomposition of electrolyte is substantially prevented and a graphite structure is prevented from breaking.

In the negative electrodes 101b and 101c, the (d002) spacing of (002) planes of a graphite-based particle used as an active material is normally 0.34 nm or less, more preferably 0.3354 to 0.3380 nm, and still more preferably 0.3354 to 0.3360 nm as measured by the X-ray wide-angle diffraction method. When the plane interval exceeds 0.34 nm, crystallinity lowers and thereby, the change of potentials due to discharge of lithium ions increases and the effective capacity usable as a battery lowers.

The plane spacing of amorphous carbon layers coating the graphite-based particles is such that the (d002) spacing of (002) planes is 0.34 nm or more, preferably about 0.34 to 0.38 nm, more preferably about 0.34 to 0.36 nm as measured by the X-ray wide-angle diffraction method. When this value is below 0.34 nm, crystallinity is too large, and thereby, charging rate lowers probably due to decomposition of electrolyte, and carbon material is broken due to increase/decrease of the plane distance with repeated charging and discharging. On the other hand, when this value exceeds 0.38, the displacement of lithium ions is restricted and thus the effective capacity usable as a battery lowers.

Materials for manufacturing the above graphite-based particles include cokes such as pitch coke and needle coke, polymers, and carbon fibers. By baking these materials in accordance with the conventional method at a temperature of 1.500 degree Celsius to 3,000 degree Celsius, desired graphite-based particles can be obtained.

As materials for forming a covering layer of graphite particle, organic materials such as pitches and polymers can be used. Amorphous carbon for the covering layer can be obtained by covering the surface of the graphite-based particle material obtained in accordance with the above method with a liquid organic material (such as melted pitch) and baking the covering organic material at a temperature of 500 degree Celsius to 2,000 degree Celsius to carbonize it.

Furthermore, the above double-structure graphite-based particles have a high capacity per weight of 350 mAh/g and achieve a high initial efficiency of 90% or more. Therefore, it is possible to improve the battery capacity without raising the utilization ratio of a negative-electrode active material and thereby, the safety such as prevention of lithium from electrodeposition can be easily secured.

The diameter of a double-structure active-material particle comprising the above graphite-based particle and its covering layer is preferably 1 to 50 $\mu$m, more preferably 3 to 40 $\mu$m, and still more preferably 5 to 35 $\mu$m. When the particle diameter of the double-structure body is less than 1 $\mu$m, it is impossible to improve the electrode density. When the particle diameter exceeds 50 $\mu$m, a large capacity cannot be obtained because a double-structure active-material particle is broken when an electrode having a small thickness of 100 $\mu$m is pressed to raise an electrode density.

The negative electrodes 101b and 101c are obtained by using an organic solvent solution of a resin serving as a binder, thereby applying the above double-structure active-material particles onto a metal serving as a current collector, drying them, and pressing them if necessary. When using a resin as a binder, a negative electrode is obtained which is stable even at a high temperature and has high adhesiveness with a metal member serving as a current collector.

The negative electrodes 101b and 101c obtained as described above and having a porosity of 20 to 35%, an electrode density of 1.20 to 1.60 g/cm$^3$ (more preferably having a porosity of 1.35 to 1.60 g/cm$^3$ or particularly preferably having a porosity of 1.40 to 1.60 g/cm$^3$) are easily impregnated with electrolyte, in which lithium ions and electrons are smoothly moved. Therefore, it is possible to obtain a negative electrode having a high capacity of electrode of 400 mAh/cm$^3$ or more. A negative electrode having a high capacity of electrode of 400 mAh/cm$^3$ or more is more effective used in view of the capacity and safety of a battery as described below.

The above resin serving as a binder binds double-structure active-material particles each other and fixes active-material particles on the metallic foil. As binder resins the following materials can be used without limitation thereto: fluorinated resins such as polyvinylidene fluoride (PVdF) and poly-4-ethylene fluoride, fluorine rubber, SBR, acrylic resin, and polyolefins such as polyethylene or polypropylene. Among them, a resin soluble in widely used organic solvents (such as N-methylpyrrolidone, toluene, and styrene) and superior in electrolyte resistance and withstanding high-voltage is preferable, and particularly polyvinylidene fluoride (PVdF) is preferable.

A binder mixing quantity in a negative electrode is not limited. It is allowed to properly determine the binder mixing quantity in accordance with the type, particle diameter, shape, or thickness and strength of a purposed electrode. However, it is normally preferable to set the binder mixing quantity in a range of 1 to 30% of the weight of active-material particles.

In this embodiment, as a metal for current collector a copper foil, stainless-steel foil, or titanium foil can be used without limitation thereto. Moreover, it is possible to use materials allowing an electrode to be formed on a metallic foil or between metallic materials, such as expand metal or steel. Among these materials, it is more preferable to use a copper foil having a thickness of 1 to 50 $\mu$m because it allows a negative electrode to be easily formed by a coating method to be mentioned later and is superior in strength and electric resistance.

A method of using polyvinylidene fluoride (PVdF) as a binder resin and a copper foil as a current collector is described below as a specific method for manufacturing the negative electrode for a non-aqueous secondary battery of this embodiment having a high capacity of electrode of 400 mAh/cm$^3$. It is needless to say that methods for manufacturing the negative electrode of this embodiment are not limited to the above method.

First, a slurry is prepared by uniformly dissolving double-structure active-material particles in a binder-resin solution obtained by dissolving polyvinylidene fluoride (PVdF) in N-methylpyrrolidone. In this case, it is also possible to add a conductive material such as acetylene black or binder assistant such as polyvinyl pyrrolidone. Then, the obtained slurry is applied onto a copper foil by a coater and dried, and an electrode layer is formed on the copper foil, and then pressed to obtain a negative electrode for the non-aqueous secondary battery, which has a thickness of 50 to 500 $\mu$m. The electrode layer is formed on both sides or either side of the copper foil according to necessity.

To manufacture a negative electrode, it is necessary to prevent graphite from breaking. For example, in the case of the above manufacturing example, it is necessary to pay attention to various conditions in the pressing step. Specifically, the following can be listed as these conditions: a pressing rate, tension, and roller curvature for pressing an electrode layer formed on a metallic foil by rollers, a dried state (remaining amount of solvent) of the electrode layer before pressing, and a pressing temperature.

It is desirable to control a dried level (remaining amount of solvent) of an electrode layer before pressed normally at 1 to 10%, preferably at 1 to 8%, and still more preferably at 2 to 5%. When these amounts of solvent remain, it is possible to improve an electrode-layer density by pressing without breaking graphite. That is, when a certain amount of solvent remains, the solvent is present on surfaces of graphite, binder, and conductive material, which supposedly improves slippage between these materials during the pressing step and resultantly an electrode-layer density can be improved without breaking graphite material.

In the conventional common sense, a solvent is regarded as an impurity and it has been considered that a remaining amount of the solvent should be minimized (a remaining amount of the solvent should be kept at 0.2% or less).

However, according to the study of the present inventor, when controlling a remaining amount of solvent within a predetermined range, negative electrode for a non-aqueous secondary battery having a high electrode density and a large capacity can be obtained compared with the case of a conventional method.

An electrode-layer pressing temperature is normally kept at ordinary temperature (25 degree Celsius) to 140 degree Celsius, preferably kept at ordinary temperature to 100 degree Celsius, or more preferably kept at ordinary temperature to 70 degree Celsius.

By previously adjusting the above conditions (particularly, a remaining amount of a solvent) on trial, it is possible to manufacture an electrode without breaking graphite, that is, an electrode can be manufactured without lowering the capacity even if the density of the electrode is raised.

The negative electrode thus obtained is a high-density electrode whose capacity is hardly lowered and having a density of 1.20 to 1.60 g/cm$^3$, preferably having a density of 1.35 to 1.60 g/cm$^3$, or more preferably having a density of 1.40 to 1.50 g/Cm$^3$, a porosity of 20 to 35%, and an capacity of electrode of 400 mAh/cm$^3$ or more. The density and porosity are values of an electrode formed on metallic foil, which can be calculated in accordance with true densities of double-structure active-material particles and a binder resin and the electrode density in the electrode layer. Also, the capacity of electrode is a capacity expressed on the basis of the volume of electrode layers.

(C-Type Negative Electrode)

The negative-electrode active material used for the negative electrodes 101b and 101c can be manufactured using carbon (hereafter referred to as "coating graphite") which is obtained by mixing at least either of artificial graphite or natural graphite with carbon having a volatile component on the surface and/or inside thereof (hereafter referred to as "volatile-component-contained carbon") and then baking them. The active material thus manufactured is substantially prevented from deterioration of the charge rate probably due to decomposition of electrolyte does not substantially occur and a graphite structure is also prevented from breaking. The coating graphite has a structure in which a volatile component derived from a volatile-component-contained carbon attaches at least a part of artificial graphite and/or natural graphite by baking a mixed material or covers at least a part of artificial graphite and/or natural graphite. It is presumed that the above attaching structure or covering structure is formed when the volatile component of the volatile-component-contained carbon once vaporizes and then attaches a part or the whole of the artificial graphite and/or natural graphite or covers a part or the whole of the artificial graphite and/or natural graphite. In other words, it is presumed that a part or the whole of the artificial graphite and/or natural graphite is covered in a gaseous phase.

In general, artificial graphite and natural graphite serving as negative-electrode materials have a problem of damaging the stability of the electrolyte because they respectively have a large specific surface area though they respectively have a large capacity usable as a battery. However, to cover artificial graphite or natural graphite in a gaseous phase, it is presumed that the covering thickness is very small and uniform. As a result, it is possible to substantially decrease the specific surface area of artificial graphite or natural graphite without substantially lowering a large capacity of the artificial graphite or natural graphite and therefore, it is presumed that high-capacity coating graphite can be obtained.

It is possible to form coating graphite in a liquid phase. That is, by soaking graphite serving as a core material in liquid-phase "carbon for forming a coat", it is possible to obtain coating graphite. Also in this case, by decreasing a ratio of [coat-forming volatile component]/[core material+ coat-forming volatile component] (this ratio is hereafter referred to as "coating ratio"), it is expected that higher-capacity carbon may be obtained similarly to the case of the gaseous phase. Actually, however, forming a thin covering layer in a liquid phage is not suitable, because a problem occurs that the covering layer is separated from a core material or the covering layer is lacking in uniformity and the specific surface area of coating graphite increases.

As volatile-component-contained carbon used for this embodiment, the following can be listed: carbon (volatile-component-contained carbon) serving as a core material a part or the whole of which is covered with coat-forming volatile component (such as coal tar pitch), mesocarbon micro beads, carbon fiber, mesophase pitch, isotropic pitch, resin, and a mixture of these materials. Among them, the volatile-component-contained carbon is preferable from the viewpoint of cost. It is preferable that the coating ratio of the volatile-component-contained carbon is 0.01 or more, it is more preferable that the ratio is 0.05 or more, or it is still more preferable that the ratio is not less than 0.05 and not more than 0.3.

If the coating ratio of the volatile-component-contained carbon is too low, the carbon does not sufficiently cover or attach a part or the whole of artificial graphite and/or natural graphite because the amount of a volatile component to be evaporated is small when the material is baked while mixed with artificial graphite and/or natural graphite. However, if the coating ratio is too large, it is difficult to obtain a sufficient capacity because the capacity of a low-potential portion depending on a core material lowers when a battery is manufactured. The amount of the "volatile component" was determined by the following: A carbon component derived from heavy oil covering the circumference of carbon serving as a core material was solvent-analyzed in accordance with the method specified in JIS K2423. Firstly, a quinoline component (%) was measured and then {100-(quinoline component)} was defined as a quinoline soluble component(%). The quinoline soluble component is the above "amount of coat-forming volatile component" and the above "coating ratio" can be calculated by using the amount of coat-forming volatile component and the carbon serving as a core material.

Volatile-component-contained carbon in which a part or the whole of carbon serving as a core material is covered with a volatile component is manufactured as described below. That is, carbon particles serving as a core material is soaked in coal-based or oil-based heavy oil such as tar or pitch preferably at 10 to 300 degree Celsius to separate the carbon from the heavy oil, and then an organic solvent is added to the separated carbon to clean them preferably at 10 to 300 degree Celsius. By properly adjusting the mixed ratio between the carbon particles and the heavy oil, it is possible to omit the above cleaning step. However, it is preferable to execute the cleaning step. When omitting the cleaning step, a problem may occur that particles of the volatile-component-contained carbon adhere or cohere each other when baked or the volatile component does not uniformly attach or cover the core material. Moreover, when manufacturing volatile-component-contained carbon while soaking carbon in heavy oil at a temperature exceeding 300 degree Celsius and accelerating the polycondensation of heavy oil, the same problem may occur. Furthermore, it is possible to perform the baking step at 300 to 600 degree Celsius instead of the above cleaning step. In this case, however, volatile-component-contained carbon does not uniformly attach or cover a core material though particles do not easily adhere or cohere each other.

To manufacture volatile-component-contained carbon, a mechanical stirring method using a nauta mixer, ribbon mixer, screw-type kneader, or widely used mixer is used as a method for mixing carbon particles with heavy oil.

Though the mixing ratio between artificial graphite and/or natural graphite and volatile-component-contained carbon mainly depends on the amount of the volatile component of the carbon, it is normally 10 to 1,000 parts by weight of artificial graphite and/or natural graphite, more preferably 10 to 300 parts by weight of artificial graphite and/or natural graphite, still more preferably 30 to 100 parts by weight of artificial graphite and/or natural graphite, to 100 parts by weight of the volatile-component-contained carbon. When the amount of artificial graphite and/or natural graphite is too small, the ratio of the coating-graphite component that should serve as a higher capacity part in carbon for a battery lowers and thereby, the capacity is not sufficiently raised. However, when the amount of artificial graphite and/or natural graphite is too large, the amount of a volatile component to be evaporated when baking a mixture relatively decreases. Therefore, artificial graphite and/or natural graphite is not sufficiently covered and a desired specific surface area of carbon increases.

A mixture of artificial graphite and/or natural graphite and volatile-component-contained carbon is baked in a reducing atmosphere or inert gas flow, or a non-oxidation atmosphere such as a closed state containing an inert gas or vacuum state. Because the mixture is baked in order to cover a part or the whole of artificial graphite and/or natural graphite by evaporating a volatile component in multilayer carbon in a gaseous phase, it is more preferable to bake the mixture in an atmosphere in which the volatile component of volatile-component-contained carbon easily stays, that is, in a reducing atmosphere or inert-gas contained state. Carbonization in a vacuum state has an effect of removing a surface functional group of carbon and an advantage that retention can be reduced but has a disadvantage that a volatile component is easily lost from the volatile-component-contained carbon.

The above mixture is baked to be carbonized normally at a temperature of about 600 degree Celsius to 2,000 degree Celsius, and more preferably at a temperature of 900 degree Celsius to 1,300 degree Celsius. The above mixture is baked to be graphitized normally at a temperature of about 2,000 degree Celsius to 3,000 degree Celsius, more preferably at a temperature of about 2,500 degree Celsius to 3,000 degree Celsius. An ungraphitized part may remain in a baked product depending on a mixture baking condition and the remaining ungraphitized part may slightly influence the characteristic of a negative electrode. However, this does not substantially matter. However, to further improve the negative-electrode characteristics, it is more preferable to use graphite as a core material of volatile-component-contained carbon or further improve the graphitization degree of a baked product by baking at a higher temperature.

It is possible to select a temperature-rise rate when baking a mixture from a range of 1 to 300 degree Celsius/hr at any baking temperature. The baking time ranges between 6 hours and one month.

The particle diameter of coating graphite used as a negative-electrode active material in this embodiment is normally 1 to 50 $\mu$m, more preferably 3 to 40 $\mu$m, and still more preferably 5 to 35 $\mu$m. When the particle diameter of the coating graphite is too small, it is impossible to raise an electrode density. However, when the particle diameter is too large, a large capacity is not obtained because covering-graphite particles are broken when performing pressing to raise an electrode density in order to manufacture a thin electrode having a thickness of approximately 100 $\mu$m.

The negative electrodes 101b and 101c are obtained by using an organic solvent solution of a resin serving as a binder, applying the coating-graphite particles onto a metal member serving as a current collector, drying them, and pressing them if necessary. When using a resin as a binder, a negative electrode is obtained which is stable even at a high temperature and has a high adhesiveness with a metal member serving as a current collector.

The negative electrodes 101b and 101c thus obtained and having a density of 1.20 to 1.60 g/cm$^3$ (more preferably having a density of 1.35 to 1.60 g/cm$^3$) and a porosity of 20 to 35% are easily impregnated with electrolyte, in which lithium ions and electrons are smoothly moved. Therefore, it is possible to obtain a negative electrode having a high capacity of electrode of 400 mAh/cm$^3$ or more. Use of the negative electrode having a high capacity of electrode of 400 mAh/cm$^3$ or more is more effective for the battery capacity and safety described below.

The above resin serving as a binder binds coating-graphite particles each other and binds and fixes active-material particles onto metallic foil. As resins serving as binders the following can be used without limitation thereto: fluorinated resins such as polyvinylidene fluoride (PVdF) and poly-4-ethylene fluoride, fluorine rubber, SBR, acrylic resin, and polyolefins such as polyethylene and polypropylene. Among these materials, a material is preferable which is particularly soluble in organic solvents for general purposes (such as N-methylpyrrolidone, toluene, and styrene) and superior in electrolyte resistance and withstanding a high-voltage. For example, polyvinylidene fluoride (PVdF) is preferable.

A binder mixing quantity is not limited. It is allowed to properly determine a binder mixing quantity for a negative electrode in accordance with the type, particle diameter, shape, purposed electrode thickness, or strength of a coating-graphite particle. However, it is normally preferable to use a rate of 1 to 30% of the weight of active-material particles.

In this embodiment, as a metal used as a current collector a copper foil, stainless-steel foil, or titanium foil can be used without limitation thereto. It is possible to use a metal allowing an electrode to be formed on metallic foil or between metal materials such as expand metal or steel. Among them, copper foil having a thickness of 1 to 50 $\mu$m is more preferable because the foil allows a negative electrode to be easily manufactured in accordance with the coating method to be described later and is superior in strength and electric resistance.

A method of using polyvinylidene fluoride (PVdF) as a binder resin and copper foil as a current collector is described below as a specific method for manufacturing the negative electrode for a non-aqueous secondary battery of this embodiment having a high capacity of electrode of 400 mAh/cm$^3$. It is needless to say that methods for manufacturing the negative electrode of this embodiment are not limited to the above method.

First, a slurry is prepared by uniformly dissolving coating graphite in a binder-resin solution obtained by dissolving polyvinylidene fluoride (PVdF) in N-methylpyrrolidone. In this stage, it is also possible to add a conductive material such as acetylene black or binder assistant such as polyvinyl pyrrolidone. Then, the obtained slurry is applied onto copper foil by a coater and dried, and an electrode layer is formed on the copper foil, and then pressed to obtain a negative electrode having a thickness of 50 to 500 $\mu$m for the non-aqueous secondary battery. The electrode layer is formed on both sides or either side of the copper foil according to necessity.

The negative electrode thus obtained is a high-density electrode having a density of 1.20 to 1.60 g/cm$^3$ (more preferably having a density of 1.35 to 1.60 g/cm$^3$) and an capacity of electrode of 400 mAh/cm$^3$ or more, but hardly lowering a capacity. The density and porosity are values of an electrode layer formed on metallic foil, which can be calculated in accordance with coating-graphite particles in an electrode and the true density of a binder resin, and an electrode density. The capacity of electrode is a capacity expressed on the basis of the volume of electrode layers.

When densities of A-, B, and C-type negative electrodes are too low, a sufficient capacity of electrode cannot be obtained. However, when the densities are too high, this is not preferable because a capacity is lowered due to breakdown of graphite. When a porosity is too low, a sufficient rate characteristic is not obtained. However, when the porosity is too high, a sufficient capacity of electrode is not obtained.

The above "capacity of electrode" is a capacity of an electrode defined by sufficiently doping and dedoping lithium. For example, the dedoping capacity is measured by assembling electrochemical cells using a lithium metal as an counter electrode and a reference electrode, incurring a constant voltage to the counter electrode at a potential of 1 mv vs. the lithium-metal potential in a non-aqueous electrolyte to be mentioned later, doping the lithium until a current value becomes small enough (e.g. 0.01 mA/cm$^2$), then dedoping the lithium up to 2 V relative to the lithium potential at a sufficiently slow rate (e.g. 0.25 mA/cm$^2$). By dividing the dedoping capacity by an electrode volume, the capacity of electrode referred to in the present invention is obtained. Now, the description of each of the A, B, and C-type negative electrodes is completed.

The present invention is further specifically described below with the reference to an embodiment of each of the A, B, and C-type negative electrodes.

[A-Type Negative Electrode]

(Embodiment 2-1)

(1) A positive-electrode mixture slurry was obtained by mixing 100 parts by weight of spinel-type LiMn$_2$O$_4$ (made by SEIMI CHEMICAL, product No. M063), 10 parts by weight of acetylene black, and 5 parts by weight of polyvinylidene fluoride (PVdF) with 100 parts by weight of N-methylpyrrolidone (NMP). A positive electrode was obtained by applying the slurry to both sides of aluminum foil having a thickness of 20 $\mu$m and serving as a current collector, and by drying and pressing the foil. FIG. 6 is an illustration of an electrode. In the case of this embodiment, the coating area (W1×W2) of an electrode 101 was 268×178 mm$^2$ and the slurry was applied to both sides of a current collector 102 of 20 $\mu$m thickness at a thickness of 128 $\mu$m. As a result, the electrode thickness t was 276 $\mu$m. One of the edge portions of the shorter side of the current collector 102 was not coated in 1 cm width and a tab 103 (aluminum with a thickness of 0.1 mm and a width of 6 mm) was welded.

(2) A negative-electrode slurry was obtained by mixing 100 parts by weight of graphitized mesocarbon microbeads (MCMB, made by OSAKA GAS CHEMICAL, product No. 6-28) and 10 parts by weight of PVdF with 90 parts by weight of NMP. A negative electrode was obtained by applying the slurry to both sides of a copper foil having a thickness of 14 $\mu$m and serving as a current collector, and by drying and then pressing the foil. Before pressing the foil, 4.3% of NMP was left in the electrode. The electrode density was 1.58 g/cm$^3$, and previous evaluation of the capacity of electrode of the electrode was 430 mAh/cm$^3$. Because the shape of the electrode was the same as that of the above-described positive electrode, the negative electrode is described below with reference to FIG. 6. In the case of this embodiment, the coating area (W1×W2) of the electrode 101 was 270×180 mm$^2$ and the slurry was applied to both sides of the current collector 102 of 14 $\mu$m thickness at a thickness of 72 $\mu$m. As a result, the electrode thickness t was 158 $\mu$m. One of the edge portions of the shorter side of the current collector 102 was not coated in 1 cm width and a tab 103 (nickel with a thickness of 0.1 mm and a width of 6 mm) was welded.

The slurry was applied to only one side by the same method and a single-sided electrode having a thickness of 86 $\mu$m was formed by the same method except for the application of the slurry. The single-sided electrode was positioned at the outermost in the stacked electrodes described in Item (3) (101c in FIG. 2).

(3) An electrode-stacked body was formed by alternately stacking 10 positive electrodes and 11 negative-electrodes (including two single-sided electrodes) obtained in the above Item (1) with a separator 104 (made by TONEN TAPIRUSU, porous polyethylene) held between each of the layers.

Figure 4:
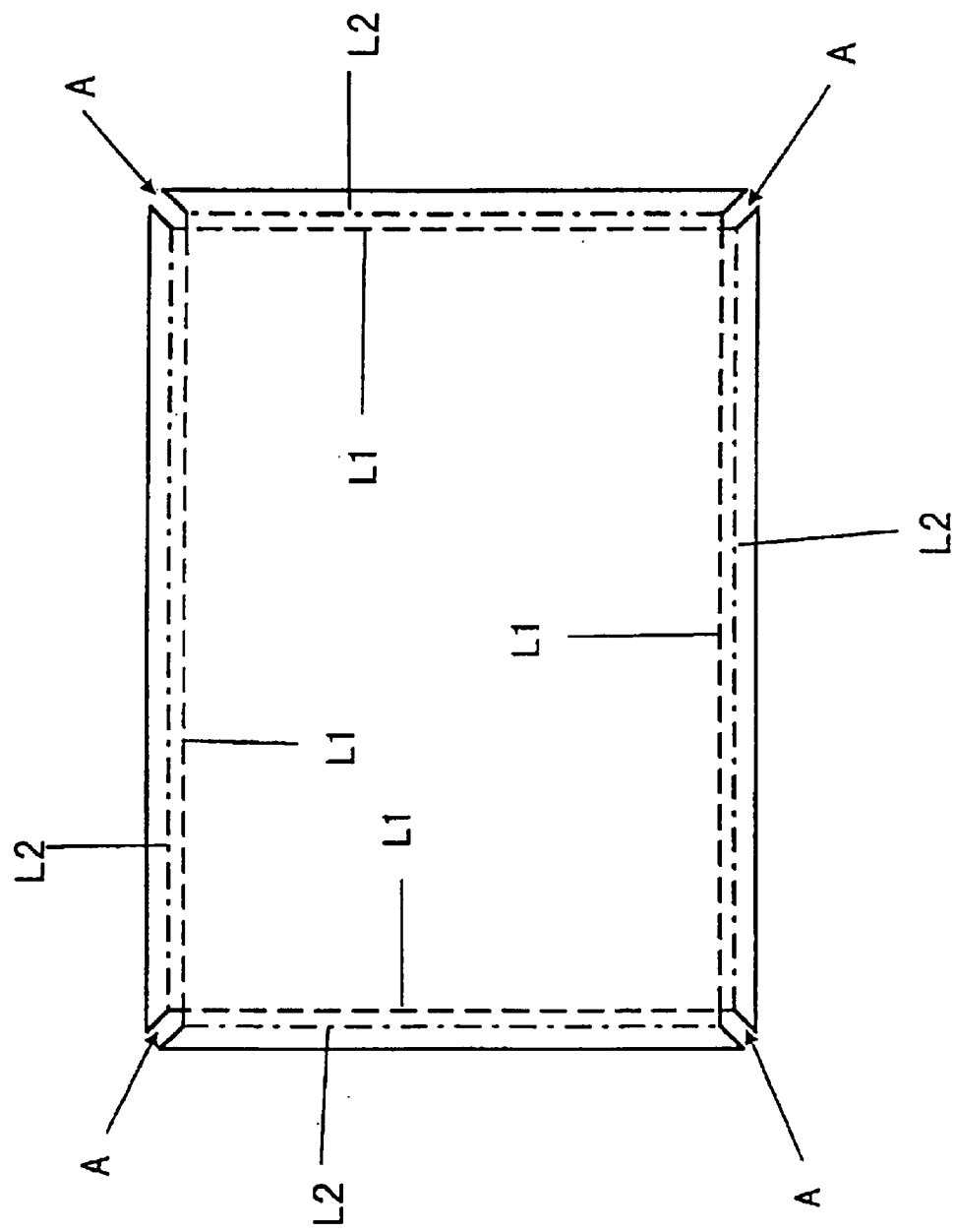
FIG. 4 illustrates a method for manufacturing the bottom case shown in FIG. 1.
Figure 5:
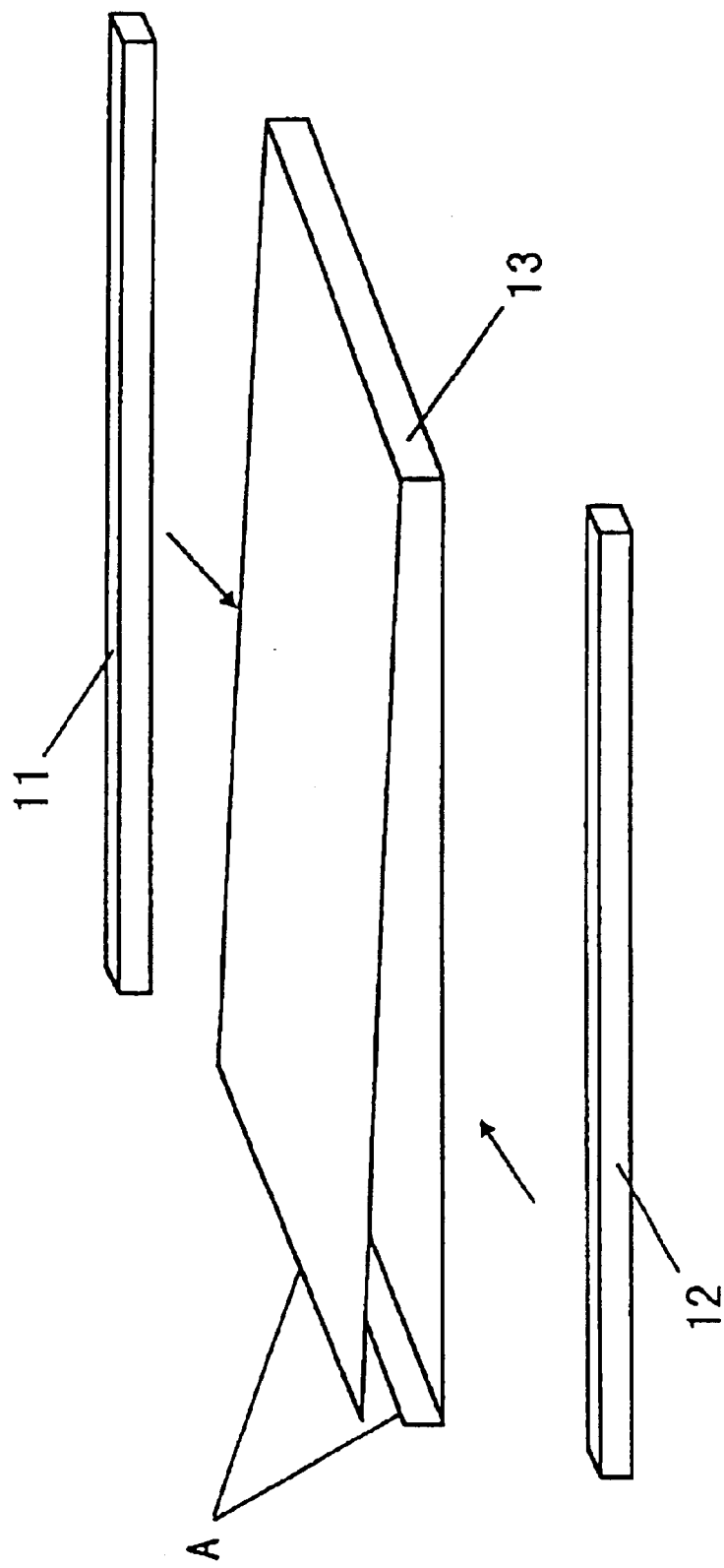
FIG. 5 illustrates another method for manufacturing a battery case of a non-aqueous secondary battery of the present invention.

(4) The bottom case 2 of the battery (refer to FIG. 1) was formed by bending a thin plate made of SUS304 having the shape shown in FIG. 4 and a thickness of 0.5 mm inward along the broken lines L1 and moreover bending the thin plate outward along the alternate long and short dash lines L2, thereafter arc-welding the corners A. The upper case 1 of the battery was formed of a thin plate made of SUS304 having a thickness of 0.5 mm. A positive electrode and a negative electrode 3 and 4 made of SUS304 (diameter of 6 mm) and a safety-vent hole (diameter of 8 mm) were formed on the upper case 1, and the positive and negative electrodes 3 and 4 were insulated from the upper case 1 by a polypropylene packing.

(5) Each positive-electrode tab 103a of the electrode-stacked body made in the above Item (3) was welded to the positive-electrode tab 3 and each negative-electrode tab 103b was welded to the negative-electrode tab 4 through a connection line and then, the electrode-stacked body was set to the battery bottom case 2 and fixed by an insulating tape to laser-weld the overall circumference along the edge A in FIG. 1. Thereafter, a solution made by dissolving LiPF$_6$ at a concentration of 1 mol/l in a solvent obtained by mixing ethylene carbonate and diethyl carbonate at a weight ratio of 1:1 was poured through a safety-vent hole as electrolyte and the hole was closed by using an aluminum foil having a thickness of 0.1 mm.

(6) The formed battery has a size of 300 mm×210 mm×6 mm. The battery was charged by a constant-current/constant-voltage charging for 18 hours, in which the battery was charged up to 4.3 V by a current of 3 A and then charged by a constant voltage of 4.3 V. Then, the battery was discharged to 2.0 V by a constant current of 3 A. The discharge capacity was 27.5 Ah, the energy capacity was 99 Wh, and the volume energy density was 262 Wh/l.

(7) As a result of charging the battery and discharging the battery at a current of 30A in a thermostatic chamber at 20 degree Celsius by the method described in the above Item (6), rise of the battery temperature at the end of discharge was small compared with the case of the assembled prismatic battery (thickness of 12 mm or more) having the same capacity.

COMPARATIVE EXAMPLE 2-1)[COMPARISON WITH EMBODIMENT 2-1

A positive electrode was formed which was the same as that of the embodiment 2-1 except that slurry was applied to both sides of a current collector 102 at a thickness of 120 $\mu$m and the electrode thickness t was set to 260 $\mu$m.

Then, a negative electrode was obtained by applying negative-electrode mixture slurry same as that of the embodiment 2-1 to both sides of the current collector 102 in a condition different from that of the embodiment 2-1, drying the current collector 102, and then pressing it. Before pressing the current collector 102, 0.2% of NMP was left on the electrode. The electrode density was 1.39 g/cm$^3$ and the previous evaluation of the capacity of electrode of the electrode was 372 mAh/cm$^3$. In the case of the comparative example, the coating area (W1×W2) of an electrode 101 is 270×180 mm$^2$ and slurry was applied to both sides of the current collector 102 of 14 $\mu$m thickness at a thickness of 80 $\mu$m. As a result, the electrode thickness t was 174 $\mu$m. The only one side was coated in accordance with the same method and a single-sided electrode of 94 $\mu$m thickness was formed by the same method except for the single-sided coating. Other points were the same as the case of the embodiment 2-1.

Thereafter, as a result of forming a battery in accordance with the same method as the case of the embodiment 2-1 and measuring the capacity, it showed 25.8 Ah. The energy capacity was 93 Wh and the volume energy density was 249 Wh/l that was lower than the case of the embodiment 2-1.

[B-Type Negative Electrode]
(Formation of Electrode)

An electrode was formed by the following materials: double-structure active-material particles used as a negative-electrode active material and obtained by covering the surface of graphite particles with amorphous carbon, acetylene black (trade name: DENKA BLACK; made by DENKIKAGAKU KOGYOU Co., Ltd.) used as a conductive material, and a solution used as a binder and obtained by dissolving polyvinylidene fluoride (PVdF) (product name: KF#1100; made by Kureha Chemical Industry Co., Ltd.) in N-methylpyrrolidone. That is, negative electrodes 1 to 7 respectively having a thickness of 100 $\mu$m were formed by applying the polyvinylidene fluoride (PVdF) solution to copper foil having a thickness of 14 $\mu$m serving as a current collector and then, drying the foil at 80 degree Celsius for 15 min. and continuously pressing the foil by a roller press having a radius of curvature of 30 cm while making N-methylpyrrolidone remain.

An electrode 8 was formed similarly to the case of the electrode 1 except for using graphitized MCMB (made by OSAKA GAS CHEMICAL Co., Ltd.; product No. 6-28).

Table 1 shows the diameters (mm) of the obtained double-structure active-material particles and the (d002) spacing of (002) planes of the graphite particles and its covering carbon layer measured by the X-ray wide-angle diffraction method (unit is nm in both case). Table 2 shows electrode densities, initial capacities, and remaining amount of solvent of the negative electrodes 1 to 8. Mixing ratios of electrode layers are 90 wt % of graphite particles and 10 wt % of polyvinylidene fluoride (PVdf).

TABLE 1

| Double-structure material: No. | Graphite particle diameter ($\mu$m) | Graphite particle (d002) | Covering carbon layer (d002) |
|---|---|---|---|
| 1 | 1 | 0.335 | 0.340 |
| 2 | 1 | 0.335 | 0.380 |
| 3 | 1 | 0.337 | 0.340 |
| 4 | 20 | 0.335 | 0.360 |
| 5 | 20 | 0.340 | 0.380 |
| 6 | 50 | 0.335 | 0.340 |
| 7 | 50 | 0.336 | 0.380 |

TABLE 2

| Negative electrode: No. | Negative-electrode active material | Electrode density (g/cm$^3$) | Initial capacity (mAh/cm$^3$) | Remaining amount of solvent (wt %) |
|---|---|---|---|---|
| 1 | No. 1 | 1.40 | 435 | 2.1 |
| 2 | No. 2 | 1.45 | 440 | 3.4 |
| 3 | No. 3 | 1.53 | 465 | 5.0 |
| 4 | No. 4 | 1.60 | 468 | 10.0 |
| 5 | No. 5 | 1.45 | 440 | 1.0 |
| 6 | No. 6 | 1.42 | 438 | 4.8 |
| 7 | No. 7 | 1.35 | 430 | 2.7 |
| 8 | MCMB | 1.39 | 370 | 2.5 |

As shown in Tables 1 and 2, the negative electrodes 1 to 7 using double-structure active-material particles respectively have an electrode density of 1.35 to 1.60 g/cm$^3$ and a capacity of 400 mAh/cm$^3$ or more. Therefore, they respectively have a large capacity compared with that of the electrode 8 using graphitized MCMB.

(Embodiment 3-1)

(1) A positive-electrode mixture slurry was obtained by mixing 100 parts by weight of spinel-type LiMn$_2$O$_4$ (made by SEIMI CHEMICAL; product No. M063), 10 parts by weight of acetylene black, and 5 parts by weight of polyvinylidene fluoride (PVdF) with 100 parts by weight of N-methylpyrrolidone (NMP). A positive electrode was obtained by applying the slurry to both sides of an aluminum foil having a thickness of 20 $\mu$m serving as a current collector, and drying and pressing the foil. FIG. 6 is an illustration of the electrode. In the case of this embodiment, the coating area (W1×W2) of the electrode 101 was 268× 178 mm$^2$ and slurry was applied to both sides of the current collector 102 of 20 $\mu$m thickness at a thickness of 128 $\mu$m. As a result, the electrode thickness t was 276 $\mu$m. One of the edge portions of the shorter side of the current collector 102 was not coated in 1 cm width and a tab 103 (aluminum with a thickness of 0.1 mm and a width of 6 mm) was welded.

(2) A negative electrode same as the above negative electrode 1 except for the coating thickness of an electrode was used. Because the shape of the negative electrode is the same as the above positive electrode, the negative electrode is described by referring to FIG. 6. In the case of this embodiment, the coating area (W1×W2) of the electrode 101 was 270×180 mm$^2$ and slurry was applied to both sides of the current collector 102 of 14 $\mu$m thickness at a thickness of 72 $\mu$m. As a result, the electrode thickness t was 158 $\mu$m. One of the edge portions of the shorter side of the current collector 102 was not coated in 1 cm width and a tab 103 (nickel with a thickness of 0.1 mm and a width of 6 mm) was welded.

Only one side was coated in accordance with the same method and a single-sided electrode of 86 $\mu$m thickness was formed by the same method except for the single-sided coating. The single-sided electrode was positioned at the outermost in the electrode-stacked body in Item (3) (101c in FIG. 2).

(3) An electrode-stacked body was formed by alternately stacking 10 positive electrodes and 11 negative electrodes (including two single-sided electrodes) obtained in the above Item (1) with a separator 104 (made by TONEN TAPIRUSU Co., Ltd.; made of porous polyethylene) held between each of the layers as shown in FIG. 2.

(4) A bottom case 2 (refer to FIG. 1) of a battery was formed by bending a thin plate made of SUS304 having a thickness of 0.5 mm and having the shape shown in FIG. 4 inward along the broken lines L1 and moreover bending it outward along the alternate long and short dash lines L2, and then arc-welding the corners A. The upper case 1 of the battery was also formed of a thin plate made of SUS304 having a thickness of 0.5 mm. Furthermore, positive electrode and negative electrode 3 and 4 made of SUS304 (diameter of 6 mm) and a safety-vent hole (diameter of 8 mm) were formed on the upper case 1 and the positive and negative electrodes 3 and 4 were insulated from the upper case 1 by a polypropylene packing.

(5) Each positive-electrode tab 103a of the electrode-stacked body formed in the above Item (3) was welded to the positive-electrode tab 3 and each negative-electrode tab 103b of it was welded to the negative-electrode tab 4 through a connection line and the electrode-stacked body was set to the bottom case 2 and fixed by an insulating tape to laser-weld the entire circumference along the edge A in FIG. 1. Thereafter, a solution made by dissolving $LiPF_6$ at a concentration of 1 mol/l in a solvent obtained by mixing ethylene carbonate and diethyl carbonate at a weight ratio of 1:1 was poured through a safety-vent hole as electrolyte and the hole was closed by using an aluminum foil having a thickness of 0.1 mm.

(6) The formed battery has a size of 300 mm×210 mm×6 mm. The battery was charged by a constant-current/constant-voltage charging for 18 hours, in which the battery was charged up to 4.3 V by a current of 3 A and then charged by a constant voltage of 4.3 V. Then, the battery was discharged to 2.0 V by a constant current of 3 A. The discharge capacity was 27.6 Ah, the energy capacity was 99 Wh, and the volume energy density was 263 Wh/l.

(7) As a result of charging the battery and discharging the battery at a current of 30A in a thermostatic chamber at 20 degree Celsius by the method described in the above Item (6), rise of the battery temperature at the end of discharge was small compared with the case of assembled prismatic battery (thickness of 12 mm or more) having the same capacity.

(Embodiment 3-2)

A positive electrode was formed which was the same as that of the embodiment 3-1 except that slurry was applied to both sides of a current collector 102 at a thickness of 130 $\mu$m and the electrode thickness t was 280 $\mu$m.

Then, a negative electrode was used which was the same as the above negative 4 except for the coating thickness of the electrode. The coating area (W1×W2) of an electrode 101 is 270×180 $mm^2$ and slurry is applied to both sides of the current collector 102 of 14 $\mu$m at a thickness of 70 $\mu$m.

As a result, the electrode thickness t is 154 $\mu$m. T slurry was applied to only one side by the same method and a single-sided electrode having a thickness of 84 $\mu$m was formed in accordance with the same method except for the single-sided application of the slurry. Other points were the same as those of the embodiment 3-1.

As a result of forming a battery by the same method as the case of the, embodiment 3-1 and measuring the capacity, the capacity was 28.2 Ah. T the energy capacity was 102 Wh and the volume energy density was 269 Wh/l.

Furthermore, a battery was formed under the same condition as the case of each of the above embodiment by using the above negative electrodes 2, 3, and 5 to 7 except for the negative electrodes 1 and 4 and the result same as the above was obtained.

COMPARATIVE EXAMPLE 3-1) [FOR COMPARISON WITH EMBODIMENTS 3-1 and 3-2

A positive electrode was formed which was the same as that of the embodiment 3-1 except that slurry was applied to both sides of a current collector 102 and the electrode thickness t was 260 $\mu$m.

Then, a negative electrode was used which was same as the above negative electrode 8 except for the coating thickness of the electrode. In the case of this comparative example, the coating area (W1×W2) of an electrode 101 was 270×180 $mm^2$ and slurry was applied to both sides of the current collector 102 of 14 $\mu$m thickness at a thickness of 80 $\mu$m. As a result, the electrode thickness t was 174 $\mu$m. A slurry was applied to only one side by the same method and a single-sided electrode of 94 $\mu$m was formed in accordance with the same method except for the single-sided application of the slurry. Other points were the same as the case of the embodiment 3-1.

As a result of forming a battery in accordance with the same method as the case of the embodiment 3-1 and measuring the capacity, the capacity was 25.8 Ah. The energy capacity was 93 Wh and the volume energy density was 249 Wh/l which were lower than the case of the embodiment 3-1.

[C-Type Negative Electrode]

(Formation of Electrode)

Fifty grams of artificial graphite ("KS-44" made by RONZA Co., Ltd., central particle diameter D50=20.1 mm, particle size distribution of 0.1 to 150 mm, d002=0.336 nm, Lc=110 nm, La-105 nm, specific surface area=8.2:$m^2$/g, R value=0.23, true specific gravity of 2.25 $g/cm^3$) and 5 g of coal tar pitch from which primary QI was previously removed and which had a softening point of 80 degree Celsius (quinoline-insoluble component=trace, toluene-insoluble component=30%), and 50 g of tar middle oil were poured in a 500 ml separable flask and distilled at 200 degree Celsius and 10 Torr. After recovering tar middle oil, distillation was stopped to obtain pitch-coating graphite.

Because the measured value of the quinoline-soluble component of the obtained pitch coating graphite was 6.81, the coating ratio of coat-forming carbon (volatile-component contained carbon) was equal to 0.068. A coating layer was carbonized by mixing 100 parts by weight of artificial graphite ("KS-44" made by RONZA Co., Ltd.; the property was the same as the above mentioned) with 100 parts by weight of the pitch coating graphite and heat-treating the mixture in a nitrogen atmosphere at 1,200 degree Celsius for 1 hour (temperature rise rate of 50 degree Celsius/hour). The specific surface area of the obtained coating graphite particles was 2.5 $m^2$/g and the average particle diameter was 20.3 mm. An electrode was formed by using the coating-graphite particles as a negative-electrode active material, acetylene black ("DENKA BLACK" made by DENKI KAGAKU KOGYO K. K.) as a conductive material, and a solution obtained by dissolving polyvinylidene fluoride ("KF#1101" made by Kureha Chemical Industry Co., Ltd.) in N-methylpyrrolidone as a binder.

In this case, the blending ratio was set to the following ratio; coating-graphite particles: acetylene black: polyvinylidene fluoride=87:3:10 (weight ratio).

Three types of negative electrodes 1' to 3' respectively having a thickness of 100 μm were formed by applying the above solution to copper foil of 14 μm thickness with various thickness and then, drying it at 80 degree Celsius for 15 min, and continuously pressing it with a roller press having a radius of curvature of 0.30 cm.

A capacity test was performed in accordance with the above method by using the above negative electrodes. As an electrolyte, a solution was used which was obtained by dissolving $LiPF_6$ having a concentration of 1 mol/kg in a mixed solvent consisting of a ratio of ethylene carbonate dimethyl carbonate: methyl ethyl carbonate=7:6:6 (weight ratio). Table 3 shows obtained electrode densities, initial capacities, and initial efficiencies.

A negative electrode 4' was formed similarly to the case of the negative electrode 1' except for using graphitized MCMB (made by OSAKA GAS CHEMICAL; product No. 6-28). Table 3 shows obtained electrode densities, initial capacities, and initial efficiencies.

TABLE 3

| Negative electrode No. | Electrode density (g/cm$^3$) | Initial capacity (mAh/cm$^3$) | Initial efficiency (%) |
|---|---|---|---|
| Negative electrode 1' | 1.35 | 411 | 91 |
| Negative electrode 2' | 1.46 | 441 | 91 |
| Negative electrode 3' | 1.54 | 471 | 90 |
| Negative electrode 4' | 1.44 | 365 | 89 |

As shown in Table 3, the negative electrodes 1' to 3' have electrode densities of 1.35 to 1.60 g/cm$^3$, and each of them has a capacity of 400 mAh/cm$^3$ or more, and has large capacity compared with the capacity of the negative electrode 4' using graphitized MCMB.

(Embodiment 4-1)

(1) A positive-electrode mixture slurry was obtained by mixing 100 parts by weight of spinel-type $LiMn_2O_4$ (made by SEIMI CHEMICAL; product No. M063), 10 parts by weight of acetylene black, and 5 parts by weight of polyvinylidene fluoride (PVdF) with 100 parts by weight of N-methylpyrrolidone (NMP). A positive electrode was obtained by applying the slurry to both sides of an aluminum foil having a thickness of 20 μm serving as a current collector, and drying and pressing the foil. FIG. 6 is an illustration of an electrode. In the case of this embodiment, the coating area (W1×W2) of the electrode 101 was 268× 178 mm$^2$ and slurry was applied to both sides of the current collector 102 of 20 μm thickness at a thickness of 128 μm. As a result, the electrode thickness t was 276 μm. One of the edge portions of the shorter side of the current collector 102 was not coated in 1 cm width and a tab 103 (aluminum with a thickness of 0.1 mm and a width of 6 mm) was welded.

(2) A negative electrode was used which was the same as the above negative electrode 2' except for the coating thickness of an electrode. Because the shape of the negative electrode is the same as the above positive electrode, the negative electrode was described by referring to FIG. 6. In the case of this embodiment, the coating area (W1×W2) of the electrode 101 was 270×180 μm$^2$ and slurry was applied to both sides of the current collector 102 of 14 μm thickness at a thickness of 72 μm. As a result, the electrode thickness t was 158 μm. One of the edge portions of the shorter side of the current collector 102 was not coated in 1 cm width and a tab 103 (nickel with a thickness of 0.1 mm and a width of 6 mm) was welded.

Slurry was applied to only one side by the same method and a single-sided electrode having a thickness of 86 μm was formed by the same method except for the single-side application of the slurry. The single-sided electrode was set to the outermost of the stacked electrodes in Item (3) (101c in FIG. 2).

(3) An electrode-stacked body was formed by alternately stacking 10 positive electrodes and 11 negative electrodes (including two single-sided electrodes) obtained in the above Item (1) with a separator 104 (made by TONEN TAPIRUSU Co., Ltd.; made of porous ethylene) held between each of the electrode as shown in FIG. 2.

(4) A bottom case 2 (refer to FIG. 1) of a battery was formed by bending a thin plate made of SUS304 having a thickness of 0.5 mm and having the shape shown in FIG. 4, inward along the broken lines L1 and moreover bending it outward along the alternate long and short dash lines L2, and then arc-welding the corners A. The upper case 1 of the battery was also formed of a thin plate made of SUS304 having a thickness of 0.5 mm. Furthermore, positive electrode and negative electrode 3 and 4 (diameter of 6 mm) and a safety-vent hole (diameter of 8 mm) were formed on the upper case 1 but the positive and negative electrodes 3 and 4 were insulated from the upper case 1 by a polypropylene packing.

(5) Each positive-electrode tab 103a of the electrode-stacked body formed in the above Item (3) was welded to the positive-electrode tab 3 and each negative-electrode tab 103b of it was welded to the negative-electrode tab 4 through a connection line and the electrode-stacked body was set to the bottom case 2 and fixed by an insulating tape to laser-weld the entire circumference along the edge A in FIG. 1. Thereafter, a solution was made by dissolving $LiPF_6$ at a concentration of 1 mol/l in a solvent obtained by mixing ethylene carbonate and diethyl carbonate at a weight ratio of 1:1, and the solution was poured through a safety-vent hole as electrolyte. The hole was closed by using aluminum foil having a thickness of 0.1 mm.

(6) The formed battery had a size of 300 mm×210 mm×6 mm. The battery was charged by a constant-current/constant-voltage charging for 18 hours, in which the battery was charged up to 4.3 V by a current of 3 A and then charged by a constant voltage of 4.3 V. Then, the battery was discharged to 2.0 V by a constant current of 3 A. The discharge capacity was 27.6 Ah, energy capacity was 99 Wh, and volume energy density was 263 Wh/l.

(7) As a result, of charging the battery and discharging the battery at a current of 30A in a thermostatic chamber at 20 degree Celsius by the method described in the above Item (6), rise of the battery temperature at the end of discharge was small compared with the case of the assembled prismatic battery (thickness of 12 mm or more) having the same capacity.

A battery was formed under the same conditions as the case of the embodiment 4-1 by using negative electrodes same as the above negative electrodes 1' and 3' except for the coating thickness of an electrode, and the same result as the above was obtained.

COMPARATIVE EXAMPLE 4-1) [FOR COMPARISON WITH EMBODIMENT 4-1

A positive electrode was formed which was the same as that of the embodiment 4-1 except that slurry was applied to both sides of a current collector 102 and the electrode thickness t was 260 μm.

Then, a negative electrode same as the above negative electrode 4' except for the coating thickness of the electrode was used. In the case of this comparative example, the coating area (W1×W2) of an electrode 101 was 270×180 mm² and slurry was applied to both sides of the current collector 102 of 14 μm thickness at a thickness of 80 μm. As a result, the electrode thickness t was 174 μm. A slurry was applied to only one side by the same method and a single-sided electrode of 94 μm was formed in accordance with the same method except for the single-side application of the slurry. Other points were the same as the case of the embodiment 4-1.

As a result of forming a battery in accordance with the same method as the case of the embodiment 4-1 and measuring the capacity, the capacity was 25.6 Ah. The energy capacity was 91 Wh and the volume energy density was 240 Wh/l which were lower than the case of the embodiment 4-1.

Now, descriptions of embodiments of A, B, and C-type negative electrodes are completed.

[Preferable separator used for non-aqueous secondary battery of the present invention]

In the case of the present invention, it was also allowed that the positive electrode 101a and negative electrode 101b (or negative electrode 101c positioned at both outer sides in the stacked electrodes) were alternately stacked with the separator 104 held between each of the layers as shown in FIG. 2.

It is preferable to use A- or B-type separator described below in detail although the use is not limited thereby.

Forming a non-aqueous secondary battery using the above separator into a flat shape is advantageous for heat radiation because the radiation area increases. The thickness of the secondary battery is preferably less than 12 mm, more preferably less than 10 mm, or still more preferably less than 8 mm. The lower limit of the thickness of 2 mm or more is practical when considering a packing rate of an electrode and a battery size (to obtain the same capacity, the area increases as the thickness decreases). When the thickness of the battery becomes 12 mm or more, it is difficult to sufficiently radiate the heat in the battery to the outside or the temperature difference between the inner portion of the battery and the vicinity of the surface of the battery increases and fluctuations of charge quantity and voltage in the battery increase because the internal resistance differs. Though a specific thickness is properly determined in accordance with a battery capacity or energy density, it is preferable to design a battery at a maximum thickness at which an expected heat radiation characteristic is obtained.

[A-Type Separator]

Figure 7:
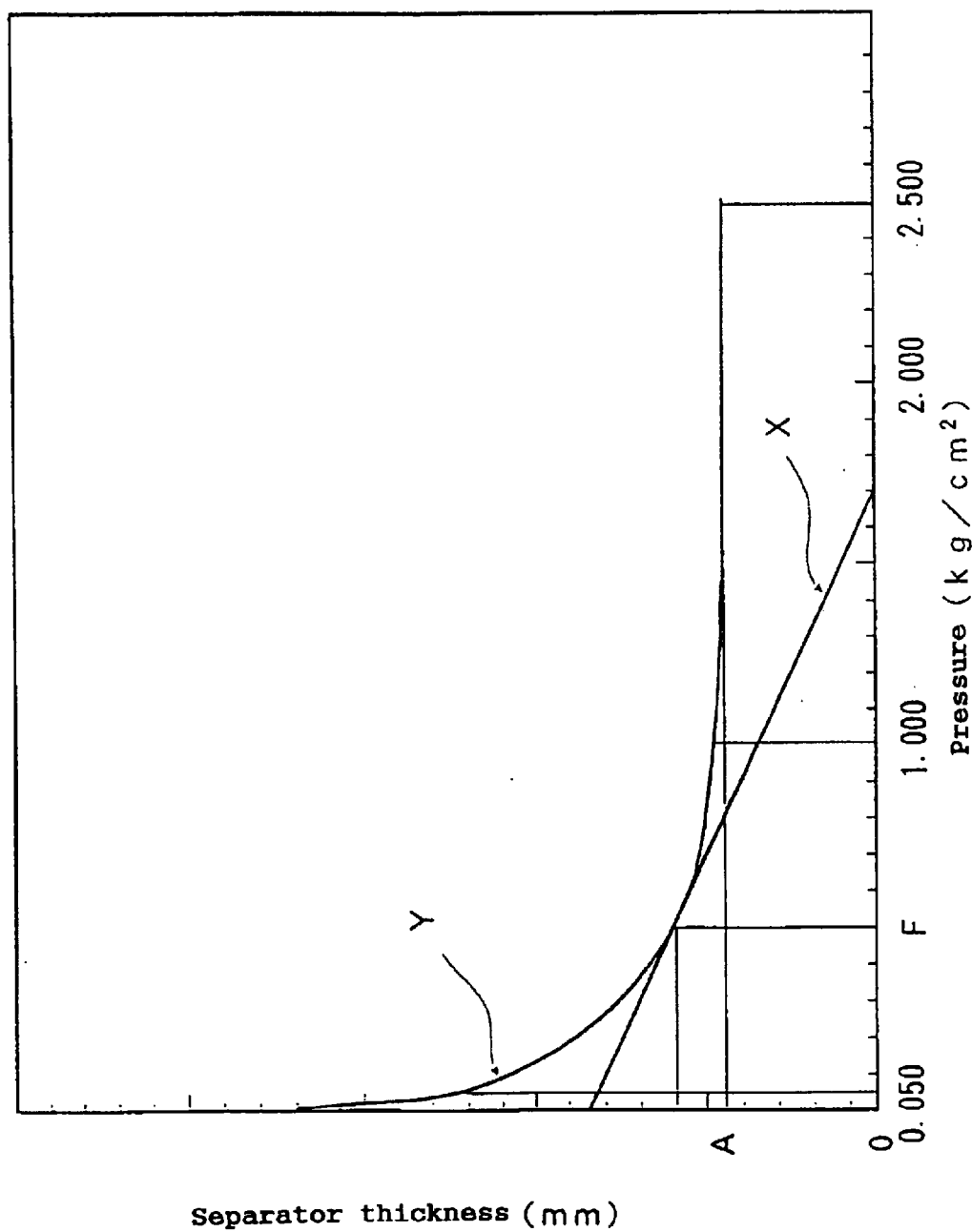
FIG. 7 is a graph showing results of measurement of the thickness of an A-type separator while applying a pressure in the thickness direction of the separator.

An A-type separator 104 is described below in detail. FIG. 7 is an illustration showing results of measuring the thickness of the separator 104 while pressing the separator 104 in the thickness direction of the separator 104. In FIG. 7, X denotes a tangent of the thickness-pressure curve of the separator at the pressure F, and Y denotes a thickness-pressure curve of the separator.

First, the condition required for the separator 104 is as follows: when pressing the separator 104 at a pressure of 2.500 kg/cm², the thickness A of the separator 104 is in a range not less than 0.02 mm and not more than 0.15 mm or preferably in a range not less than 0.02 mm and not more than 0.10 Wm. Such a case in which the thickness A under pressure exceeds 0.15 mm is not preferable because the thickness of the separator 104 is too large, the internal resistance increases or the ratio of the separator 104 occupying the inside of the battery increases, and a sufficient capacity cannot be obtained. However, such a case in which the thickness A under pressure is less than 0.02 mm is not practically preferable because it is difficult to manufacture the separator.

As shown in FIG. 7, the separator 104 is resilient. Therefore, when applying a load to the separator 104 in its thickness direction (in FIG. 7, the abscissa shows pressure applied to the separator), the thickness of the separator 104 quickly decreases at the initial time. However, when further increasing the load, the change of the thickness of the separator 104 slowly decreases and then, the thickness hardly changes even if further applying the load. In this case, it is an important point that a separator assembled into a battery has resiliency. It is also important that the pressure applied to the separator is low in the case of a non-aqueous secondary battery although the pressure changes depending on the battery size, wall thickness or wall material of the case, or other design factors, and that the separator has resiliency at such a low pressure. Therefore, in preferable separator, when the absolute value of the change rate of the thickness of the separator 104 to a pressure (kg/cm²) (in FIG. 7, the absolute value of the tilt of the tangent line of the thickness-pressure curve Y of a separator at the pressure F, e.g. the absolute value of the tilt of the tangent line X) is defined as B (mm/(kg/cm²)), the pressure F which renders B/A=1 is in a range not less than 0.050 kg/cm² and not more than 1.000 kg/cm² or more preferably in a range not less than 0.050 kg/cm² and not more than 0.700 kg/cm². A case in which the pressure F is lower than 0.050 kg/cm² is not preferable because a separator already loses resiliency and a sufficient cycle characteristic is not obtained. A case in which the pressure F exceeds 1.000 kg/cm² is not preferable because a separator frequently has a very high resiliency and therefore, it is difficult to build the separator in a battery.

The porosity of the separator 104 is 40% or more, preferably 50% or more under the pressure of 2.500 kg/cm², that is, when the separator has the above thickness A mm. A case in which the porosity is less than 40% is not preferable because an electrolyte cannot be sufficiently held, the internal resistance increases, or a sufficient cycle characteristic is not obtained.

It is preferable to use non-woven fabric as a separator meeting the above conditions. In this case, the separator can be easily manufactured. Because non-woven fabric for a battery is finally finished by using a technique such as thermal pressing in order to adjust the thickness. Non-woven fabric has been frequently lost resiliency in the above thickness-adjusting step (some of non-woven fabrics used for clothing do not include the thickness-adjusting step and most non-woven fabrics are resilient). However, a separator used for a non-aqueous secondary battery of the present invention can be easily manufactured by properly setting a condition such as the thermal pressing.

Though a material of the separator 104 is not limited, it is possible to use polyolefin such as polyethylene or polypropylene, polyamide, kraft paper, glass, etc. However, polyethylene or polypropylene is preferable from the viewpoints of cost and moisture. Furthermore, when using polyethylene or polypropylene for the separator 104, the unit weight of the separator is preferably not less than 5 g/m² and not more than 30 g/m², more preferably not less than 5 g/m² and not more than 20 g/m², or still more preferably not less than 8 g/m² and not more than 20 g/m². A case in which the unit weight of a separator exceeds 30 g/m² is not preferable because the separator becomes too thick or the porosity lowers and the internal resistance of a battery increases. A case in which the unit weight is less than 5 g/m² is not preferable because a practical strength cannot be obtained.

The A-type separator is more minutely described below by using an embodiment of the separator.

(Embodiment 5-1)

(1) A positive-electrode mixture slurry was obtained by mixing 100 parts by weight of $LiCoO_2$, 8 parts by weight of acetylene black, and 3 parts by weight of polyvinylidene fluoride (PVdF) with 100 parts by weight of N-methylpyrrolidone (NMP). A positive electrode was obtained by applying the slurry to both sides of aluminum foil having a thickness of 20 µm serving as a current collector, and drying and pressing the foil. FIG. 6 is an illustration of an electrode. In the case of this embodiment, the coating area (W1×W2) of the electrode 101 is 268×178 mm$^2$ and slurry was applied to both sides of the current collector 102 of 20 µm thickness at a thickness of 105 µm. As a result, the electrode thickness t is 230 µm. One of the edge portions of the shorter side of the current collector 102 was not coated in 1 cm width and a tab 103 (aluminum with a thickness of 0.1 mm and a width of 6 mm) was welded.

(2) A negative-electrode mixture slurry was obtained by mixing 100 parts by weight of graphitized mesocarbon microbeads (MCMB, made by OSAKA GAS CHEMICAL Co. Ltd., product No. 6-28) and 10 parts by weight of PVdF with 90 parts by weight of NMP. A negative electrode was obtained by applying the slurry to both sides of copper foil having a thickness of 14 µm serving as a current collector, drying the foil and then pressing the foil. Because the: shape of the electrode is the same as that of the above-described positive electrode, the negative electrode is described below by referring to FIG. 6. In the case of this embodiment, the coating area (W1×W2) of the electrode 101 was 270×180 mm$^2$ and the slurry was applied to both sides of the current collector 102 of 14 µm thickness at a thickness of 110 µm. As a result, the electrode thickness t was 234 µm. One of the edge portions of the shorter side of the current collector 102 was not coated in 1 cm width and a tab 103 (nickel with a thickness of 0.1 mm and a width of 6 mm) was welded.

Slurry was applied to only one side in accordance with the same method and a single-sided electrode having a thickness of 124 µm was in accordance with the same method formed except for the single-side application of the slurry. The single-sided electrode was set to the outermost of the stacked electrodes in Item (3) (101c in FIG. 2).

(3) An electrode-stacked body was formed by alternately stacking 8 positive electrodes and 9 negative electrodes (including two single-sided electrodes) obtained in the above Item (1) with a separator 104 (polyethylene-polypropylene non-woven fabric) held between each of the electrodes. Table 4 shows characteristics of the separator.

A pressure F was calculated by stacking five separators respectively cut into 5×5 cm$^2$ and measuring a pressure-thickness curve initially every 0.005 kg/cm$^2$ and then every 0.025 kg/cm$^2$ in a range from 0.025 kg/cm$^2$ up to 0.500 kg/cm$^2$ and then every 0.100 kg/cm$^2$ in a range from 0.500 kg/cm$^2$ up to 2.50 kg/cm$^2$ in accordance with the method described by referring to FIG. 7. Though measurement was repeated three times every 5 hours, the value of F and the thickness A under pressure of 2.500 kg/cm$^2$ were hardly changed.

(4) The bottom case 2 of the battery (refer to FIG. 1) was formed by wringing a 0.5 mm thin plate made of SUS304 into a depth of 5 mm. The upper case 1 of the battery was also formed of a 0.5 mm thin plate made of SUS304. The positive and negative electrodes made of SUS304 3 and 4 (diameter of 6 mm) were set to the upper case and a safety-vent hole (diameter of 8 mm) was formed on the upper case and the positive and negative electrodes 3 and 4 were insulated from the upper case 1 by a polypropylene packing.

(5) Each positive-electrode tab 103a of the electrode-stacked body formed in the above Item (3) was welded to the positive-electrode tab 3 and each negative-electrode tab 103b of it was welded to the negative-eletrode tab 4 through a connection line and the electrode-stacked body was set to the bottom case 2 and fixed by an insulating tape to laser-weld the entire circumference of the corner A in FIG. 1. Thereafter, a solution made by dissolving $LiPF_6$ at a concentration of 1 mol/l in a solvent obtained by mixing ethylene carbonate and diethyl carbonate at a weight ratio of 1:1 was poured through a safety-vent hole as an electrolyte and the hole was closed by using aluminum foil having a thickness of 0.1 mm.

(6) The obtained battery was charged by a constant-current/constant-voltage charging for 8 hours, in which the battery was charged up to 4.1 V by a current of 5 A and then charged by a constant voltage of 4.1 V. Then, the battery was discharged up to 2.5 V by a constant current of 10 A. The discharge capacity was 23.3 Ah. The temperature rise of the battery while discharged was small compared with the case of a prismatic battery (battery having a thickness of 12 mm or more) having the same capacity.

(7) The capacity when repeating charge and discharge by 10 cycles by using the battery under the same condition as the above mentioned was 21.5 Ah.

(Embodiment 5-2)

A battery was formed similarly to the case of the embodiment 5-1 except for using the polypropylene non-woven fabric of the embodiment 5-2 shown in Table 4 as a separator. The battery was charged by a constant-current/constant-voltage charging for 8 hours, in which the battery was charged up to 4.1 V by a current of 5 A and then charged by a constant voltage of 4.1 V. Then, the battery was discharged up to 2.5 V by a constant current of 10 A. The discharge capacity was 22.8 Ah. The capacity when repeating charge and discharge by 10 cycles under the same condition as the case of the embodiment 5-1 by using the battery was 20.9 Ah.

(COMPARATIVE EXAMPLE 5-1) [FOR COMPARISON WITH EMBODIMENTS 5-1 and 5-2

A battery was formed similarly to the case of the embodiment 5-1 except for using the polyethylene micro-porous film of the comparative example 5-1 shown in Table 4 as a separator and change the number of layered electrodes to 10 positive electrodes and 11 negative electrodes (including two single-sided electrodes). The battery was charged by a constant-current/constant-voltage charging for 8 hours, in which the battery was charged up to 4.1 V by a current of 5 A and then charged by a constant voltage of 4.1 V. Then, the battery was discharged up to 2.5 V by a current of 10 A. The discharge capacity was 25.2 Ah. The capacity when repeating charge and discharge by 10 cycles under the same condition as the case of the embodiment 5-1 by using the battery was 19.0 Ah.

The separator is used for, for example, an 18650-type cylindrical battery. In the case of the cylindrical battery, cycle deterioration at 10 initial cycles is 90% or more. However, when using a flat battery, the discharge capacity was lowered up to the 10th cycle though the initial capacity was high because a separator was thin and the number of layered electrodes was large compared with Embodiments 5-1 and 5-2.

COMPARATIVE EXAMPLE 5-2

A battery was formed similarly to the case of the embodiment 5-1 except for using the polypropylene non-woven fabric (pressure F exceeds 0.025 kg/cm² but it is lower than 0.050 kg/cm²) of the comparative example 5-2 shown in Table 4 as a separator. The battery was charged by a constant-current/constant-voltage charging for 8 hours, in which the battery was charged up to 4.1 V by a current of 5 A and then charged by a constant voltage of 4.1 V. Then, the battery was discharged up to 2.5 V by a constant current of 10 A. The discharge capacity was 21.0 Ah. The capacity when repeating charge and discharge by 10 cycles under the same condition as the case of the embodiment 5-1 by using the battery was 17.0 Ah.

Though the separator was the same as the separator of the embodiment 5-1 in porosity and thickness, it was not resilient. Therefore, when using the separator for a flat battery, the discharge capacity was lowered up to the 10th cycle.

COMPARATIVE EXAMPLE 5-3

A battery was formed similarly to the case of the embodiment 5-1 except for using the glass non-woven fabric of the comparative example 5-3 shown in Table 4 as a separator and change the number of layered electrodes to 6 positive electrodes and 7 negative electrodes (including two single-sided electrodes). The battery was charged by a constant-current/constant-voltage charging for 8 hours, in which the battery was charged up to 4.1 V by a current of 4 A and then charged by a constant voltage of 4.1 V. Then, the battery was discharged up to 2.5 V by a current of 8 A. The discharge capacity was 18.1 Ah. The capacity when repeating charge and discharge by 10 cycles under the same condition as the case of the embodiment 5-1 by using the battery was 17.3 Ah.

Figure 8:
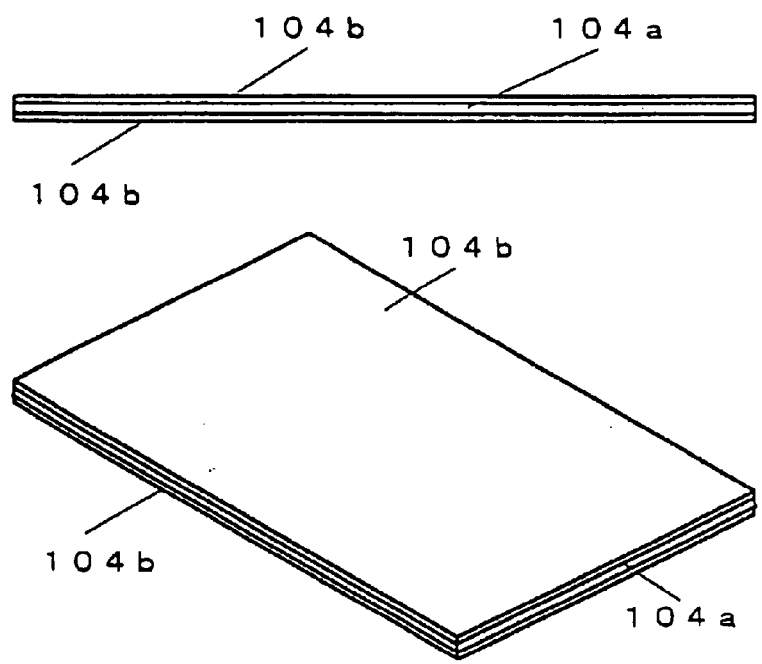
FIG. 8 shows a side view and a perspective view of a B-type separator.

The separator is sufficiently resilient and has a capacity retention rate equal to those of the embodiments 5-1 and 5-2 after 10 cycles pass. However, because the separator has a large thickness, the capacity was lower than those of the embodiments 5-1 and 5-2.

second separator may be placed between two first separators in contrary to what is shown in FIG. 8.

Then, a first separator is more minutely described below. FIG. 7 is an illustration showing results of measuring the thickness of the first separator while applying a pressure to the first separator in its thickness direction. In FIG. 7, X denotes a tangent of the thickness curve of the separator to pressure at a pressure F and Y denotes a thickness curve of the separator to pressure.

First, when pressing the first separator at a pressure of 2.500 kg/cm² as a condition required for the first separator, the thickness A of the first separator is kept in a range not less than 0.02 mm and not more than 0.15 mm, or preferably kept in a range not less than 0.02 mm and not more than 0.10 mm. A case in which the thickness under pressure exceeds 0.15 mm is not preferable because the thickness of the separator is too large, the internal resistance increases or the rate for the separator to occupy the inside of a battery increases, and a sufficient capacity is not obtained. However, a case in which the thickness A under pressure is less than 0.02 mm is not preferable for practical use because it is difficult to manufacture the battery.

As shown in FIG. 7, the first separator is resilient and when applying a load to the first separator in its thickness direction (in FIG. 7, abscissa shows pressure applied to separator), the thickness of the first separator quickly decreases at the initial point of time. However, when further increasing a load, change of the thickness of the first separator slowly decreases and then, thickness is hardly changed. In this case, it is important that a separator is resilient when a battery is formed. In the case of a flat non-aqueous secondary battery, the battery size, or wall thickness or wall material of a case are changed depending on other design elements. However, it is important that a pressure to be applied to a separator is low and the separator is resilient at a low pressure. Therefore, in a preferable separator, when assuming the absolute value of the change

TABLE 4

|  | Material | Thickness A (mm) | Pressure F (kg/cm²) | Porosity at 2.5 kg/cm² (%) | Unit weight (g/m²) |
|---|---|---|---|---|---|
| Embodiment 5-1 | Polyethylene-polypropylene non-woven fabric | 0.087 | 0.500 | 89.1 | 13.7 |
| Embodiment 5-2 | Polypropylene non-woven fabric | 0.072 | 0.050–0.075 | 83.0 | 13.1 |
| Comparative example 5-1 | Polyethylene micro-porous film | 0.025 | <0.025 | 41.0 | 15.5 |
| Comparative example 5-2 | Polypropylene non-woven fabric | 0.100 | 0.025 < <0.050 | 73.0 | 32 |
| Comparative example 5-3 | Glass non-woven fabric | 0.232 | 0.200 | <90 | — |

[B-Type Separator]

Figure 9:
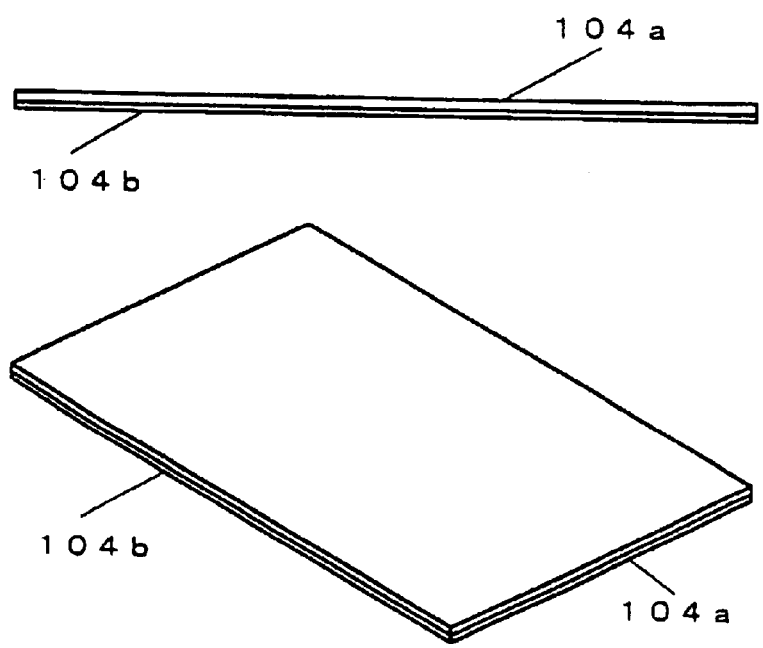
FIG. 9 shows a side view and a perspective view of another B-type separator.

A B-type separator is described below in detail. FIG. 8 shows a side view and a perspective view of a separator used for the non-aqueous secondary battery shown in FIG. 1. As shown in FIG. 8, the separator comprises a first separator 104a and two second separators 104b, in which the second separators 104b were arranged at both sides of the first separator 104a. The configuration of the separator is not limited. Two or more different types of separators can be used as long as the separators meet the following conditions. For example, one first separator 104a and one second separator 104b arranged as shown in FIG. 9 may be used, or separators of different types may be used instead of second separators 104b of the same type shown in FIG. 8, or a rate of the thickness (mm) of the first separator to a pressure (kg/cm²) (in FIG. 7, tangent of thickness curve Y of separator to pressure at pressure F, such as absolute value of tilt of tangent X) as B (mm/(kg/cm²)), the pressure F in which B/A is equal to 1 is not less than 0.050 kg/cm² and not more than 1.000 g/cm² or more preferably not less than 0.050 kg/cm² and not more than 0.700 kg/cm². A case in which the pressure F is lower than 0.050 kg/cm² is not preferable because a separator already loses its resiliency when a battery is formed and a sufficient cycle characteristic is not obtained or a case in which the pressure F exceeds 1.000 kg/cm² is not preferable because a separator frequently has a very large resiliency and it is difficult to set the separator in a battery.

When the porosity of the first separator at a pressure of 2.500 kg/cm$^2$, that is, at the above thickness of A mm is kept at 40% or more or preferably kept at 50% or more. A case in which the porosity is less than 40% is not preferable because an electrolyte cannot be sufficiently kept, the internal pressure rises, or a sufficient cycle characteristic cannot be obtained.

It is preferable to use non-woven fabric for the first separator meeting the above conditions. In this case, it is easy to manufacture the separator. In general, non-woven fabric for a battery is finally finished in order to adjust the thickness by a technique such as thermal pressing. Non-woven fabric has frequently lost its resiliency so far in the thickness-adjusting step (some of non-woven fabrics for clothing do not have the thickness-adjusting step and most non-woven fabrics are resilient). However, a separator used for a non-aqueous secondary battery of the present invention can be easily manufactured by properly setting a condition such as the above thermal pressing.

Then, the second separator is more minutely described below. The second separator is a micro-porous film having a pore diameter of 5 μm or less or preferably having a pore diameter of 2 μm or less and having a porosity of 25% or more or preferably having a porosity of 30% or more. A pore diameter can be observed by an electron microscope. The above micro-porous film can use a micro-porous film generally marketed for a lithium ion battery. The second separator is used to compensate a disadvantage that a slight short circuit easily occurs when the battery is manufactured or charged or discharged because the separator has a comparatively large pore diameter and a high porosity. Therefore, a case in which the pore diameter of the second separator exceeds 5 μm is not preferable because it is impossible to compensate the above disadvantage. A case in which the porosity is less than 25% is not preferable because an electrolyte cannot be sufficiently kept or the internal resistance rises. Furthermore, because the thickness of the second separator is 0.05 mm or less, it is possible to use a separator having a thickness of not more than 5 μm and not more than 30 μm. This is because it is difficult to manufacture the separator if the thickness is too small or the internal resistance tends to rise if the thickness is too large.

Materials of the first and second separators are not limited. For example, it is possible to use polyolefins such as polyethylene and polypropylene, and polyamide, kraft paper, and glass. However, polyethylene and polypropylene are preferable from the viewpoints of cost and moisture.

When using polyethylene or polypropylene for the first separator, the unit weight of the first separator is preferably not less than 5 g/m$^2$ and 30 g/m$^2$, more preferably not less than 5 g/m$^2$ and not more than 20 g/m$^2$, or still more preferably not less than 8 g/m$^2$ and not more than 20 g/m$^2$. A case in which the unit weight of a separator exceeds 30 g/m$^2$ is not preferable because the separator becomes too thick, the porosity lowers, or the internal resistance of a battery rises. A case in which the unit weight is less than 5 g/m$^2$ is not preferable because a strength for practical use cannot be obtained.

Though various combinations of materials of the first and second separators can be considered, it is preferable to combine different materials. In this case, the effect of shutdown of the operation of the battery is further expected, in which the shutdown occurs when a battery causes thermal runaway.

It is preferable to manufacture the first and second separators by laminating them together. To laminate them together, the following method can be used: mechanical mutual laminating by pressing, mutual laminating by thermal rollers, mutual laminating by chemicals, or mutual laminating by adhesive. For example, to combine one separator mainly made of polyethylene with the other separator mainly made of polypropylene, it is allowed to laminate them while melting the surface layer of the polyethylene separator by a thermal roller, taking polyethylene powder into polypropylene non-woven fabric, or laminating non-woven fabrics made of a material obtained by coating the surface of polypropylene fiber with polyethylene together by thermal rollers. It is important to perform mutual laminating without crushing voids of the above separators.

Embodiments of a B-type separator are more specifically described below.

(Embodiment 6-1)

(1) A positive-electrode mixture slurry was obtained by mixing 100 parts by weight of LiCo$_2$O$_4$, 8 parts by weight of acetylene black, and 3 parts by weight of polyvinylidene fluoride (PVdF) with 100 parts by weight of N-methylpyrrolidone (NMP). A positive electrode was obtained by applying the slurry to both sides of aluminum foil having a thickness of 20 μm serving as a current collector, and drying and pressing the foil. FIG. 6 is an illustration of an electrode. In the case of this embodiment, the coating area (W1×W2) of the electrode 101 is 268×178 mm$^2$ and slurry was applied to both sides of the current collector 102 of 20 μm thickness at a thickness of 95 μm. As a result, the electrode thickness t was 210 μm. One of the edge portions of the shorter side of the current collector 102 was not coated in 1 cm width and a tab 103 (aluminum with a thickness of 0.1 mm and a width of 6 mm) was welded.

(2.) A negative-electrode mixture slurry was obtained by mixing 100 parts by weight of graphitized mesocarbon microbeads (MCMB, made by OSAKA GAS CHEMICAL Co., Ltd., product No. 6-28) and 10 parts by weight of PVdF with 90 parts by weight of NMP. A negative electrode was obtained by applying the slurry to both sides of copper foil having a thickness of 14 μm serving as a current collector, drying the foil and then pressing the foil. Because the shape of the electrode is the same as that of the above-described positive electrode, the negative electrode is described below by referring to FIG. 6. In the case of this embodiment, the coating area (W1×W2) of the electrode 101 was 270×180 mm$^2$ and the slurry was applied to both sides of the current collector 102 of 14 μm thickness at a thickness of 105 μm. As a result, the electrode thickness t was 224 μm. One of the edge portions of the shorter side of the current collector 102 was not coated in 1 cm width and a tab 103 (nickel with a thickness of 0.1 mm and a width of 6 mm) was welded.

Slurry was applied to only one side in accordance with the same method and a single-sided electrode having a thickness of 119 μm was formed in accordance with the same method except for the single-sided application of the slurry. The single-sided electrode is set to the outermost of the electrode-stacked body in Item (3) (110c in FIG. 2).

(3) In the case of this embodiment, as shown in Table 5, an electrode-stacked body was formed by using polyethylene-polypropylene non-woven fabric as a first separator and a polyethylene micro-porous film as a second separator so that the positive-electrode side became a micro-porous film, stacking the first and second separators similarly to the case of the separators shown in FIG. 9, and alternately stacking 8 positive electrodes and 9 negative electrodes (including two single-sided electrodes) obtained in the above Item (1) through a separator 104 (constituted by stacking a polyethylene-polypropylene non-woven fabric and a polypropylene micro-porous film). Table 5 shows characteristics of the separators.

A pressure F was calculated in accordance with the method described for FIG. 7 by stacking five separators respectively cut into 5×5 cm² and measuring the pressure-thickness curve of the first separator at first every 0.005 kg/cm², and then every 0.025 kg/cm² in the pressure range from 0.025 kg/cm² up to 0.500 kg/cm² and every 0.100 kg/cm² in the pressure range from 0.500 kg/cm² up to 2.500 kg/Cm². As a result of repeating the above measurement three times every 5 hours, the value of F and the thickness A at a pressure of 2.500 kg/cm² were hardly changed.

(4) The bottom case 2 of the battery (refer to FIG. 1) was formed by deep drawing of a 0.5 mm thin plate made of SUS304 into a depth of 5 mm. The upper case 1 of the battery was also formed of a 0.5 mm thin plate made of SUS304. The positive and negative electrodes made of SUS304 3 and 4 (diameter of 6 mm) were set to the upper case and a safety-vent hole (diameter of 8 mm) was formed on the upper case but the positive and negative electrodes 3 and 4 were insulated from the upper case 1 by a polypropylene packing.

(5) Each positive-electrode tab 103*a* of the electrode-stacked body formed in the above Item (3) was welded to the positive-electrode tab 3 and each negative-electrode tab 103*b* of it was welded to the negative-electrode tab 4 through a connection line and the electrode-stacked body was set to the bottom case 2 and fixed by an insulating tape to laser-weld the entire circumference of the corner A in FIG. 1. Thereafter, a solution made by dissolving $LiPF_6$ at a concentration of 1 mol/l in a solvent obtained by mixing ethylene carbonate and diethyl carbonate at a weight ratio of 1:1 was poured through a safety-vent hole as an electrolyte and the upper case was closed by using aluminum foil having a thickness of 0.1 mm. The total of five batteries were formed as described above.

(6) The obtained battery was charged by a constant-current/constant-voltage charging for 8 hours, in which the battery was charged up to 4.1 V by a current of 5 A and then charged by a constant voltage of 4.1 V. Then, the batteries were discharged up to 2.5 V by a constant current of 10 A. Discharge capacities of the five batteries ranged between 21.1 and 21.4 Ah. The temperature rise of the batteries while discharged was small compared with the case of a prismatic battery (battery having a thickness of 12 mm or more) having the same capacity.

(7) Capacities when repeating charge and discharge by 10 cycles under the same condition as the above by using the above five batteries ranged between 19.2 and 20.1 Ah.
(Embodiment 6-2)

A battery was formed similarly to the case of the embodiment 6-1 except for using the polypropylene non-woven fabric of the embodiment 6-2 shown in Table 5 as a first separator. The battery was charged by a constant-current/constant-voltage charging for 8 hours, in which the battery was charged up to 4.1 V by a current of 5 A and then charged by a constant voltage of 4.1 V. Then, the battery was discharged up to 2.5 V by a constant current of 10 A. The discharge capacity was 21.0 Ah. The capacity when repeating charge and discharge by 10 cycles under the same condition as the case of the embodiment 6-1 by using the battery was 19.0 Ah.

COMPARATIVE EXAMPLE 6-1) [FOR COMPARISON WITH EMBODIMENT 6-1

Five batteries were formed similarly to the case of the embodiment 6-1 except for using only the polyethylene-polypropylene non-woven fabric same as the first separator of the embodiment 6-1 shown in Table 5 as a first separator without using a second separator and change the number of stacked electrodes to 8 positive electrodes (thickness of either-side electrode layer was 105 μm) and 9 negative electrodes (including two single-sided electrodes and thickness of either-side electrode layer was 110 μm). The battery was charged by a constant-current/constant-voltage charging for 8 hours, in which the battery was charged up to 4.1 V by a current of 5 A and then charged by a constant voltage of 4.1 V. Then, the batteries were discharged-up to 2.5 V by a constant current of 10 A. The discharge capacities of three batteries ranged between 23.1 and 23.3 Ah but the capacities of two remaining batteries were 19.5 Ah and 14.3 Ah and a slight short circuit was found. Because the comparative example 6-1 did not use a second separator, the electrode packing rate was improved compared with the case of the embodiment 6-1 but a slight short circuit easily occurred through the initial capacity was high.

TABLE 5

|  | Separator | Material | Thickness A (mm) | Pressure F (kg/cm²) | Porosity at 2.5 kg/cm² (%) | Unit weight (g/m²) |
|---|---|---|---|---|---|---|
| Embodiment 6-1 | First separator | Polyethylene-polypropylene non-woven fabric | 0.087 | 0.500 | 89.1 | 13.7 |
|  | Second separator | Polyethylene microporous film | 0.025 | <0.025 | 41.0 | 15.5 |
| Embodiment 6-2 | First separator | Polypropylene non-woven fabric | 0.072 | 0.050–0.075 | 83.0 | 13.1 |

[Positioning of electrode unit]

A preferred embodiment of the present invention for positioning an electrode unit using a separator is described below. In the case of this embodiment, a separator 104 is bonded to a positive electrode 101*a* and/or negative electrodes 101*b* and 101*c*.

It has been very difficult so far to stack a positive electrode, a negative electrode, and a separator having a size of 272×182 mm larger than the negative electrode while accurately positioning them which have different size to each other. However, this embodiment makes it possible to solve the above problem by bonding at least one of a plurality of separators to a positive or negative electrode or to both positive and negative electrodes. In this case, it is more preferable to bond a plurality of separators to a positive or negative electrode or to both positive and negative electrodes or particularly preferable to bond all separators to a positive or negative electrode or to both positive and negative electrodes. This embodiment solves the above problem by bonding the separator 104 of this embodiment to the positive electrode 101*a* and/or negative electrodes 101*b* and 101c. When setting dimensions of the positive electrode 101a to 268×178 mm, it is necessary to make dimensions of the negative electrodes 101b and 101c slightly larger than those of the positive electrode 101a in order to prevent deposition of lithium on a negative electrode. For example, it is necessary to adjust dimensions of the negative electrodes 101b and 101c to 270×180 mm.

Specifically, as shown in FIGS. 11A to 11C, a positive electrode unit 111a is formed by bonding a positive electrode 101a with a separator 104, a negative electrode unit 111b is formed by bonding a negative electrode 101b with the separator 104, and a single-sided negative electrode unit 111c is formed by bonding a single-sided negative electrode 101c with the separator 104. In this case, the size of the separator 104 is equal to each other irrelevant to the sizes of the positive electrode 101a and negative electrodes 101b and 101c. Therefore, by aligning only the separator 104, it is possible to easily stack the positive electrode 101a, negative electrodes 101b and 101b having different sizes, and separator 104.

Because the separator 104 is not shifted when bonding it with the positive electrode 101a or negative electrodes 101b and 101c, it is possible to make the size of the separator 104 equal to the size of the negative electrodes 101b and 101c. By removing the portion of a separator protruding beyond the electrodes, it is possible to improve the electrode packing efficiency corresponding to the size of the removed portion. A case is described above in which the separator 104 is bonded to the positive electrode 101a or negative electrodes 101b and 101c which are previously cut into predetermined dimensions. However, bonding of a separator is not limited to the above case. For example, it is possible to bond a separator to hoop electrodes and then cut the electrodes. Thus, it is possible to use various methods.

A method for bonding the separator 104 with the positive electrode 101a and/or negative electrodes 101b and 101c is not limited. However, it is important that all or most of pores of the separator 104 are not blocked (the separator does not have electron conductivity as raw material, and thus it must hold an electrolyte and have pores through which ions held in the electrolyte move between positive and negative electrodes). Namely, it is important that electrolyte passages are securely maintained to hold the penetration through the separator 104 from the front surface to the rear surface.

Specifically, methods for bonding the separator 104 with the positive electrode 101a and/or negative electrodes 101b and 101c include mechanical bonding by pressing, bonding due to fusion of a part of a separator, bonding by chemicals, and bonding by adhesive and so on. Particularly, it is preferable to fuse a separator by heat and bond it with an electrode because impurities are not contained, the separator is not easily creased, and moreover warpage or burr of the electrode produced due to a slit or the like can be corrected at the same time. In this case, it is possible to easily bond a separator made of polyethylene having a low fusing point. In the case of non-woven fabric, when using a composite separator made of materials having different fusing points, for example, when using polypropylene as the core material of fiber and polyethylene as an external layer or mixing polyethylene powder in polypropylene non-woven fabric, it is possible to more easily bond the separator without closing pores of the separator. A method of mixing polyethylene into an electrode and bonding a polypropylene separator is a simple method.

When bonding a separator with an electrode by fusing the separator, it is preferable to heat the electrode so that the very surface of the separator is fused when the separator contacts the electrode. In this case, it is possible to bond the separator with the electrode by heating the electrode up to a temperature equal to the fusing point of the separator or higher and pressing them in a short time without closing pores of the separator. In this case, it is not necessary that the entire surface of the electrode is bonded with the entire surface of the separator. It is allowed that a part of the electrode is bonded with a part of the separator so that their position is not shifted when the battery is formed.

The bonding structure of the positive electrode 101a, negative electrodes 101b and 101c, and separator 104 is effective when stacking pluralities of electrodes and separators whose positioning is particularly difficult, particularly when stacking five electrodes or more and five separators or more, however it is possible to use this structure for other cases.

Embodiments for positioning an electrode unit using a spacer are more specifically described below.

(Embodiment 7-1)

(1) A positive-electrode mixture slurry was obtained by mixing 100 parts by weight of $LiCO_2O_4$, 8 parts by weight of acetylene black, and 3 parts by weight of polyvinylidene fluoride (PVdF) with 100 parts by weight of N-methylpyrrolidone (NMP). A positive electrode was obtained by applying the slurry to both sides of aluminum foil having a thickness of 20 μm serving as a current collector, and drying and pressing the foil. FIG. 6 is an illustration of an electrode. In the case of this embodiment, the coating area (W1×W2) of the electrode 101 was 268×178 $mm^2$ and slurry was applied to both sides of the current collector 102 of 20 μm thickness at a thickness of 95 μm. As a result, the electrode thickness t was 210 μm. One of the edge portions of the shorter side of the current collector 102 was not coated in 1 cm width and a tab 103 (aluminum with a thickness of 0.1 mm and a width of 6 mm) was welded.

(2) (2) A negative-electrode mixture slurry was obtained by mixing 100 parts by weight of graphitized mesocarbon microbeads (MCMB, made by OSAKA GAS CHEMICAL Co., Ltd., product No. 6-28) and 10 parts by weight of PVdF with 90 parts by weight of NMP. A negative electrode was obtained by applying the slurry to both sides of copper foil having a thickness of 14 μm serving as a current collector, drying the foil and then pressing the foil. Because the shape of the electrode is the same as that of the above-described positive electrode, the negative electrode is described below by referring to FIG. 6. In the case of this embodiment, the coating area (W1×W2) of the electrode 101 is 270×180 $mm^2$ and the slurry was applied to both sides of the current collector 102 of 14 μm thickness at a thickness of 105 μm. As a result, the electrode thickness t was 224 μm. One of the edge portions of the shorter side of the current collector 102 was not coated in 1 cm width and a tab 103 (aluminum with a thickness of 0.1 mm and a width of 6 mm) was welded.

Slurry was applied to only one side in accordance with the same method and a single-sided electrode having a thickness of 119 μm was formed in accordance with the same method except for the single-sided application of the slurry. The single-sided electrode was set to the outermost of the electrode-stacked body in Item (3). (101c in FIG. 2).

Figure 10:
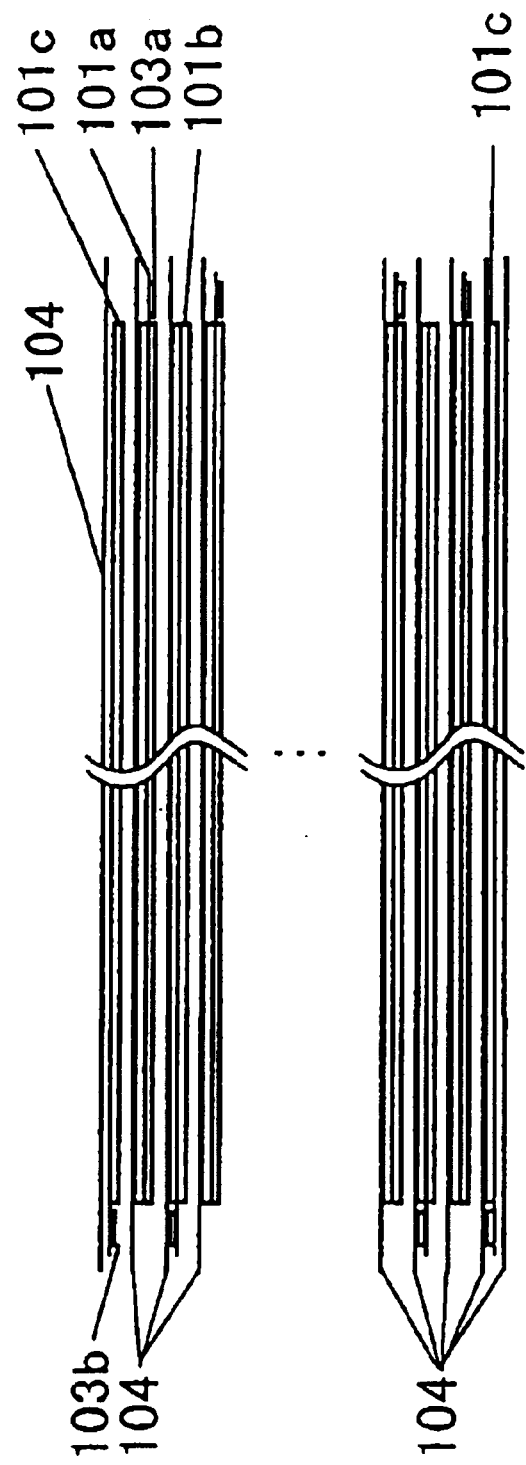
FIG. 10 shows a side view of stacked electrodes including a C-type separator.
Figure 12:
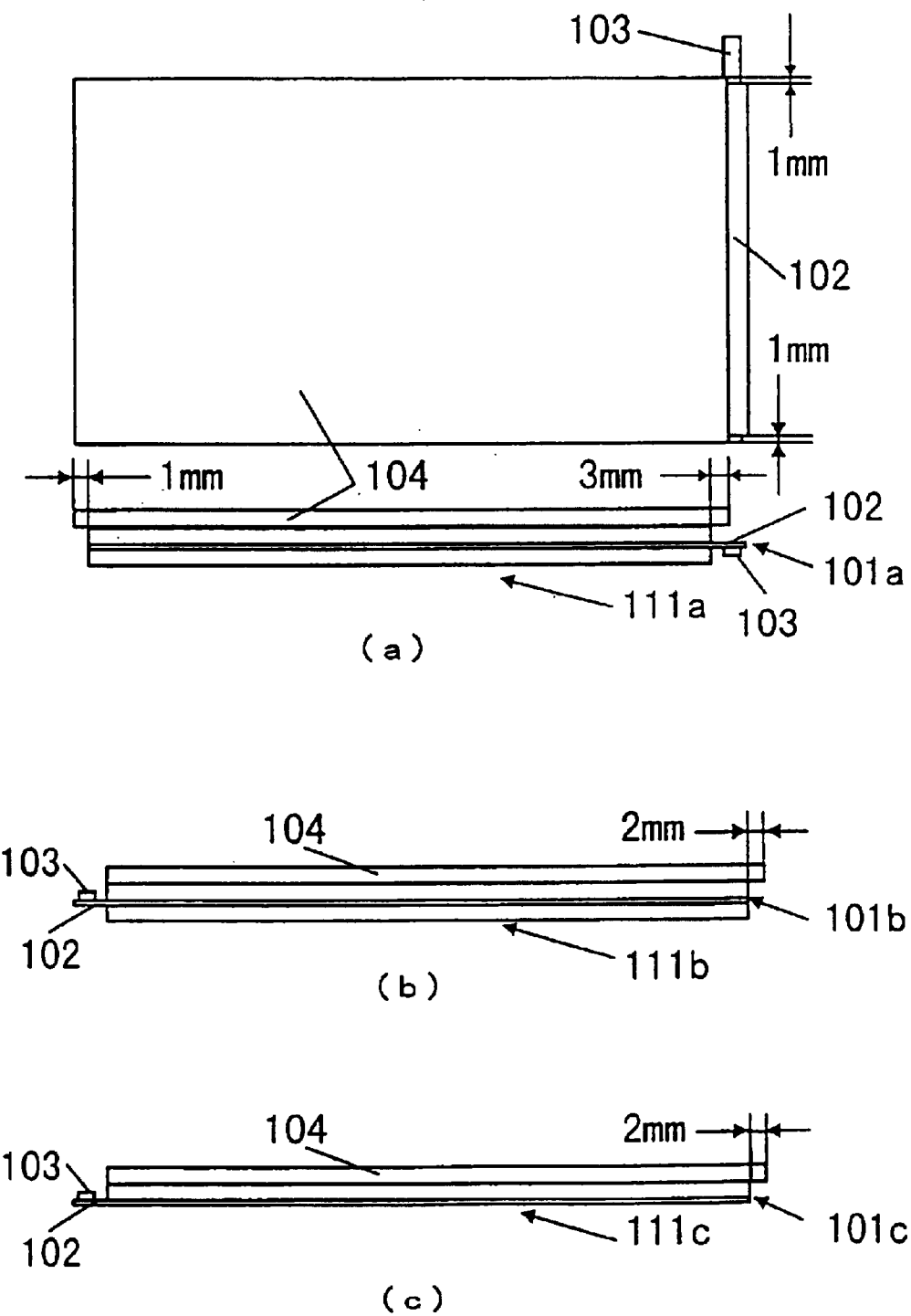
FIG. 12 is illustrations for explaining an electrode unit including a C-type separator.

(3) A positive electrode unit 111a, negative electrode unit 111b, and single-sided negative electrode unit 111c were formed by bonding a separator 104 obtained by laminating polyethylene-polypropylene non-woven fabric of 272×180 $mm^2$ (thickness of 87 μm) and a polypropylene microporous film (thickness of 25 μm) to a positive electrode 110a and negative electrodes 101b and 101c at the positional relation shown in FIGS. 12A to 12C. Each electrode was bonded with the polyethylene-polypropylene non-woven fabric side of the separator 104. Specifically, the separator 104 and electrodes (positive electrode 101a and negative electrodes 101b and 101c) were stacked in the order at a predetermined position and heated from the electrode side by an iron at approximately 140 degree Celsius to bond them. After bonding them the separator 104 was observed by removing it from some of the electrode units 111a, 111b, and 111c. As a result, the state of surface pores of the separator 104 was hardly changed from the state before the separator 104 was bonded. An electrode-stacked body was formed by alternately stacking eight positive-electrode units 111a, seven negative-electrode units 111b, one single-sided negative-electrode unit 111c, one single-sided negative electrode 101c not bonded with the separator 104, and the separator 104 as shown in FIG. 10.

(4) The bottom case 2 of the battery (refer to FIG. 1) was formed by deep drawing of a 0.5 mm thin plate made of SUS304 into a depth of 5 mm. The upper case 1 of the battery was also formed of a 0.5 mm thin plate made of SUS304. The positive and negative electrodes made of SUS304 3 and 4 (diameter of 6 mm) were set to the upper case and a safety-vent hole (diameter of 8 mm) was formed on the upper case but the positive and negative electrodes 3 and 4 were insulated from the upper case 1 by a polypropylene packing.

(5) Each positive-electrode tab 103a of the electrode-stacked body formed in the above Item (3) was welded to the positive-electrode tab 3 and each negative-electrode tab 103b of it was welded to the negative-electrode tab 4 through a connection line and the electrode-stacked body was set to the bottom case 2 and fixed by an insulating tape to laser-weld the entire circumference of the corner A in FIG. 1. Thereafter, a solution was made by dissolving $LiPF_6$ at a concentration of 1 mol/l In a solvent obtained by mixing ethylene carbonate and diethyl carbonate at a weight ratio of 1:1. The solution was poured through a safety-vent hole as an electrolyte and the upper case was closed by aluminum foil having a thickness of 0.1 mm. The total of five batteries were formed.

(6) The obtained battery was respectively charged by a constant-current/constant-voltage charging for 8 hours, in which the battery was charged up to 4.1 V by a current of 5 A and then charged by a constant voltage of 4.1 V. Then the batteries were discharged up to 2.5 V by a constant current of 10 A. Discharge capacities ranged between 21.3 and 21.5 Ah. The temperature rise of the batteries while discharged was small compared with the case of a prismatic battery (battery having a thickness of 12 mm or more) having the same capacity.

COMPARATIVE EXAMPLE 7-1

Five batteries were formed similarly to the case of the embodiment 7-1 except that a separator was not bonded. The obtained battery was charged by a constant-current/constant-voltage charging for 8 hours, in which the battery was charged up to 4.1 V by a current of 5 A and then charged by a constant voltage of 4.1 V. Then, the batteries were discharged up to 2.5 V by a constant current of 10 A. Discharge capacities of three batteries ranged between 20.9 and 21.3 Ah but those of two remaining batteries were 18.5 and 14.3 Ah and a slight short circuit occurred.

Now, description of positioning of A- and B-type separators and an electrode unit using a separator is completed.

Figure 13:
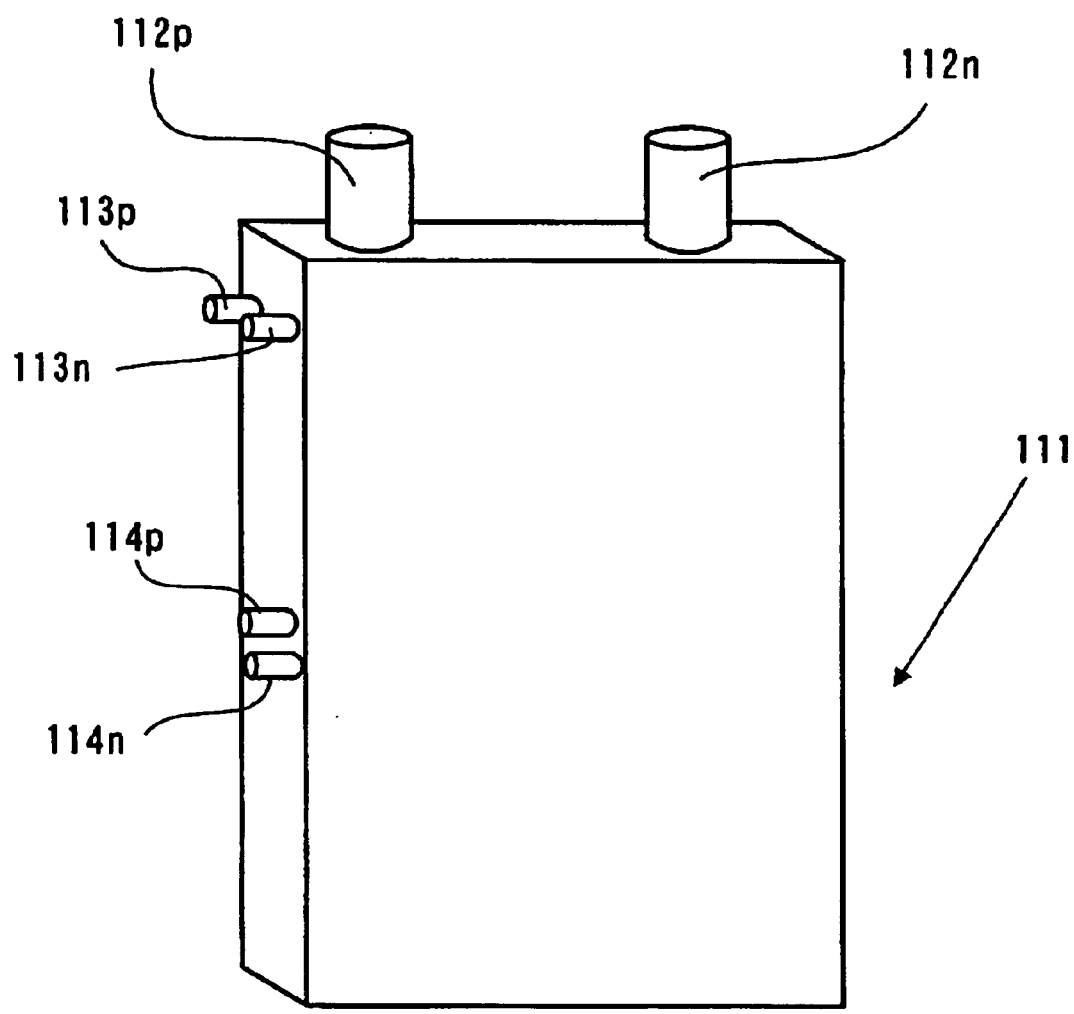
FIG. 13 is a perspective view of a secondary battery to be applied to a control method of the present invention.
Figure 14:
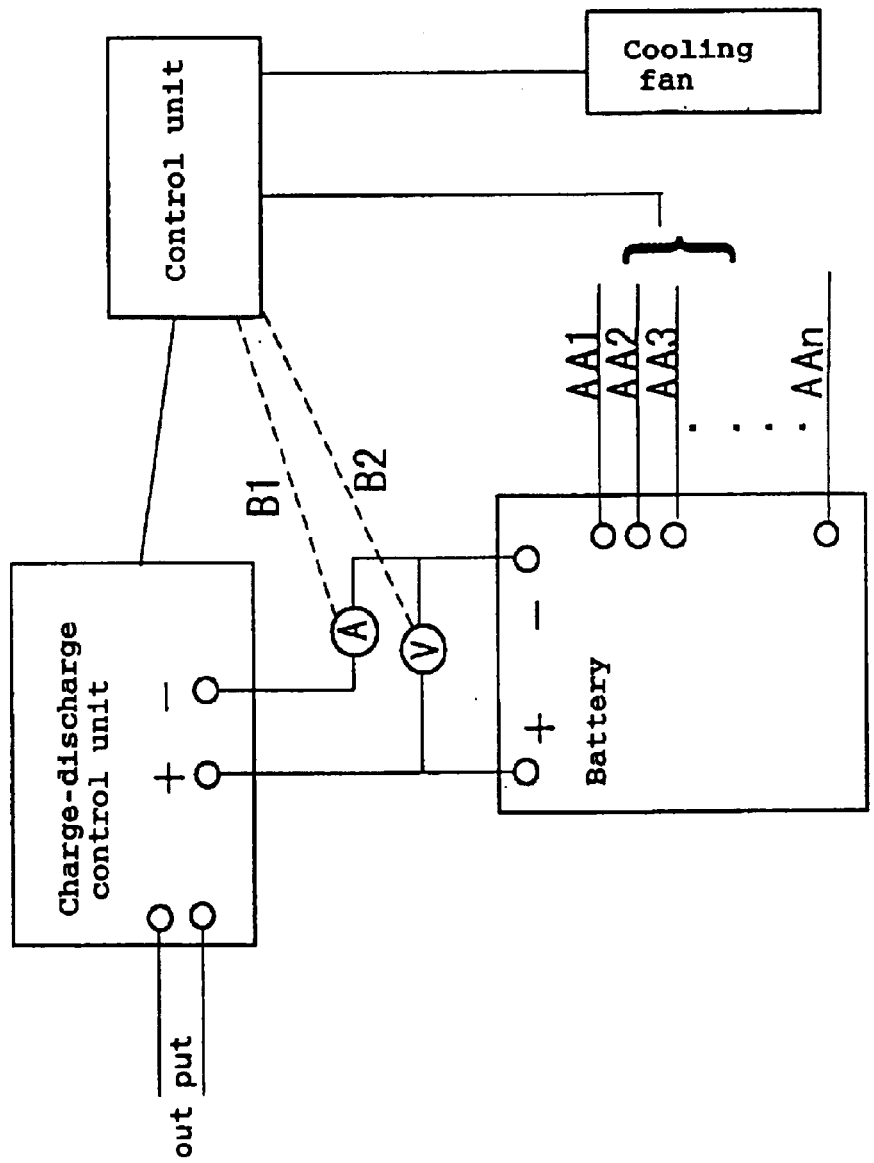
FIG. 14 is a block diagram of a control system of the secondary battery shown in FIG. 13.

A preferable control method of the above secondary batteries of the present invention is described below by referring to the accompanying drawings. FIG. 13 shows a secondary battery 111 embodying the present invention. The battery 111 is provided with a positive terminal 112p and a negative terminal 112n. These positive and negative terminals are generally attached to a battery. Charge and discharge of a battery have been controlled so far by measuring the voltage, internal resistance, current between these two terminals, etc. A battery of the present invention is further provided with operation-characteristic measuring terminals 113p, 113n, 114p, and 114n for measuring internal information of the battery. For example, fluctuation of temperatures in a battery can be measured by connecting the end of a thermocouple reaching the central portion of the battery to the positive and negative terminals 113p and 113n and thereby measuring the temperature of the inner portion of the battery, moreover connecting the end of a thermocouple located nearby the surface of the battery to the positive and negative terminals 114p and 114n and thereby measuring the fluctuation of temperatures in the battery, and comparing these measured values. Voltages in the battery can be measured by connecting voltage-measuring lines extending from different portions of the battery to the terminals 113p, 113n, 114p, and 114n and measuring the potential difference from the positive terminal 112p. Furthermore, it is possible to measure the voltage fluctuation in the battery by measuring voltages between the terminals 113p to 113n and between the terminals 114p to 114n. Data signals thus measured are sent to a control unit through connection lines AA1 to AAn in the block diagram (FIG. 14) to determine the fluctuation degree by the control unit, output a command for changing charge and discharge conditions or stopping charge and discharge to a charge-and-discharge control unit, or output a cooling-fan operating command and other operation control commands in accordance with the fluctuation degree. As a result, even if fluctuation of operation characteristics occurs in the battery, it is possible to eliminate or moderate the fluctuation or prevent the deterioration of the safety or reliability due to the fluctuation, by conducting a control in accordance with the fluctuation.

A control method of the present invention is used for a household energy storage system (for nighttime power storage, cogeneration, photovoltaic power generation, or the like) or a energy storage system of an electric vehicle and a secondary battery used for the system has a large capacity and a high energy density. It is preferable for the secondary battery to have an energy capacity of 30 Wh or more or it is more preferable for the secondary battery to have an energy capacity of 50 Wh or more. It is preferable for the secondary battery to have a volume energy density of 180 Wh/l or more or it is more preferable for the secondary battery to have a volume energy density of 200 Wh/l. When the energy capacity is less than 30 Wh or the volume energy density is lower than 180 Wh/l, this method is not preferable because the capacity is too small to be used for a energy storage system it is necessary to increase the numbers of batteries connected in series and in parallel in order to obtain a sufficient system capacity, or a compact design becomes difficult.

From the above viewpoints, a nickel-hydrogen battery or a lithium secondary battery provided with a non-aqueous electrolyte containing lithium salt is preferable as a secondary battery of the present invention and particularly, a lithium secondary battery is optimum.

It is preferable to use materials, dimensions, and shapes of secondary-battery components such as a positive electrode, negative electrode, separator, and the plate thickness of a battery case having the characteristics already described.

A secondary battery of the present invention is characterized by measuring the fluctuation of operation characteristics produced in a battery and controlling the battery in accordance with the measurement result. Operation characteristics to be measured include not only characteristics directly related to charge and discharge operations such as voltage, current, temperature, and internal resistance but also characteristics indirectly related to charge and discharge operations such as dimension and pressure to be changed due to gas generation caused under severe operations. It is possible to use various measuring means normally used for these characteristics for measurement. Though the number of measuring points in a battery (in a single cell) is determined in accordance with the shape of a battery, requested control accuracy, or measuring means, it is preferable to measure at least one operation characteristic at at least 2 points and compare measurement results.

For example, when selecting a voltage as an operation characteristic to be measured, it is possible to know the fluctuation of voltages in a battery by measuring voltages at a plurality of points of the battery or measuring an electrode terminal voltage and a voltage at one point or voltages at a plurality of points of the battery and comparing them. When measuring temperature as an operation characteristic, it is possible to know the fluctuation of temperatures in a battery by comparing the temperatures at a plurality of points such as the inner portion and the vicinity of the surface of a battery, a terminal and the surface of a battery case, an upper portion a and lower portion of a battery case, and so on. When measuring a dimensional change of a battery case, it is possible to easily know the state of a battery by measuring the thickness of the battery. In this case, it is possible to know the fluctuation of dimensions of a battery, particularly the fluctuation of dimensional changes by measuring a plurality of battery thicknesses from the outside of the battery and comparing the measured thicknesses.

It is possible to combine measurements of a plurality of operation characteristics. From the viewpoint of measurement efficiency, however, it is preferable to minimize the number of measuring points by selecting measuring points representing fluctuations of operation characteristics of a battery.

In the case of a control method of the present invention, fluctuation of operation characteristics of a secondary battery is controlled so as to eliminate or moderate the fluctuation or prevent the deterioration of the safety and reliability. Control can be performed by various methods in accordance with the sort of operation characteristics. For example, when the fluctuation of differences between surface temperature and internal temperature is measured and it is determined that the fluctuation must be moderated, controls are performed to lower the current of charge and discharge, to operate a cooling of a fan, or to stop charge or discharge according to the circumstances. When fluctuation of internal resistances between electrodes in a battery occurs, there are some cases in which current is concentrated on a portion having a small internal resistance and local overcharge occurs. In this case, by performing controls of pressing from the outside of a battery case and reduction of charge rate, it is possible to prevent local overcharge and secure the safety depending on the fluctuation in internal resistance.

The method of the present invention for controlling a secondary battery for a energy storage system can be applied to each cell or the cells selected according to a necessity in a module formed by combining a plurality of single cells or in a battery system formed by combining the modules. In this case, as a control mode, it is possible to use conventionally proposed cell basis control or module basis control together with cell by cell control of the present invention. Further, it is possible to control a module or battery system by utilizing the fluctuation information regarding each of different cells. For example, when each of the cells shows similar operation-characteristic, simultaneous control can be performed for each of the modules or whole of the battery system.

It is possible to perform the control according to a safety requirement related to the amount of charged or discharged energy, in such a manner that in a usual state charge or discharge is controlled based on an operation characteristic, e.g. the measurement of the voltage of a position of a battery, and a control based on a temperature measurement is added when the amount of charged or discharged energy has increased, and a control base on a dimension measurement is added when the amount has further increased.

In the case of a secondary-battery control method of the present invention, a battery is charged by charging equipment such as a photovoltaic cells, a commercial power system, or an electric generator, etc., and is discharged for loads such as a motor, an electric lamp, a household unit, etc. Therefore, it is possible to perform a control by utilizing the operational information of the unit or equipment, or to operate the unit or equipment in accordance with the state of the battery.

In the case of the above-described secondary-battery control method of the present invention, it is possible to improve the reliability and safety by performing control corresponding to the fluctuation of operation characteristics in a battery. However, it is preferable to design a battery so as to reduce the fluctuation of operation characteristics in the battery. Therefore, in the case of the present invention, a battery is formed into a flat shape and the thickness of the battery is preferably less than 12 mm, more preferably less than 10 mm, and still more preferably less than 8 mm. When the thickness of a battery is 12 mm or more, it is difficult to radiate the heat in the battery to the outside or the temperature difference between the inner portion and the surface of the battery increases, the fluctuation in the battery increases, and control becomes complicated.

A control method of the present invention is more specifically described below based on an embodiment of the control method.

(Embodiment 8-1)

Figure 15:
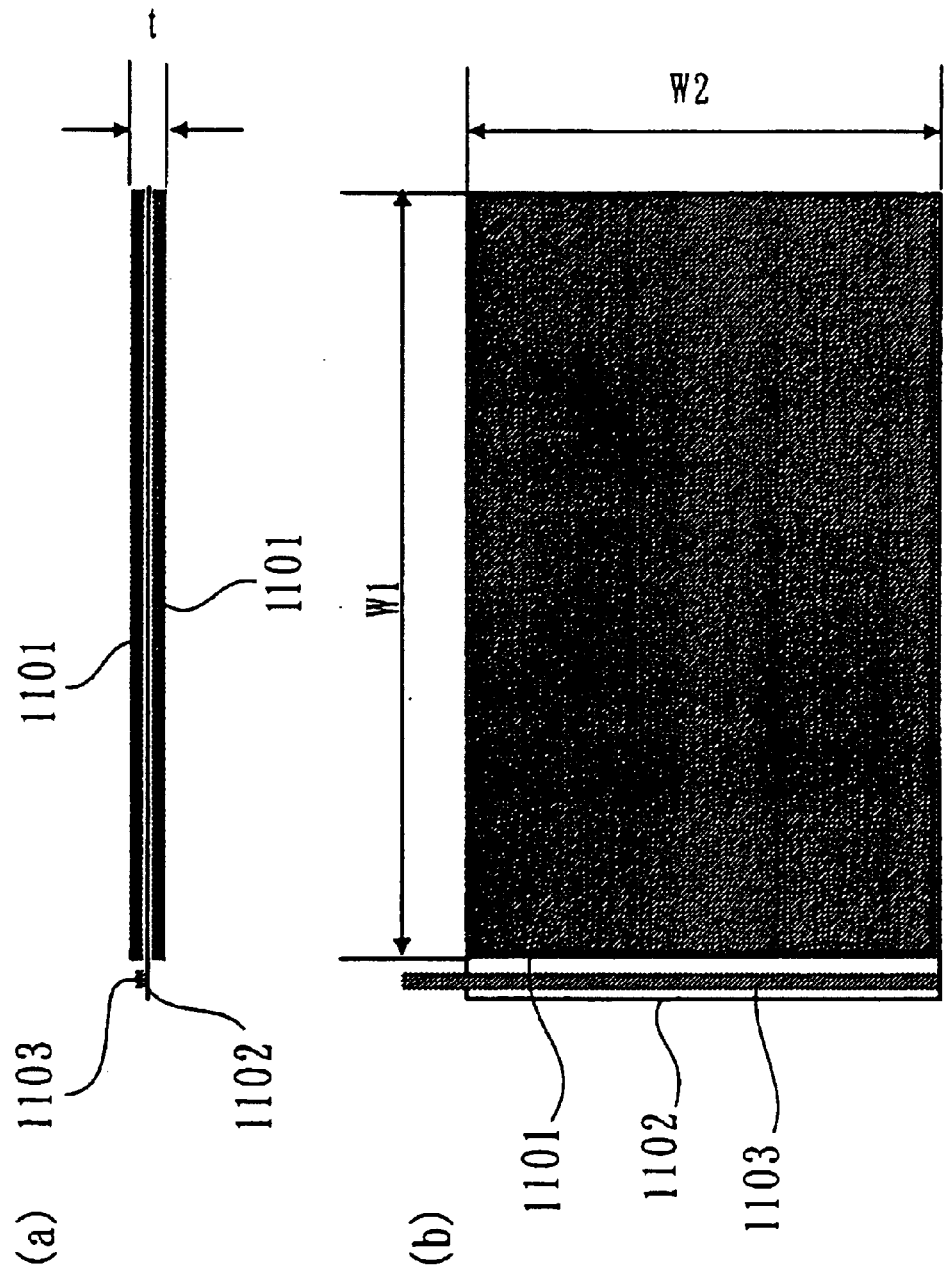
FIG. 15 shows a front view (a) and a top view (b) of an electrode of the secondary battery shown in FIG. 13.

(1) Positive-electrode mixture slurry was obtained by mixing 100 parts by weight of spinel-type $LiMn_2O_4$ (made by SEIMI CHEMICAL; product No. M063), 10 parts by weight of acetylene black, and 5 parts by weight of polyvinylidene fluoride (PVdF) with 100 parts by weight of N-methylpyrrolidone (NMP). A positive electrode was obtained by applying the slurry to both sides of aluminum foil having a thickness of 20 $\mu$m and drying and pressing the foil. FIG. 15 is an illustration of an electrode. In the case of this embodiment, the coating area (W1×W2) of an electrode 1101 was 133×198 mm$^2$ and slurry was applied to both sides of 20-$\mu$m aluminum foil 1102 at a thickness of 120 $\mu$m. As a result, the electrode thickness was 260 $\mu$m. One of the edge portions of the current collector extending along the arrow W2 and having a width of 1 cm was not coated with the electrode, and a tab 1103 (aluminum having a thickness of 0.1 mm and a width of 6 mm) was welded thereto.

(2) Negative-electrode mixture slurry was obtained by mixing 100 parts by weight of graphitized mesocarbon microbeads (MCMB: made by OSAKA GAS CHEMICAL Co., Ltd.; product No. 628) and 10 parts by weight of PVdF with 90 parts by weight of NMP. A negative electrode was obtained by applying the slurry to both sides of copper foil having a thickness of 14 μm and drying and pressing the foil. Because the shape of the negative electrode is the same as the above positive electrode, the negative electrode is described by referring to FIG. 15. In the case of this embodiment, the coating area (W1×W2) of the electrode 1101 was 0.135×200 mm² and the slurry was applied to both sides of the copper foil 1102 at a thickness of 80 μm. As a result, the electrode thickness t is 174 μm. One of the edge portions of the current collector extending along the arrow W2 and having a width of 1 cm is not coated with the electrode, and a tab 1103 (nickel having a thickness of 0.1 mm and a width of 6 mm) is welded thereto.

Slurry was applied to only one side by the same method and a single-sided electrode having a thickness of 94 μm was formed by the same method other than the side. The single-sided electrode is set to the outermost of the electrode-stacked body in the following Item (3) (1101n' in FIG. 17).

Figure 17:
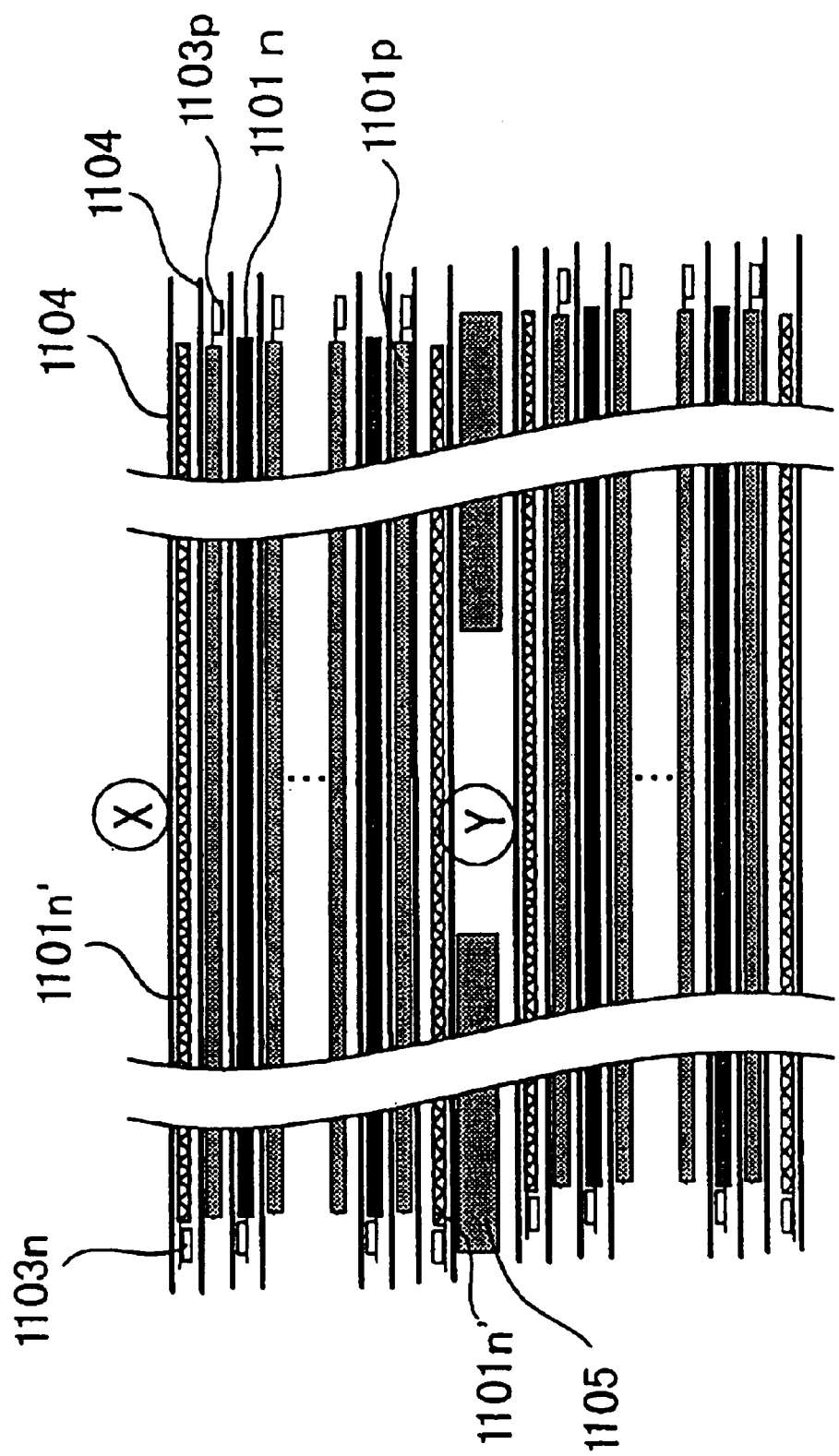
FIG. 17 is an enlarged front view of an stacked electrodes in the secondary battery shown in FIG. 16.

(3) Two electrode-stacked bodies were formed by alternately stacking nine positive electrodes 1101p and ten negative electrodes (eight both-sided electrodes 1101n and two single-sided electrodes 1101n') obtained in the above Item (1) with a separator 1104 (made by TONEN TAPIRUSU Co., Ltd.; made of porous polyethylene) held between the electrode as shown in FIG. 17.

(4) The battery bottom case (122 in FIG. 16) was formed by deep-drawing a thin plate made of SUS304 having a thickness of 0.5 mm. A battery case upper case (121 in FIG. 16) was also formed of a thin plate made of SUS304 having a thickness of 0.5 mm.

Terminals 113 and 0.114 made of SUS304 (diameter of 6 mm) and a safety-vent hole 117 (diameter of 8 mm) were formed on the battery case upper case, and the terminals 113 and 114 were insulated from the battery case upper case 111 by a polypropylene packing.

(5) Each of the positive terminals 1103p of two electrode-stacked bodies formed in the above Item (3) was welded to the terminal 113 and each of the negative electrodes 1103n of the bodies was welded to the terminal 114 and then, the electrode-stacked bodies were stacked on the battery bottom case 122 and fixed by an insulating tape. To measure temperatures of portions X and Y in FIG. 17, a film thermocouple made by Phillips Corp. was attached to the negative-electrode current collector of each portion and the lead wire of each thermocouple was connected to the positive electrodes 115p and 116p and negative electrodes 115n and 116n. A spacer 1105 was present between two stacked bodies in order to form a space for accommodating the Y-portion thermocouple. Under the above state, the entire circumference of the portion A in FIG. 16 was laser-welded. Thereafter, a solution made by dissolving $LiPF_6$ at a concentration of 1 mol/l in a solvent obtained by mixing ethylene carbonate and diethyl carbonate at a weight ratio of 1:1 was poured through a safety-vent hole as an electrolyte and hole was closed by using aluminum foil having a thickness of 0.1 mm. It is possible to measure the temperature nearby the surface in the battery in accordance with the potential difference between the positive and negative terminals 115p and 115n and the temperature of the inner portion in the battery in accordance with the potential difference between 116p and 116n and to measure the temperature fluctuation in the battery by comparing the above potential differences.

(6) The formed battery has dimensions of 165×230 mm² and a thickness of 10 mm. The obtained battery was charged by a constant-current/constant-voltage charging for 8 hours, in which the battery was charged up to 4.3 V by a current of 10 A and then charged by a constant voltage of 4.3 V. Then, the battery was discharged up to 2.0 V by a current of 30 A. The discharge capacity was 22 Ah, energy capacity was 78 Wh, and energy density was 205 Wh/l.

(7) The battery was charged and discharged under the conditions in the above Item (6) while measuring temperatures of the X and Y portions. However, when a difference occurred between internal temperature and external temperature, charge or discharge was stopped and charge and discharge were repeated so that the fluctuation of internal and external temperatures did not occur. As a result, charge and discharge could be performed up to 10 cycles.

COMPARATIVE EXAMPLE 8-1) [FOR COMPARISON WITH EMBODIMENT 8-1

Charge and discharge were repeated 10 times by using a battery and charge and discharge conditions same as the case of the embodiment under a constant condition without control according to measurement of the internal temperature of the battery. As a result, the thickness of the battery was increased and the internal resistance was raised.

(Embodiment 8-2)

Figure 18:
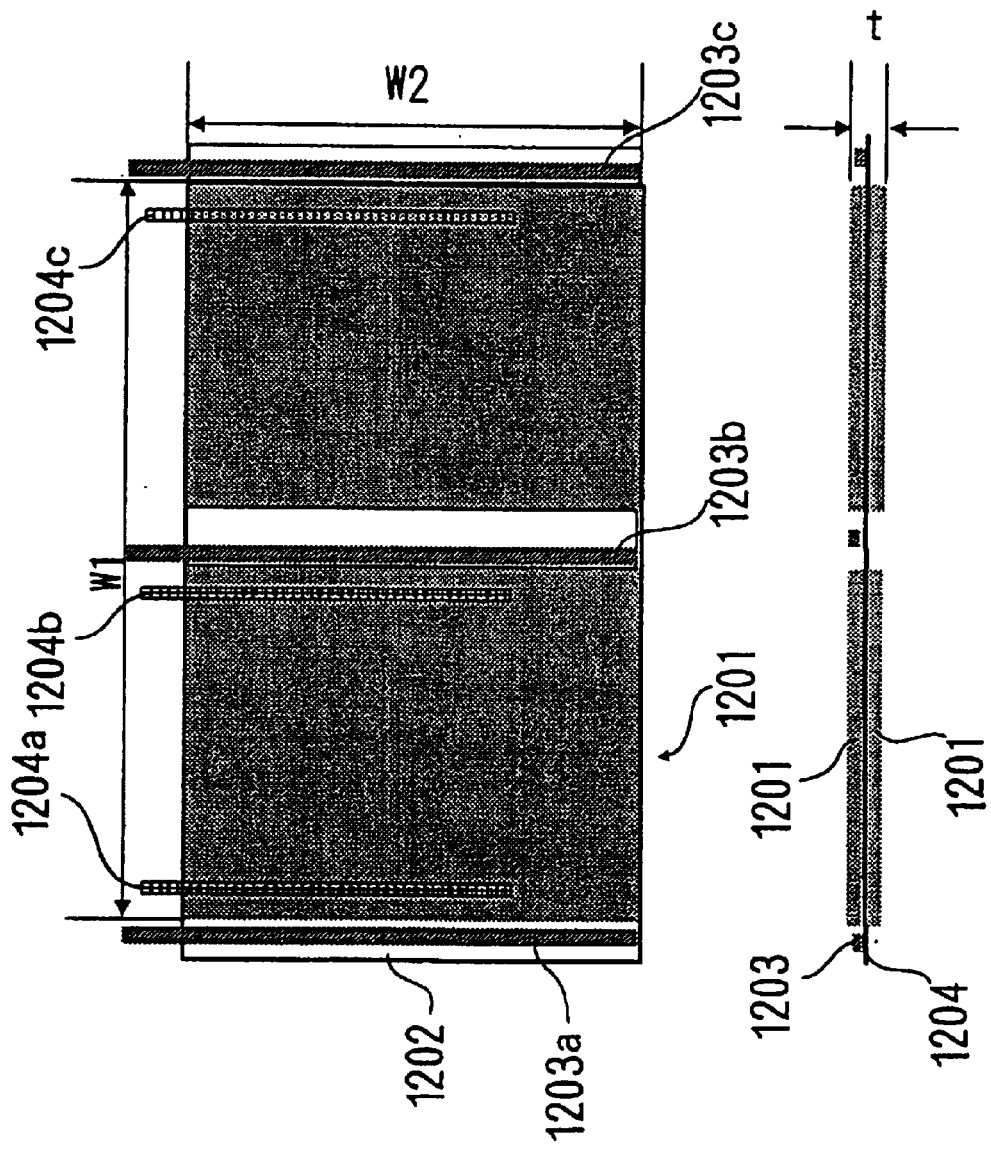
FIG. 18 shows a front view (a) and a top view (b) of another electrode for the secondary batteries shown above.

(1) Positive-electrode mixture slurry was obtained by mixing 100 parts by weight of spinel-type $LiMn_2O_4$ (made by SEIMI CHEMICAL; product No. M063), 10 parts by weight of acetylene black, and 5 parts by weight of PVdF with 100 parts by weight of NMP. A positive electrode was obtained by applying the slurry to both sides of aluminum foil having a thickness of 20 μm and drying and pressing the foil. FIG. 18 is an illustration of an electrode. In the case of this embodiment, the coating area (W1×W2) of an electrode 1201 was 258×168 mm2 and slurry was applied to both sides of 20-μm aluminum foil 1202 at a thickness of 120 μm. As a result, the electrode thickness t was 260 μm. Both of the edge portions and the central portion of the current collector in the view of the longitudinal direction of the collector was not coated with the electrode in the width of 1 cm, and a tabs 1203a, 1203b, and 1203c (aluminum having a thickness of 0.1 mm and a width of 4 mm) was welded thereto.

A measuring electrode having measuring electrodes 1204a, 1204b, and 1204c was formed in order to measure the fluctuation of internal voltages. The electrode was formed by welding a 3 mm-square expand metal (aluminum) having a thickness of 50 μm to one end of a slender piece of stainless-steel foil having a width of 3 mm and a thickness of 10 μm, attaching the expand metal to the surface of a positive electrode in a battery, bonding the stainless-steel foil to the positive electrode while insulating it from the positive electrode, and positioning the other end of the piece of the foil to protrude beyond an edge of the positive electrode to form a terminal.

(2) Negative-electrode mixture slurry was obtained by mixing 100 parts by weight of graphitized mesocarbon microbeads (MCMB) and 10 parts by weight of PVdF with 90 parts by weight of NMP. A negative electrode was obtained by applying the slurry to both sides of a copper foil having a thickness of 14 μm and drying and pressing the foil. Because the shape of the negative electrode is the same as the above positive electrode, the negative electrode is described by referring to FIG. 18. In the case of this embodiment, the coating area (W1×W2) of the electrode 1201 is 260×170 mm² and the slurry was applied to both sides of the copper foil 1202 of 14 μm at a thickness of 80 μm. As a result, the electrode thickness t was 174 μm. Both of the edge portions and the central portion of the current collector in the view of the longitudinal direction of the collector was not coated with the electrode in the width of 1 cm, and a tabs 1203a', 1203b', and 1203c' (copper having a thickness of 0.1 mm and a width, of 4 mm) was welded thereto.

To measure the fluctuation of internal voltages, measuring electrodes having protruded ends as measuring electrodes 1204a', 1204b', and 1204c' were formed, in the same manner as in the positive electrode, by welding a 3 mm-square expand metal (copper) having a thickness of 50 $\mu$m to an end of a slender piece of stainless-steel foil having a width of 3 mm and a thickness of 10 $\mu$m.

Furthermore, slurry was applied to only one side by the same method and a single-sided electrode having a thickness of 94 $\mu$m was formed by the same method other than the single-sided application of the slurry. The single-sided electrode was set to the outermost of the electrode-stacked body stated in the following. Item (3) (1201n' in FIG. 19).

Figure 19:
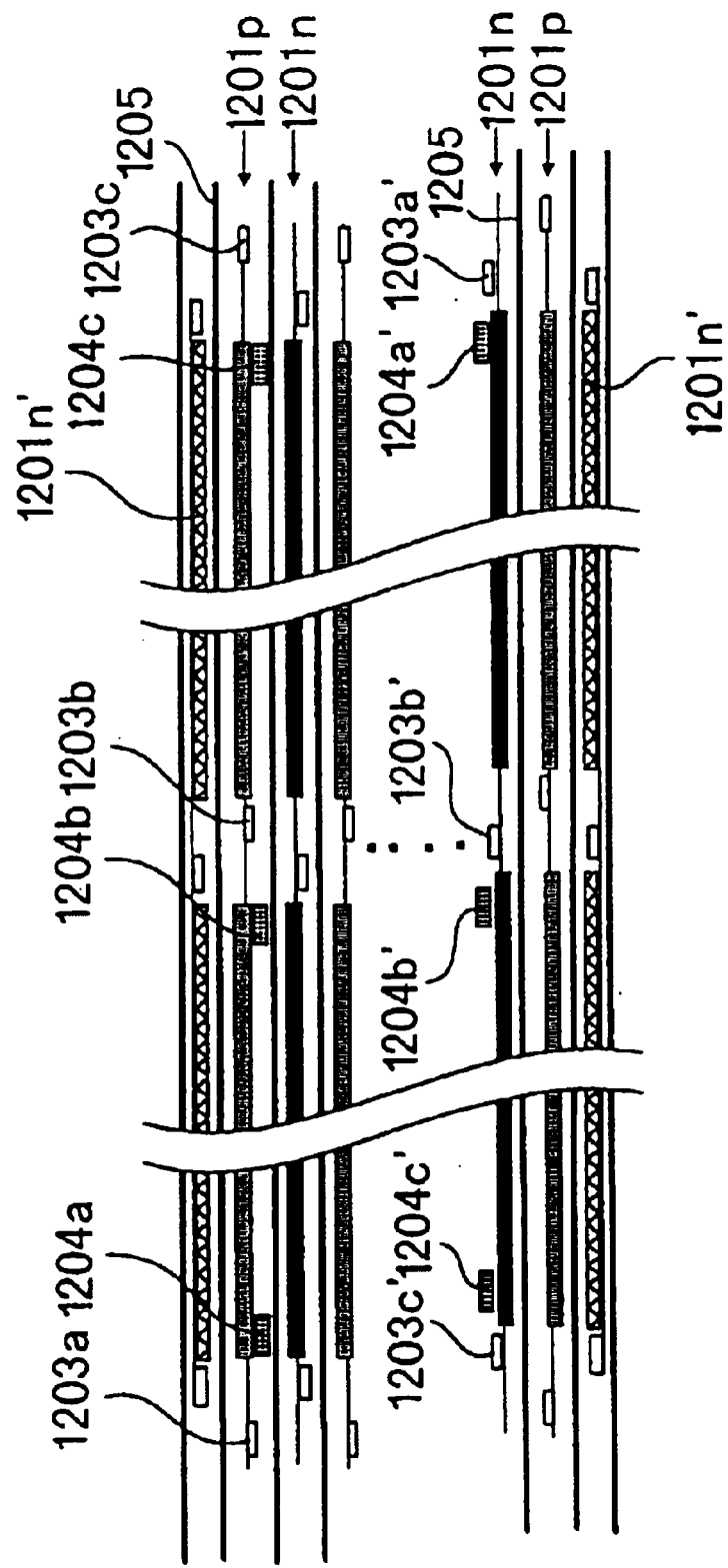
FIG. 19 is an enlarged front view of stacked electrodes using the electrode shown in FIG. 18.

(3) An electrode-stacked body was formed by alternately stacking ten positive electrodes 1201p and eleven negative electrodes (nine both-sided electrodes 1201n and two single-sided electrodes 1201n') obtained in the above Item (1) with a separator 1205 (made by TONEN TAPIRUSU Co., Ltd.; made of porous polyethylene) held between each of the electrode as shown in FIG. 19. A separator made of polypropylene non-woven fabric having a thickness of 100 $\mu$m was set between electrodes provided with internal-potential measuring terminals. The positive electrodes and negative electrodes were stacked so that their terminals protrude in mutually opposite direction.

(4) A battery bottom case (same as symbol 122 in FIG. 16) was formed by deep-drawing a thin plate made of SUS304 having a thickness of 0.5 mm. The battery upper case (symbol 1211 in FIG. 20) was also formed of a thin plate made of SUS304 having a thickness of 0.5 mm. The following were formed on the battery upper case as shown in FIG. 20: charge-discharge terminals 1213a, 1213b and 1213c, 1214a, 1214b and 1214c (diameter of 6 mm) which were made of SUS304, voltage-measuring terminals 1215a, 1215b and 1215c, and 1216a, 1216b and 1216c (diameter of 3 mm), and a safety-vent hole 117 (diameter of 8 mm). The terminals 1213a, 1213b and 1213c, and 1214a, 1214b and 1214c, 1215a, 1215b and 1215c, and 1216a, 1216b and 1216c were insulated from the battery upper case 1211 by a polypropylene packing.

(5) A series of charge-discharge positive and negative electrodes and their positive-electrode- and negative-electrode-voltage measuring terminals on two electrode stacked bodies formed in the above Item (3) were welded to connection terminals on the battery case through connection lines as shown below.

| Terminal of electrode layered body | Connection terminal on battery case |
|---|---|
| Charge-discharge positive-electrode tab 1203a | Terminal 1213a |
| Charge-discharge positive-electrode tab 1203b | Terminal 1213b |
| Charge-discharge positive-electrode tab 1203c | Terminal 1213c |
| Charge-discharge negative-electrode tab 1203a | Terminal 1214a |
| Charge-discharge negative-electrode tab 1203b' | Terminal 1214b |
| Charge-discharge negative-electrode tab 1203c' | Terminal 1214c |
| Positive-electrode measuring electrode 1204a | Terminal 1215a |
| Positive-electrode measuring electrode 1204b | Terminal 1215b |
| Positive-electrode measuring electrode 1204c | Terminal 1215c |
| Negative-electrode measuring electrode 1204a' | Terminal 1216a |
| Negative-electrode measuring electrode 1204b' | Terminal 1216b |
| Negative-electrode measuring electrode 1204c' | Terminal 1216c |

Figure 16:
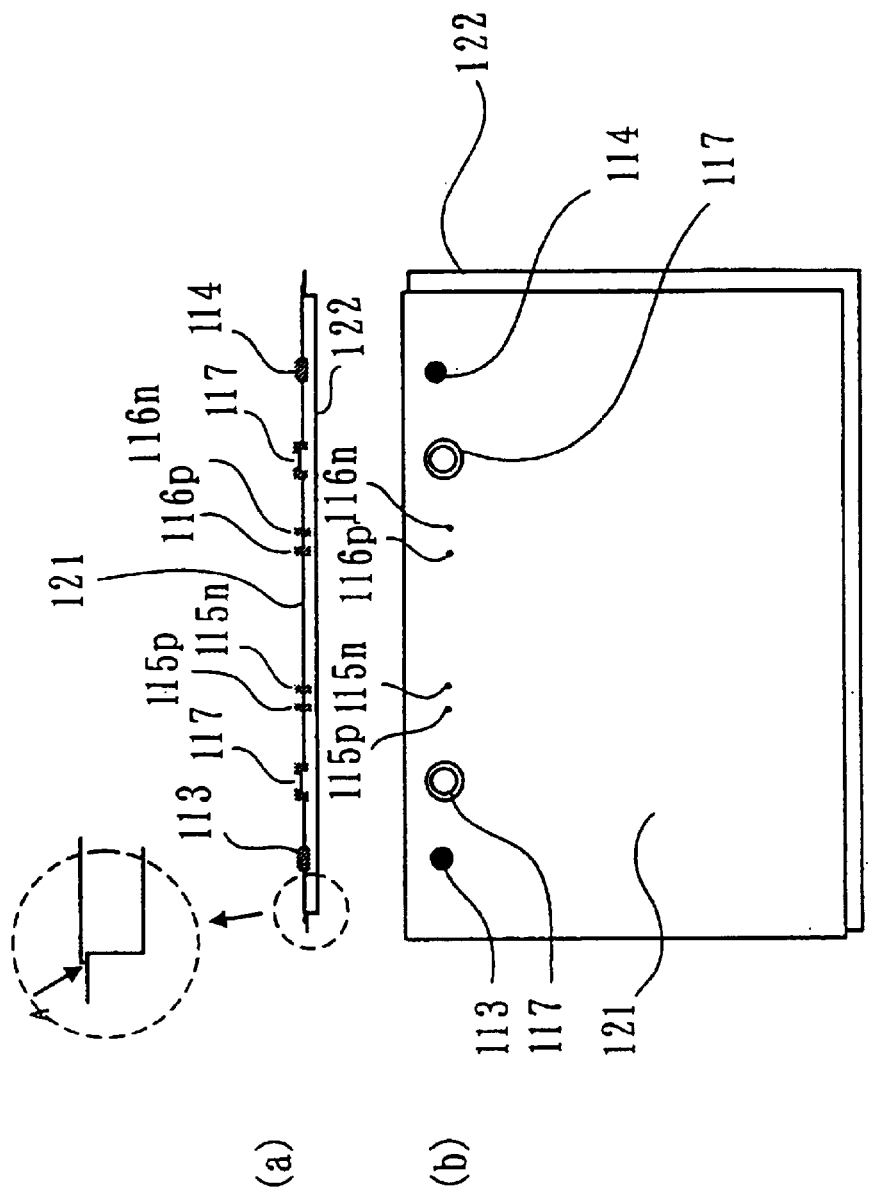
FIG. 16 shows a front view (a) and a top view (b) of a secondary battery storing electrodes shown in FIG. 15.

Thereafter, the electrode-stacked bodies were stacked on the bottom of the battery bottom case 122 and fixed by an insulating tape, and the entire circumference of a portion corresponding to the edgy portion A in FIG. 16 was laser-welded. Thereafter, a solution was made by dissolving LiPF$_6$ at a concentration of 1 mol/l in a solvent obtained by mixing ethylene carbonate and diethyl carbonate at a weight ratio of. 1:1. The solution was poured through a safety-vent hole 117 as an electrolyte and the hole was closed by using aluminum foil having a thickness of 0.1 mm.

(6) The formed battery has dimensions of 300×210 mm$^2$ and a thickness of 6 mm. The battery was charged and discharged so that a potential difference did not occur between the positive-electrode-voltage measuring terminals 1215a, 1215b, and 1215c or between the negative-electrode-voltage measuring terminals 1216a, 1216b, and 1216c by measuring the potential difference between the positive-electrode-voltage measuring terminals 1215a, 1215b, and 1215c and the potential difference between the negative-electrode-voltage measuring terminals 1216a, 1216b, and 1216c and controlling the current to be supplied to the charge-discharge terminals (positive terminals 1213a, 1213b, and 1213c and the negative terminals 1214a, 1214b, and 1214c). That is, charge and discharge were controlled so as to eliminate the fluctuation of potentials for charge and discharge in cells. The battery was charged by a constant-current/constant-voltage charging for 8 hours, in which the battery was charged up to 4.3 V (potential between terminals 1213b and 1214b) by a current of 10 A and then charged by a constant voltage of 4.3 V.

Then, the battery was discharged up to 2.0 V by a constant current of 5 A. The discharge capacity was 23 Ah., energy capacity was 81 Wh, and volume energy density was 210 Wh/l.

(7) Charge and discharge were repeated 10 times while performing the above control. For comparison, the same level of charge and discharge were repeated 10 times only by the connection to the terminal and electrode 1213a and 1214a. As a result, the battery controlled in accordance with the method of the embodiment was less deteriorated in capacity. Now, description of methods of the present invention is completed.

As described above, according to the present invention, it is possible to provide a non-aqueous secondary battery applicable to energy storage which has a large capacity of 30 Wh or more and a volume energy density of 180 Wh/l or more and is superior in heat radiation characteristic and safely used. By a specific negative electrode provided, it is possible to provide a non-aqueous secondary battery applicable to energy storage system and having features of large capacity and high safety.

Furthermore, according to the present invention, it is possible to provide a flat non-aqueous secondary battery, particularly a flat battery having a large capacity and a high volume energy density, which is further superior in cycle characteristic by comprising one type of separator or two types or more of separators having a specific resiliency.

Furthermore, according to the present invention, it is possible to provide a flat non-aqueous secondary battery, particularly a flat battery having a large capacity and a high volume energy density, which is superior in heat radiation characteristic, and has a low probability of making short circuit during assembling of a battery based on the bonding of a separator with an electrode.

Furthermore, according to a control method of the present invention, reliabilities such as safety and cycle characteristic of a battery are further improved because of measuring the fluctuation of operation characteristics in the battery and controlling charge and discharge in accordance with the measurement results.

Furthermore, according to a secondary battery of the present invention provided with positive and negative terminals for charge and discharge and terminals for measuring internal operation characteristics, it is possible to easily and securely perform the above control.

What is claimed is:

1. A non-aqueous secondary battery comprising a positive electrode, a negative electrode, and a lithium salt-containing electrolyte, the battery being at least 30 Wh in energy capacity and at least 180 Wh/l in volume energy density and having a flat shape with a thickness of less than 12 mm, wherein the negative electrode is formed by graphite having an average particle diameter of 1 to 50 μm as active material, a resin as binder, and a metal as current collector, and the negative electrode has a porosity of 20 to 35%, an electrode density of 1.40 to 1.70 g/cm$^3$, and an capacity of electrode of 400 mAh/cm$^3$ or higher.

2. The non-aqueous secondary battery according to claim 1, wherein the negative electrode contains a graphite material obtained by graphitizing mesocarbon microbeads.

3. A non-aqueous secondary battery comprising a positive electrode, a negative electrode, and a lithium salt-containing electrolyte, the battery being at least 30 Wh in energy capacity and at least 180 Wh/l in volume energy density and having a flat-shape with a thickness of less than 12 mm, wherein the negative electrode comprises as active material double-structure graphite particles formed with graphite-based particles and amorphous carbon layers covering the surface of the graphite-based particles, the graphite-based particles have (d002) spacing of (002) planes of not more than 0.34 nm as measured by X-ray wide-angle diffraction method, the amorphous carbon layers have (d002) spacing of (002) planes of 0.34 nm or higher, the negative electrode is formed by double-structure graphite particles having an average particle diameter of 1 to 50 μm as active material, a resin as binder, and a metal as current collector, and the negative electrode has a porosity of 20 to 35%, an electrode density of 1.20 to 1.60 g/cm$^3$, and an capacity of electrode of 400 mAh/cm$^3$ or higher.

4. A non-aqueous secondary battery comprising a positive electrode, a negative electrode, and a lithium salt-containing electrolyte, the battery being at least 30 Wh in energy capacity and at least 180 Wh/l in volume energy density and having a flat shape with a thickness of less than 12 mm, wherein the negative electrode comprises as active material a carbon material manufactured by mixing at least one of artificial graphite and natural graphite with a carbon material having volatile components on the surface and/or in the inside and baking the mixture, the negative electrode is formed by a resin as binder and a metal as current collector, and the negative electrode has a porosity of 20 to 35%, an electrode density of 1.20 to 1.60 g/cm$^3$, and an capacity of electrode of 400 mAh/cm$^3$ or higher.

* * * * *